United States Patent
Adib et al.

(10) Patent No.: US 11,123,954 B2
(45) Date of Patent: Sep. 21, 2021

(54) ARTICLES AND METHODS FOR CONTROLLED BONDING OF THIN SHEETS WITH CARRIERS

(71) Applicant: Corning Incorporated, Corning, NY (US)

(72) Inventors: Kaveh Adib, Corning, NY (US); Robert Alan Bellman, Painted Post, NY (US); Dana Craig Bookbinder, Corning, NY (US); Theresa Chang, Painted Post, NY (US); Shiwen Liu, Painted Post, NY (US); Robert George Manley, Vestal, NY (US); Prantik Mazumder, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 233 days.

(21) Appl. No.: 15/921,034

(22) Filed: Mar. 14, 2018

(65) Prior Publication Data
US 2018/0297324 A1    Oct. 18, 2018

Related U.S. Application Data

(62) Division of application No. 15/122,366, filed as application No. PCT/US2015/012865 on Jan. 26, 2015, now Pat. No. 10,046,542.
(Continued)

(51) Int. Cl.
*B32B 7/06* (2019.01)
*B32B 37/26* (2006.01)
(Continued)

(52) U.S. Cl.
CPC ............... *B32B 7/06* (2013.01); *B32B 7/02* (2013.01); *B32B 17/06* (2013.01); *B32B 17/064* (2013.01);
(Continued)

(58) Field of Classification Search
CPC ....... C03C 27/10; C03C 27/06; C03C 23/006; B32B 37/26; B32B 17/064; B32B 17/06; B32B 7/02; B32B 7/06
See application file for complete search history.

(56) References Cited

U.S. PATENT DOCUMENTS 3,722,181 A   3/1973 Kirkland et al.
4,096,315 A   6/1978 Kubacki
(Continued)

FOREIGN PATENT DOCUMENTS

CN   101924067 A   12/2010
CN   102034746       4/2011
(Continued)

OTHER PUBLICATIONS

2006 Gelest Brochure on Thermal Stability of Silanes, p. 14.
(Continued)

*Primary Examiner* — Daniel McNally

(57) ABSTRACT

A method of controllably bonding a thin sheet having a thin sheet bonding surface with a carrier having a carrier bonding surface, by depositing a carbonaceous surface modification layer onto at least one of the thin sheet bonding surface and the carrier bonding surface, incorporating polar groups with the surface modification layer, and then bonding the thin sheet bonding surface to the carrier bonding surface via the surface modification layer. The surface modification layer may include a bulk carbonaceous layer having a first polar group concentration and a surface layer having a second polar group concentration, wherein the second polar group concentration is higher than the first polar group concentration. The surface modification layer deposition and the treatment thereof may be performed by plasma polymerization techniques.

11 Claims, 11 Drawing Sheets

Related U.S. Application Data

(60) Provisional application No. 61/931,927, filed on Jan. 27, 2014.

(51) Int. Cl.

| | | |
|---|---|---|
| *B32B 17/06* | | (2006.01) |
| *C03C 17/22* | | (2006.01) |
| *C03C 23/00* | | (2006.01) |
| *C03C 27/06* | | (2006.01) |
| *C03C 27/10* | | (2006.01) |
| *B32B 7/02* | | (2019.01) |

(52) U.S. Cl.
CPC .............. *B32B 37/26* (2013.01); *C03C 17/22* (2013.01); *C03C 23/006* (2013.01); *C03C 27/06* (2013.01); *C03C 27/10* (2013.01); *B32B 2315/08* (2013.01); *B32B 2457/20* (2013.01); *B32B 2457/206* (2013.01); *C03C 2217/28* (2013.01); *C03C 2217/77* (2013.01); *C03C 2218/153* (2013.01)

(56) References Cited

U.S. PATENT DOCUMENTS

| | | | |
|---|---|---|---|
| 4,179,324 | A | 12/1979 | Kirkpatrick |
| 4,397,722 | A | 8/1983 | Haller |
| 4,599,243 | A | 7/1986 | Sachdev et al. |
| 4,810,326 | A | 3/1989 | Babu et al. |
| 4,822,466 | A | 4/1989 | Rabalais et al. |
| 4,849,284 | A | 7/1989 | Arthur et al. |
| 4,990,462 | A | 2/1991 | Silwa et al. |
| 5,073,181 | A | 12/1991 | Foster et al. |
| 5,141,800 | A | 8/1992 | Effenberger et al. |
| 5,222,494 | A | 6/1993 | Baker, Jr. |
| 5,357,726 | A | 10/1994 | Effenberger et al. |
| 5,413,940 | A | 5/1995 | Lin et al. |
| 5,462,781 | A | 10/1995 | Zukowski |
| 5,479,043 | A | 12/1995 | Nuyen |
| 5,482,896 | A | 1/1996 | Tang |
| 5,491,571 | A | 2/1996 | Williams et al. |
| 5,554,680 | A | 9/1996 | Ojakaar |
| 5,616,179 | A | 4/1997 | Baldwin et al. |
| 5,661,618 | A | 8/1997 | Brown et al. |
| 5,718,967 | A | 2/1998 | Hu et al. |
| 5,755,867 | A | 5/1998 | Chikuni et al. |
| 5,820,991 | A | 10/1998 | Cabo |
| 5,840,616 | A | 11/1998 | Sakaguchi et al. |
| 5,888,591 | A | 3/1999 | Gleason et al. |
| 5,904,791 | A | 5/1999 | Bearinger et al. |
| 5,966,622 | A | 10/1999 | Levine et al. |
| 5,972,152 | A | 10/1999 | Lake et al. |
| 6,037,026 | A | 3/2000 | Iwamoto |
| 6,091,478 | A | 7/2000 | Tanaka et al. |
| 6,124,154 | A | 9/2000 | Miyasaka |
| 6,159,385 | A | 12/2000 | Yao et al. |
| 6,261,398 | B1 | 7/2001 | Costa |
| 6,338,901 | B1 | 1/2002 | Veerasamy |
| 6,379,746 | B1 | 4/2002 | Birch et al. |
| 6,387,736 | B1 | 5/2002 | Cao et al. |
| 6,521,511 | B1 | 2/2003 | Inoue et al. |
| 6,521,857 | B1 | 2/2003 | Barnett |
| 6,528,145 | B1 | 3/2003 | Berger et al. |
| 6,540,866 | B1 | 4/2003 | Zhang et al. |
| 6,602,606 | B1 | 8/2003 | Fujisawa et al. |
| 6,645,828 | B1 | 11/2003 | Farrens et al. |
| 6,649,540 | B2 | 11/2003 | Wang et al. |
| 6,687,969 | B1 | 2/2004 | Dando |
| 6,699,798 | B2 | 3/2004 | Rockford |
| 6,735,982 | B2 | 5/2004 | Matthies |
| 6,762,074 | B1 | 7/2004 | Draney et al. |
| 6,814,833 | B2 | 11/2004 | Sabia |
| 6,815,070 | B1 | 11/2004 | Burkle et al. |
| 6,969,166 | B2 | 11/2005 | Clark et al. |
| 6,974,731 | B2 | 12/2005 | Yamazaki et al. |
| 6,992,371 | B2 | 1/2006 | Mancini et al. |
| 7,041,608 | B2 | 5/2006 | Sieber et al. |
| 7,045,878 | B2 | 5/2006 | Faris |
| 7,056,751 | B2 | 6/2006 | Faris |
| 7,060,323 | B2 | 6/2006 | Sugahara et al. |
| 7,118,990 | B1 | 10/2006 | Xu et al. |
| 7,129,311 | B2 | 10/2006 | Teff et al. |
| 7,144,638 | B2 | 12/2006 | Leung et al. |
| 7,147,740 | B2 | 12/2006 | Takayama et al. |
| 7,166,520 | B1 | 1/2007 | Henley |
| 7,220,656 | B2 | 5/2007 | Forbes |
| 7,232,739 | B2 | 6/2007 | Kerdiles et al. |
| 7,261,793 | B2 | 8/2007 | Chen et al. |
| 7,351,300 | B2 | 4/2008 | Takayama et al. |
| 7,364,942 | B2 | 4/2008 | Martin |
| 7,407,867 | B2 | 8/2008 | Ghyselen et al. |
| 7,408,006 | B2 | 8/2008 | Comino et al. |
| 7,466,390 | B2 | 12/2008 | French et al. |
| 7,482,249 | B2 | 1/2009 | Jakob et al. |
| 7,531,590 | B2 | 5/2009 | Teff et al. |
| 7,541,264 | B2 | 6/2009 | Gardner et al. |
| 7,574,787 | B2 | 8/2009 | Xu et al. |
| 7,575,983 | B2 | 8/2009 | Hu et al. |
| 7,635,617 | B2 | 12/2009 | Yamazaki |
| 7,642,559 | B2 | 1/2010 | Yamazaki et al. |
| 7,737,035 | B1 | 6/2010 | Lind et al. |
| 7,741,775 | B2 | 6/2010 | Yamazaki et al. |
| 7,749,862 | B2 | 7/2010 | Schwarzenbach et al. |
| 7,763,365 | B2 | 7/2010 | Takeuchi et al. |
| 7,842,548 | B2 | 11/2010 | Lee et al. |
| 7,902,038 | B2 | 3/2011 | Aspar et al. |
| 7,909,928 | B2 | 3/2011 | Lahann et al. |
| 7,939,425 | B2 | 5/2011 | Hu et al. |
| 7,960,840 | B2 | 6/2011 | Bonifield et al. |
| 7,960,916 | B2 | 6/2011 | Kavvachi et al. |
| 7,978,282 | B2 | 7/2011 | An et al. |
| 7,989,314 | B2 | 8/2011 | Lee et al. |
| 8,012,667 | B2 | 9/2011 | Nam et al. |
| 8,034,206 | B2 | 10/2011 | Kim et al. |
| 8,034,452 | B2 | 10/2011 | Padiyath et al. |
| 8,043,697 | B2 | 10/2011 | Murakami et al. |
| 8,048,794 | B2 | 11/2011 | Knickerbocker |
| 8,069,229 | B2 | 11/2011 | Yellapragada et al. |
| 8,138,614 | B2 | 3/2012 | Yamazaki et al. |
| 8,105,935 | B2 | 5/2012 | Leu et al. |
| 8,173,249 | B2 | 5/2012 | Leu et al. |
| 8,211,259 | B2 | 7/2012 | Sato et al. |
| 8,211,270 | B2 | 7/2012 | Suzuki et al. |
| 8,236,669 | B2 | 8/2012 | Hong et al. |
| 8,268,939 | B2 | 9/2012 | Ebbrecht et al. |
| 8,349,727 | B2 | 1/2013 | Guo et al. |
| 8,383,460 | B1 | 2/2013 | Yim |
| 8,399,047 | B2 | 3/2013 | Lahann et al. |
| 8,580,069 | B2 | 11/2013 | Watanabe et al. |
| 8,590,688 | B2 | 11/2013 | Weigl |
| 8,656,735 | B2 | 2/2014 | Tamitsuji et al. |
| 8,660,052 | B2 | 2/2014 | Liang et al. |
| 8,697,228 | B2 | 4/2014 | Carre et al. |
| 8,822,306 | B2 | 9/2014 | Berger et al. |
| 8,840,999 | B2 | 9/2014 | Harimoto et al. |
| 8,993,706 | B2 | 3/2015 | Schubert et al. |
| 8,995,146 | B2 | 3/2015 | Brooks et al. |
| 9,069,133 | B2 | 6/2015 | Baldwin et al. |
| 9,111,981 | B2 | 8/2015 | Flaim et al. |
| 9,131,587 | B2 | 9/2015 | Zhou |
| 9,269,826 | B2 | 2/2016 | Hosono et al. |
| 9,612,455 | B2 | 4/2017 | Nicolson et al. |
| 9,889,635 | B2 | 2/2018 | Bellman et al. |
| 10,046,542 | B2 | 8/2018 | Adib et al. |
| 10,086,584 | B2 | 10/2018 | Bellman et al. |
| 10,543,662 | B2 | 1/2020 | Bellman et al. |
| 2002/0171080 | A1 | 11/2002 | Faris |
| 2003/0017303 | A1 | 1/2003 | Shindo et al. |
| 2003/0020049 | A1 | 1/2003 | Payne et al. |
| 2003/0020062 | A1 | 1/2003 | Faris |
| 2003/0057563 | A1 | 3/2003 | Nathan et al. |
| 2003/0119336 | A1 | 6/2003 | Matsuki et al. |
| 2003/0175525 | A1 | 9/2003 | Wochnowski et al. |
| 2003/0210853 | A1 | 11/2003 | Kato |

(56) References Cited

U.S. PATENT DOCUMENTS

| | | |
|---|---|---|
| 2003/0228413 A1 | 12/2003 | Ohta et al. |
| 2004/0033358 A1 | 2/2004 | Coates et al. |
| 2004/0044100 A1 | 3/2004 | Schlenoff et al. |
| 2004/0217352 A1 | 11/2004 | Forbes |
| 2004/0222500 A1 | 11/2004 | Aspar et al. |
| 2004/0247949 A1 | 12/2004 | Akedo et al. |
| 2004/0258850 A1 | 12/2004 | Straccia et al. |
| 2005/0001201 A1 | 1/2005 | Bocko et al. |
| 2005/0029224 A1 | 2/2005 | Aspar et al. |
| 2005/0059218 A1 | 3/2005 | Faris |
| 2005/0069713 A1 | 3/2005 | Gupta et al. |
| 2005/0081993 A1 | 4/2005 | Ilkka et al. |
| 2005/0118595 A1 | 6/2005 | Lahann |
| 2005/0118742 A1 | 6/2005 | Henning et al. |
| 2005/0136188 A1 | 6/2005 | Chang |
| 2005/0175851 A1 | 8/2005 | Bordunov et al. |
| 2005/0224155 A1 | 10/2005 | Chen et al. |
| 2005/0242341 A1 | 11/2005 | Knudson et al. |
| 2006/0134362 A1 | 6/2006 | Lu et al. |
| 2006/0165975 A1* | 7/2006 | Moser .............. B05D 1/62 428/336 |
| 2006/0166464 A1 | 7/2006 | Jakob et al. |
| 2006/0192205 A1 | 8/2006 | Yamazaki et al. |
| 2006/0246218 A1 | 11/2006 | Bienkiewicz et al. |
| 2006/0250559 A1 | 11/2006 | Bocko et al. |
| 2006/0264004 A1 | 11/2006 | Tong et al. |
| 2007/0048530 A1 | 3/2007 | Tsao et al. |
| 2007/0077353 A1 | 4/2007 | Lee et al. |
| 2007/0077728 A1 | 4/2007 | Kulkarni et al. |
| 2007/0077782 A1 | 4/2007 | Lee et al. |
| 2007/0091062 A1 | 4/2007 | French et al. |
| 2007/0105252 A1 | 5/2007 | Lee et al. |
| 2007/0105339 A1 | 5/2007 | Faris |
| 2007/0111391 A1 | 5/2007 | Aoki et al. |
| 2007/0134784 A1 | 6/2007 | Halverson et al. |
| 2007/0181938 A1 | 8/2007 | Bucher et al. |
| 2007/0248809 A1 | 10/2007 | Haldeman et al. |
| 2008/0044588 A1 | 2/2008 | Sakhrani |
| 2008/0053959 A1 | 3/2008 | Tong et al. |
| 2008/0111786 A1 | 5/2008 | Goudarzi |
| 2008/0135175 A1 | 6/2008 | Higuchi |
| 2008/0173992 A1 | 7/2008 | Mahler et al. |
| 2008/0212000 A1 | 9/2008 | French et al. |
| 2009/0020414 A1 | 1/2009 | Tsao et al. |
| 2009/0091025 A1 | 4/2009 | Wong et al. |
| 2009/0110882 A1 | 4/2009 | Higuchi |
| 2009/0126404 A1 | 5/2009 | Sakhrani et al. |
| 2009/0133820 A1 | 5/2009 | Sato et al. |
| 2009/0227074 A1 | 9/2009 | Hong et al. |
| 2009/0261062 A1 | 10/2009 | Kim |
| 2009/0262294 A9 | 10/2009 | Templier et al. |
| 2009/0266471 A1 | 10/2009 | Kim et al. |
| 2009/0321005 A1 | 12/2009 | Higuchi et al. |
| 2010/0038023 A1 | 2/2010 | Kho et al. |
| 2010/0089096 A1 | 4/2010 | Tamitsuji et al. |
| 2010/0101719 A1 | 4/2010 | Otsuka et al. |
| 2010/0151231 A1 | 6/2010 | Matsuo et al. |
| 2010/0187980 A1 | 7/2010 | Langer et al. |
| 2010/0224320 A1 | 9/2010 | Tsai et al. |
| 2010/0308014 A1 | 12/2010 | Cheshire |
| 2010/0316871 A1 | 12/2010 | Fujiwara et al. |
| 2011/0001251 A1 | 1/2011 | Gou et al. |
| 2011/0002636 A1 | 1/2011 | Ando et al. |
| 2011/0010905 A1 | 1/2011 | Sturzebecher |
| 2011/0012873 A1 | 1/2011 | Prest et al. |
| 2011/0024166 A1 | 2/2011 | Chang et al. |
| 2011/0026236 A1 | 2/2011 | Kondo et al. |
| 2011/0042649 A1 | 2/2011 | Duvall et al. |
| 2011/0045239 A1 | 2/2011 | Takaya et al. |
| 2011/0048611 A1 | 3/2011 | Carre et al. |
| 2011/0064953 A1 | 3/2011 | O'Rourke et al. |
| 2011/0069467 A1 | 3/2011 | Flaim et al. |
| 2011/0092006 A1 | 4/2011 | An et al. |
| 2011/0102346 A1 | 5/2011 | Orsley et al. |
| 2011/0111194 A1 | 5/2011 | Carre et al. |
| 2011/0123787 A1 | 5/2011 | Tomamoto et al. |
| 2011/0170991 A1 | 7/2011 | Helmut |
| 2011/0207328 A1 | 8/2011 | Speakman |
| 2011/0227086 A1 | 9/2011 | French |
| 2011/0250427 A1 | 10/2011 | Kotov et al. |
| 2011/0256385 A1 | 10/2011 | Matsuzaki et al. |
| 2011/0272090 A1 | 11/2011 | Higuchi |
| 2011/0304794 A1 | 12/2011 | Noh et al. |
| 2011/0308739 A1 | 12/2011 | McCutcheon et al. |
| 2011/0311789 A1 | 12/2011 | Loy et al. |
| 2011/0318544 A1 | 12/2011 | Chen et al. |
| 2011/0318589 A1 | 12/2011 | Pignatelli et al. |
| 2012/0009703 A1 | 1/2012 | Feinstein et al. |
| 2012/0034437 A1 | 2/2012 | Puligadda et al. |
| 2012/0035309 A1 | 2/2012 | Zhu et al. |
| 2012/0045611 A1 | 2/2012 | Shih et al. |
| 2012/0052654 A1 | 3/2012 | Yang et al. |
| 2012/0061881 A1 | 3/2012 | Bae et al. |
| 2012/0063952 A1 | 3/2012 | Hong et al. |
| 2012/0080403 A1 | 4/2012 | Tomamoto et al. |
| 2012/0083098 A1 | 4/2012 | Berger et al. |
| 2012/0107978 A1 | 5/2012 | Shin et al. |
| 2012/0118478 A1 | 5/2012 | Park |
| 2012/0132885 A1 | 5/2012 | Lippert et al. |
| 2012/0135187 A1 | 5/2012 | Takimoto et al. |
| 2012/0153496 A1 | 6/2012 | Lee et al. |
| 2012/0156457 A1 | 6/2012 | Kondo |
| 2012/0156480 A1 | 6/2012 | Kondo et al. |
| 2012/0171454 A1 | 7/2012 | Kondo |
| 2012/0193029 A1 | 8/2012 | Fay et al. |
| 2012/0202010 A1 | 8/2012 | Uchida |
| 2012/0202030 A1 | 8/2012 | Kondo et al. |
| 2012/0223049 A1 | 9/2012 | Yoshikawa et al. |
| 2012/0228617 A1 | 9/2012 | Ko et al. |
| 2012/0235315 A1 | 9/2012 | Wu et al. |
| 2012/0258320 A1 | 10/2012 | Berger |
| 2012/0272800 A1 | 11/2012 | Lacan et al. |
| 2012/0276689 A1 | 11/2012 | Canale et al. |
| 2012/0315470 A1 | 12/2012 | Hanaki et al. |
| 2012/0329249 A1 | 12/2012 | Ahn et al. |
| 2013/0037960 A1 | 2/2013 | Sadaka et al. |
| 2013/0188324 A1 | 7/2013 | Lee et al. |
| 2013/0192574 A1 | 8/2013 | Dukkipati et al. |
| 2013/0203265 A1 | 8/2013 | Hsiao |
| 2013/0209731 A1 | 8/2013 | Nattermann et al. |
| 2013/0239617 A1 | 9/2013 | Dannoux |
| 2013/0270533 A1 | 10/2013 | Crispin et al. |
| 2013/0280495 A1 | 10/2013 | Matsumoto |
| 2014/0050911 A1 | 2/2014 | Mauro et al. |
| 2014/0106141 A1 | 4/2014 | Bellman et al. |
| 2014/0106150 A1 | 4/2014 | Decker et al. |
| 2014/0130969 A1 | 5/2014 | Mccutcheon et al. |
| 2014/0150244 A1 | 6/2014 | Liu et al. |
| 2014/0165654 A1 | 6/2014 | Bellman et al. |
| 2014/0166199 A1 | 6/2014 | Bellman et al. |
| 2014/0170378 A1 | 6/2014 | Bellman et al. |
| 2014/0210075 A1 | 7/2014 | Lee et al. |
| 2014/0220327 A1 | 8/2014 | Adib et al. |
| 2014/0295590 A1 | 10/2014 | Oh et al. |
| 2015/0060869 A1 | 3/2015 | Ro et al. |
| 2015/0060870 A1 | 3/2015 | Ro et al. |
| 2015/0086794 A1 | 3/2015 | Akita et al. |
| 2015/0099110 A1 | 4/2015 | Bellman et al. |
| 2015/0102498 A1 | 4/2015 | Enicks et al. |
| 2015/0266276 A1 | 9/2015 | Vissing et al. |
| 2015/0306847 A1 | 10/2015 | Bellman et al. |
| 2015/0329415 A1 | 11/2015 | Bellman et al. |
| 2016/0009958 A1 | 1/2016 | Moore et al. |
| 2016/0017196 A1 | 1/2016 | Moore et al. |
| 2016/0035764 A1 | 2/2016 | Watts |
| 2016/0083835 A1 | 3/2016 | Adib et al. |
| 2016/0211803 A1 | 7/2016 | Ji et al. |
| 2017/0036419 A1 | 2/2017 | Adib et al. |
| 2017/0182744 A1 | 6/2017 | Bellman et al. |
| 2017/0320771 A1 | 11/2017 | Adib et al. |
| 2018/0126705 A1 | 5/2018 | Adib et al. |

(56) References Cited

U.S. PATENT DOCUMENTS

| | | | |
|---|---|---|---|
| 2018/0269071 A1 | 9/2018 | Le et al. | |
| 2018/0297324 A1 | 10/2018 | Adib et al. | |

FOREIGN PATENT DOCUMENTS

| | | | |
|---|---|---|---|
| CN | 102070120 B | 9/2012 | |
| CN | 101916022 B | 10/2012 | |
| CN | 102789125 | 11/2012 | |
| CN | 102820262 A | 12/2012 | |
| CN | 103042803 A | 4/2013 | |
| CN | 102815052 B | 8/2016 | |
| DE | 10323303 A1 | 4/2004 | |
| DE | 10323304 A1 | 4/2004 | |
| GB | 1082116 | 7/1974 | |
| GB | 1373359 A | 11/1974 | |
| GB | 1373559 A | 11/1974 | |
| GB | 1583544 A | 1/1981 | |
| IN | 200906585 P1 | 5/2012 | |
| JP | 1993096235 A | 4/1993 | |
| JP | 2000241804 A | 9/2000 | |
| JP | 2002348150 A | 12/2002 | |
| JP | 2003071937 A | 3/2003 | |
| JP | 2003077187 A | 3/2003 | |
| JP | 2004-066664 A | 3/2004 | |
| JP | 2004178891 A | 6/2004 | |
| JP | 2005014599 A | 1/2005 | |
| JP | 2005300972 A | 10/2005 | |
| JP | 2006003684 A | 1/2006 | |
| JP | 2007138144 A | 6/2007 | |
| JP | 2008072087 A | 3/2008 | |
| JP | 2008123948 A | 5/2008 | |
| JP | 2009028922 A | 2/2009 | |
| JP | 2009028923 A | 2/2009 | |
| JP | 2009074002 A | 4/2009 | |
| JP | 2009-131732 A | 6/2009 | |
| JP | 2009184172 A | 8/2009 | |
| JP | 2009283155 A | 12/2009 | |
| JP | 2010018505 A | 1/2010 | |
| JP | 2010167484 A | 8/2010 | |
| JP | 2010-248011 A | 11/2010 | |
| JP | 201158579 A | 3/2011 | |
| JP | 2011048979 A | 3/2011 | |
| JP | 2011159697 | 8/2011 | |
| JP | 2011201976 A | 10/2011 | |
| JP | 2011201977 A | 10/2011 | |
| JP | 2011235532 A | 11/2011 | |
| JP | 2011235556 A | 11/2011 | |
| JP | 2011236349 A | 11/2011 | |
| JP | 2011248011 A | 12/2011 | |
| JP | 2012030424 A | 2/2012 | |
| JP | 2012035532 A | 2/2012 | |
| JP | 20121169611 A | 6/2012 | |
| JP | 2012166999 A | 9/2012 | |
| JP | 2012209545 A | 10/2012 | |
| JP | 2012227310 A | 11/2012 | |
| JP | 2012248011 A | 12/2012 | |
| JP | 2013010340 A | 1/2013 | |
| JP | 2013010342 A | 1/2013 | |
| JP | 2013184346 A | 9/2013 | |
| JP | 2013184872 A | 9/2013 | |
| JP | 2013207084 A | 10/2013 | |
| JP | 2013224475 | 10/2013 | |
| JP | 2014019597 A | 2/2014 | |
| JP | 2015093405 A | 5/2015 | |
| JP | 2015093795 A | 5/2015 | |
| JP | 2015116694 A | 6/2015 | |
| JP | 2015209471 A | 11/2015 | |
| JP | 2017-500753 A | 1/2017 | |
| KR | 2008113576 A | 12/2008 | |
| KR | 2010051499 A | 5/2010 | |
| KR | 10-2010-0112628 A | 10/2010 | |
| KR | 1002936 B1 | 12/2010 | |
| KR | 2011043376 A | 4/2011 | |
| KR | 20110045136 A | 5/2011 | |
| KR | 2011068352 A | 6/2011 | |
| KR | 1073032 B1 | 10/2011 |
| KR | 2012031698 A | 4/2012 |
| KR | 10-2012-0069608 A | 6/2012 |
| KR | 2012057346 A | 6/2012 |
| KR | 20120056227 A | 6/2012 |
| KR | 201120100274 A | 9/2012 |
| KR | 2013003997 A | 1/2013 |
| KR | 2013044774 A | 5/2013 |
| KR | 20130095605 A | 8/2013 |
| KR | 2013104534 A | 9/2013 |
| KR | 10-2015-0038177 A | 4/2015 |
| KR | 1522941 B1 | 5/2015 |
| TW | 201315593 A | 4/2013 |
| TW | 201545887 A | 12/2015 |
| WO | 95/17537 A1 | 6/1995 |
| WO | 2005048669 A1 | 5/2005 |
| WO | 2007121524 A1 | 11/2007 |
| WO | 2008/007622 A1 | 1/2008 |
| WO | 2008044884 A1 | 4/2008 |
| WO | 2010079688 A1 | 7/2010 |
| WO | 2010098762 A1 | 9/2010 |
| WO | 2010/128611 A1 | 11/2010 |
| WO | 2010129459 A2 | 11/2010 |
| WO | 2011142280 A1 | 11/2011 |
| WO | 2012144499 A1 | 10/2012 |
| WO | 2013044941 A1 | 4/2013 |
| WO | 2013058217 A1 | 4/2013 |
| WO | 2013119737 A2 | 8/2013 |
| WO | 2014050798 A1 | 4/2014 |
| WO | 2014163035 A1 | 10/2014 |
| WO | 2015113020 A1 | 7/2015 |
| WO | 2015113023 A1 | 7/2015 |
| WO | 2015119210 A1 | 8/2015 |
| WO | 2015156395 A1 | 10/2015 |
| WO | 2015157202 A1 | 10/2015 |
| WO | 2015163134 A1 | 10/2015 |
| WO | 2016017645 A1 | 2/2016 |
| WO | 2016/187186 A1 | 11/2016 |
| WO | 2016209897 A1 | 12/2016 |
| WO | 2018038961 A1 | 3/2018 |

OTHER PUBLICATIONS

2014 Gelest Brochure—Silane Coupling Agents Connecting Across Boundaries.

ASTM International E595-07, Standard Test Method for Total Mass Loss and Collected Volatile Condensable Materials from Outgassing in a Vacuum Environment (2013).

Biederman; "The Properties of Films Prepared by the RF Sputtering of PTFE and Plasma Polymerization of Some Freons"; Vacuum, vol. 31, No. 7, Jan. 1, 1981, pp. 285-289.

Boscher et al; "Influence of Cyclic Organosilicon Precursors on the Corrosion of Aluminium Coated Sheet by Atmospheric Pressure Dielectric Barrier Discharge"; Surface and Coatings Technology 205; (2011) 5350-5357.

Cech et al; "Surface-Free Energy of Silicon-Based Plasma Polymer Films"; Silanes and Other Coupling Agents, vol. 5, 2009; p. 333-348.

Chemraz® "Perfluoroelastomers—Seals That Withstand the Test of Time", Greene Tweed Medical & Biotechnology, 2000, 4 Pages.

Chiao et al; "Worldwide First Ultra-Thin LTPS-TFT LCD by a Glass on Carrier Technology"; V3, Submitted to SID 2015; 5 Pages.

Dupont Kalrez Perfluoroelastomer Parts—Physical Properties and Product Comparisons, Technical Information—Rev. 11, Sep. 2012; 4 Pages.

Girifalco et al; "A Theory for the Estimation of Surface and Interfacial Energies. I. Derivation and Application to Interfacial Tension"; Applied Science Research Lab, Cincinnati Ohio; vol. 61 (1956); pp. 904-909.

Haller; "Polymerization of Aromatic Silanes in RF Plasmas"; J. Electrochem Soc.: Solid-State Science and Technology; vol. 129, No. 1; Jan. 1982; p. 180-183.

Haque et al; "Preparation and Properties of Plasma-Deposited Films With Surface Energies Varying Over a Wide Range"; Journal of Applied Polymer Science, vol. 32, 4369-4381 (1986).

(56) References Cited

OTHER PUBLICATIONS

Iller, John Wiley and Sons; "The Surface Chemistry of Silica"; Chapter 6, 1979, pp. 622-656.
Jaszewski et al; "The Deposition of Anti-Adhesive Ultra-Thin Teflon-Like Films and Their Interaction With Polymers During Hot Embossing"; Applied Surface Science, 143 (1999) 301-308.
Kuritka et al., "Mass Spectrometry Characterization of Methylphenylsilane-Hydrogen RF Plasmas"; Plasma Process. Polym. 2007, 4, 53-61.
Merche et al; "Atmospheric Plasmas for Thin Film Deposition: A Critical Review"; Thin Solid Films 520, (2012) 4219-4236.
Nagai et al; "Structure and Morphology of Phenylsilanes Polymer Films Synthesized by the Plasma Polymerization Method"; Journal of Material Science 33, (1998); 1897-1905.
Nehlsen et al; "Gas Permeation Properties of Plasma Polymerized Thin Film Siloxane-Type Membranes for Temperature Up to 350° C."; Journal of Membrane Science; 106 (1995) 1-7.
Parker et al; "Surface Forces Between Plasma Polymer Films"; Langmuir 1994, 10, 276-2773.
Perlast G67P—Technical Data Sheet, Issue 4, Revision 1, Jan. 2006; 1 Page.
Salyk et al; "Plasma Polymerisation of Methylphenylsilane"; Surface & Coatings Technology, 20, (2005) pp. 486-489.
Shieh et al; "Modifications of Low Dielectric Constant Fluorinated Amorphous Carbon Films by Multiple Plasma Treatments"; J. Electro. Soc.; 149 (7) G384-G390 (2002).
Sindorf et al; "Cross-Polarization/Magic-Angle-Spinning Silicon-29 Nuclear Magnetic Resonance Study of Silica Gel Using Trimethylsilane Bonding as a Probe of Surface Geometry and Reactivity"; J. Phys. Chem. 1982, 86, 5208-85219.
Stoffels et al; "Polymerization of Fluorocarbons in Reactive Ion Etching Plasma"; Journal of Vacuum Science and Technology; Part A, AVS / AIP, Melville, NY, vol. 16, No, 1, Jan. 1, 1998, pp. 87-95.
Suratawal et al; "Surface Chemistry and Trimethylsilyl Functionalization of Stober Silica Sols"; Journal of Non-Crystalline Solids 316 (2003), pp. 349-363.
Hiltz; Techniques for the Characterization of Fluoroelastomers, Defence R&D Canada—Atlantic Technical Memorandum Dec. 2009; 52 Pages.
Terlingen et al; "Plasma Modification of Polymeric Surfaces for Biomedical Applications"; Advanced Biomaterials in Biomedical Engineering and Drug Delivery Systems, 1996; pp. 38-42.
Tillet et al; "Crosslinking of Fluoroelastomers by "Click" Azide-Nitride Cyloaddtion"; Journal of Polymer Science, Part A: Polymer Chemistry; 2015, 53, pp. 1171-1173.
Tong et al; "Reversible Silicon Wafer Bonding for Surface Protection: Water-Enhanced Debonding"; J. Electrochem. Soc., vol. 139, No. 11, Nov. 1992, p. L101-L102.
Trelleborg Sealing Solutions, ISOLAST® Perfluororelastomer Seals, Edition Nov. 2008; pp. 1-16; www.tss.trelleborg.com.
Van De Ven et al; "Deactivation With Silazanes in Chromatography, Mechanism of the Reaction and Practical Consequences in Capillary GC and RP-HPLC: A29SI CP-MAS NMR Study"; Journal of High Resolution Chromatography & Chromatography Communications; vol. 9, 1986; pp. 741-746.
Wang et al; "Dynamic Contact Angles and Contact Angle Hysteresis of Plasma Polymers"; Langmuir 1994, 10, pp. 3887-3897.
Wu, "Calculation of Interfacial Tension in Polymer Systems"; J. Polymer. Sci.: Part C, No. 34, pp. 19-30 (1971).
Zhuravlev; "The Surface Chemistry of Amorphous Silica. Zhuravlev Model"; Colloids and Surfaces A: Physicochemical and Engineering Aspects; 173 (2000) 1-38.
Morita et al; "Applications of Plasma Polymerization"; Pure & Appl. Chem., vol. 57, No. 9 pp. 1277-1286 (1985).
Lubguban, Jr. et al; "Low-K Organosilicate Films Prepared by Tetravinyltetramethylcyclotetrasiloxane", J. of Applied Physics, V92, N2, p. 1033-1038 , 2002.
Nouicer et al; "Superhydrophobic Surface Produced on Polyimide and Silicon by Plasma Enhanced Chemical Vapour Deposition From Hexamethyldisiloxane Precursor"; International Journal of Nanotechnology, vol. 12, Nos. 8/9, 2015; p. 597-607.
Rouessac et al; "Precursor Chemistry for ULK CVD", Microelectronic Engineering, V82, p. 333-340, 2005.
Groenewoud et al; "Plasma Polymerization of Thiophene Derivatives"; Langmuir, 2003, vol. 19, No. 4; pp. 1368-1374.
Lowe et al; "Plasma Polymerized P-Xylene as a Laser Fusion Target"; Surface Science, 1978, vol. 76, No. 1; pp. 242-256.
Weidman et al.; "New Photodefinable Glass Etch Masks for Entirely Dry Photolithography Plasma Deposited Organosilicon Hydride Polymers"; Appl. Phys. Lett. 62 (4), Jan. 25, 1993 pp. 372-374.
Japanese Patent Application No. 2019-138603 Notice of Grounds For Rejection dated Sep. 2, 2020; 10 Pages; (5 pages of English Translation and 5 pages of Original Document) Japanese Patent Office.
McMillian et al.; "Hydroxyl Sites in SiO2 Glass: A Note on Irfrared and Raman Spectra", American Mineralogist, vol. 71 pp. 772-778,1986.
Korean Patent Application No. 10-2016-7023172; Office Action dated Mar. 8, 2021; 6 Pages; Korean Patent Office.
Sohn, et al., "Effects of plasma polymerized para-xylene intermediate layers on characteristics of flexible organic light emitting diodes fabricated on polyethylene terephthalate substrates" Journal of Alloys and Compounds, 449, 191-195, 2008. (Year: 2008).

\* cited by examiner

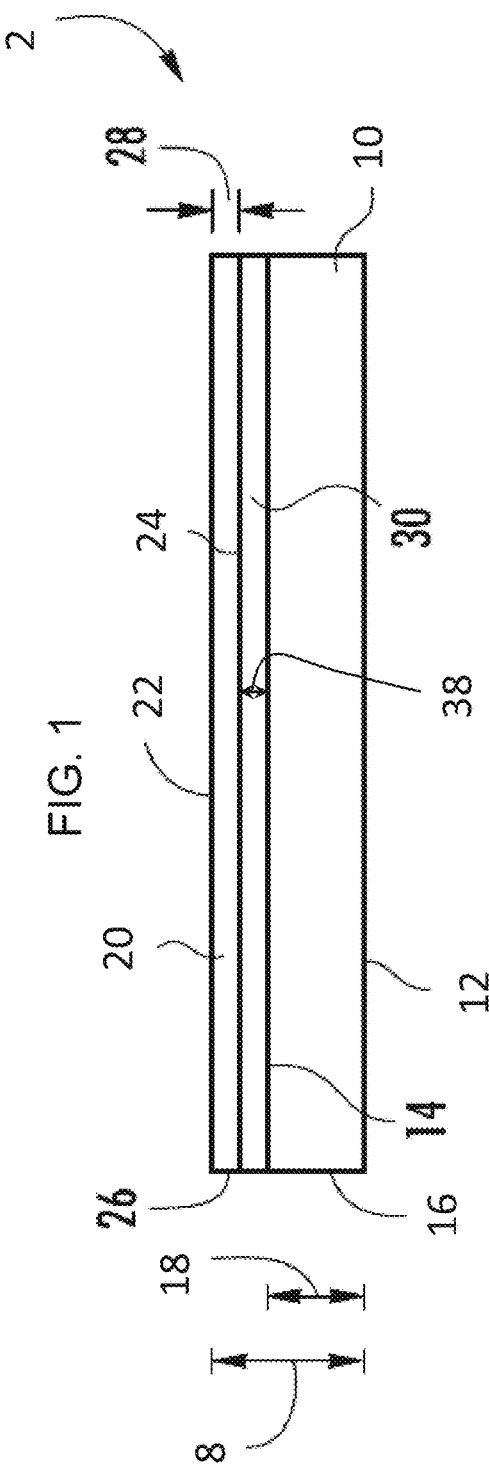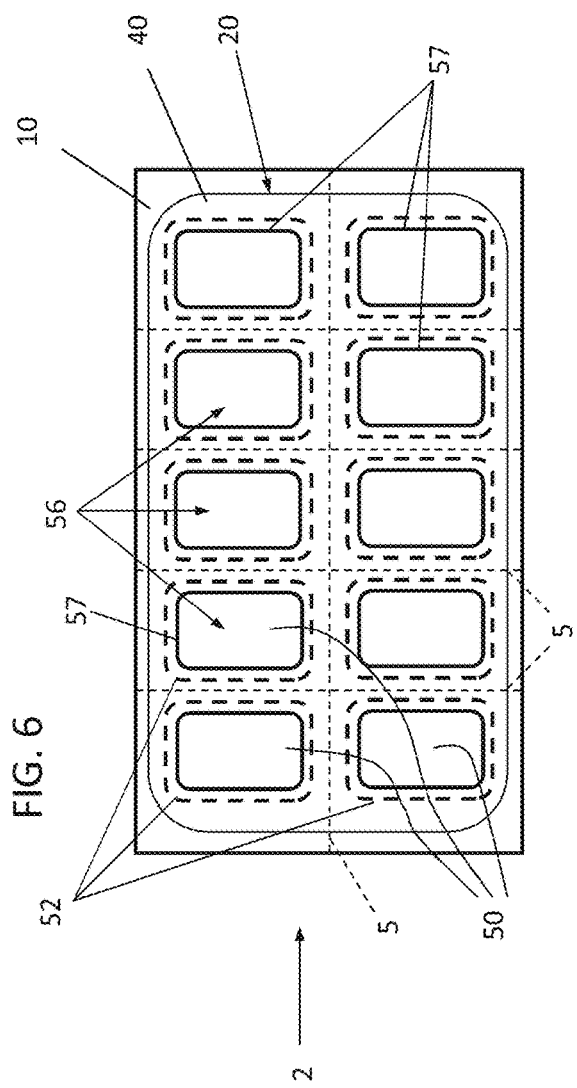

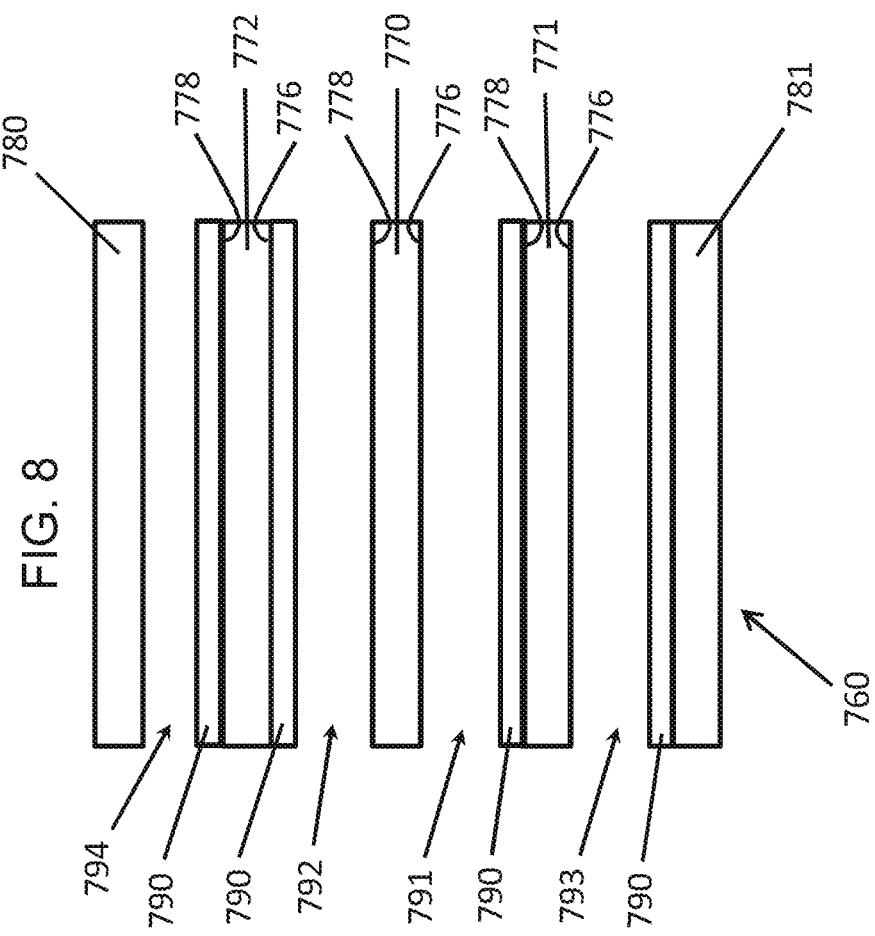
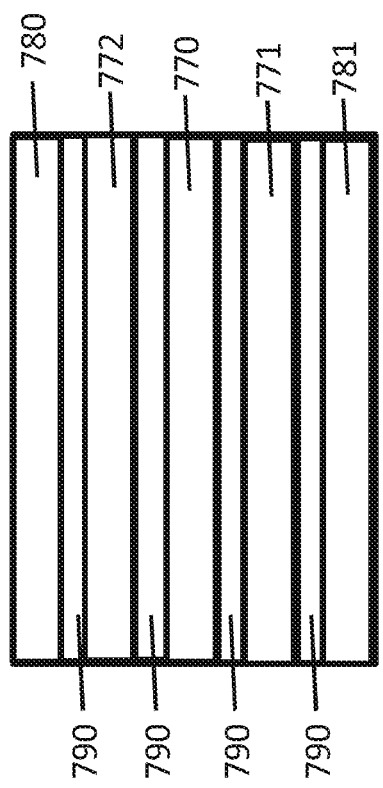

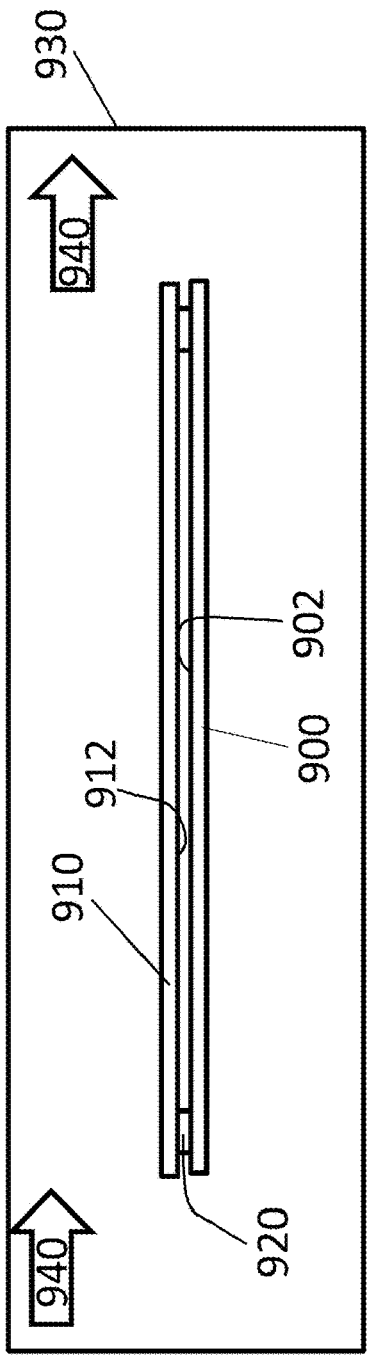
FIG. 9
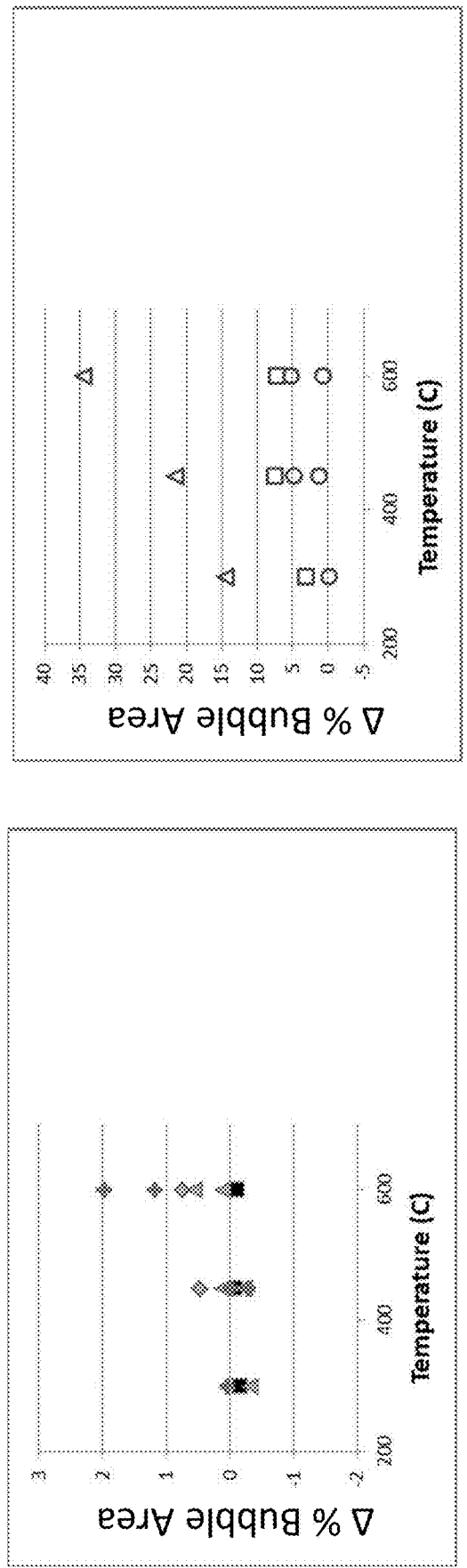
FIG. 12
FIG. 11

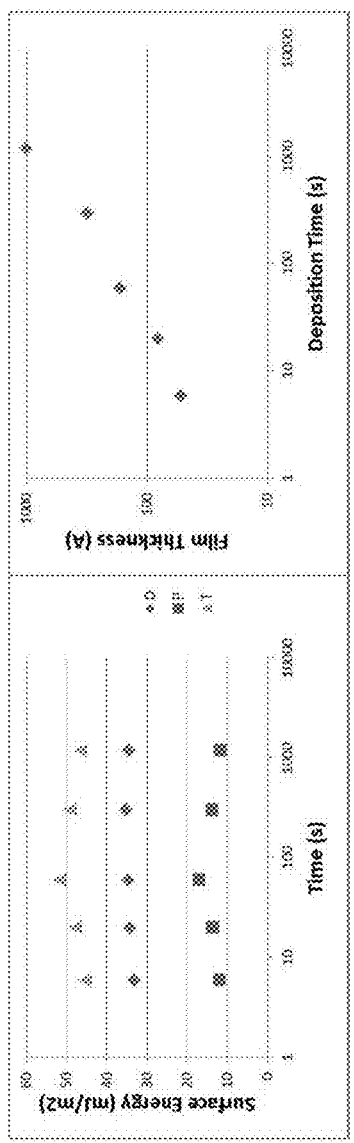
FIG. 15
FIG. 14
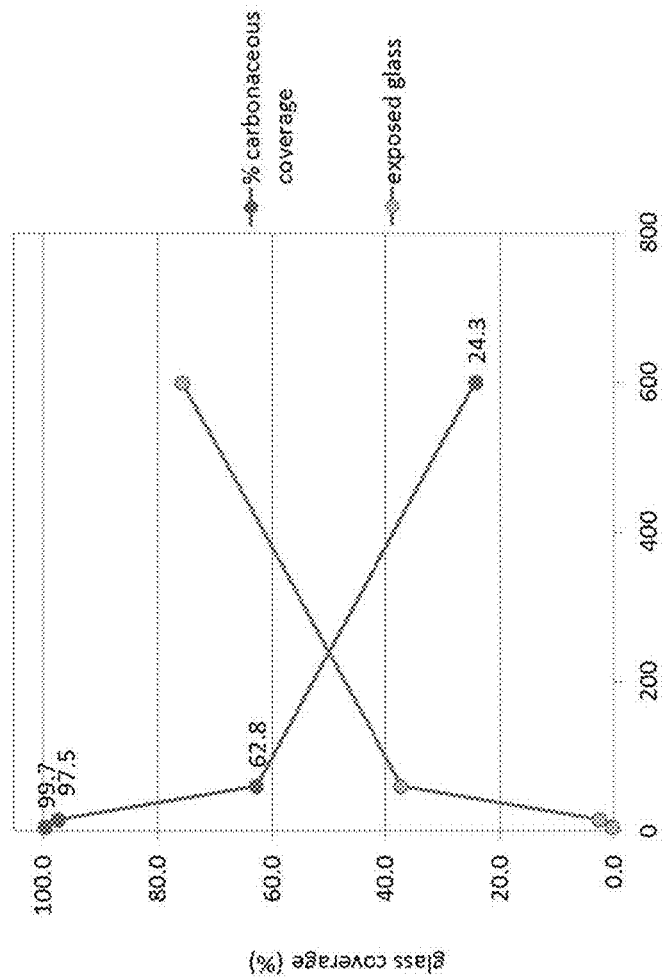
FIG. 17
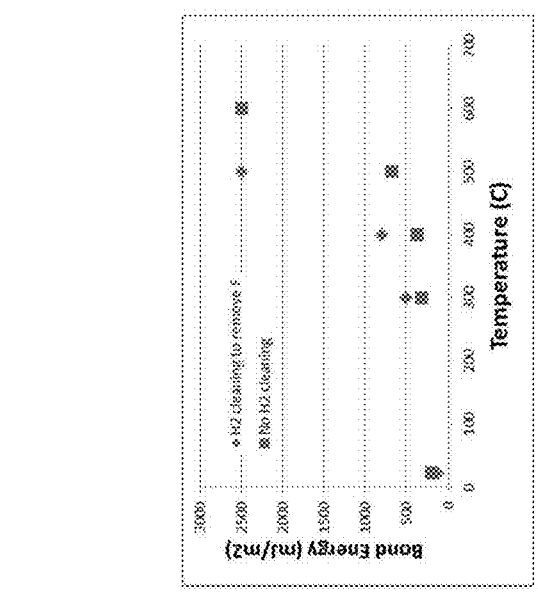
FIG. 16

ARTICLES AND METHODS FOR CONTROLLED BONDING OF THIN SHEETS WITH CARRIERS

CROSS-REFERENCE TO RELATED APPLICATIONS

This application is a divisional application and claims the benefit of priority under 35 U.S.C. § 120 of U.S. application Ser. No. 15/122,366 filed on Aug. 29, 2016, which in turn, claims the benefit of priority under 35 U.S.C. § 119 of U.S. Provisional Application Ser. No. 61/931,927 filed on Jan. 27, 2014, the contents of each of which are relied upon and incorporated herein by reference in their entireties.

FIELD OF THE INVENTION

The present invention is directed to articles and methods for processing flexible sheets on carriers and, more particularly to articles and methods for processing flexible glass sheets on glass carriers.

BACKGROUND

Flexible substrates offer the promise of cheaper devices using roll-to-roll processing, and the potential to make thinner, lighter, more flexible and durable displays. However, the technology, equipment, and processes required for roll-to-roll processing of high quality displays are not yet fully developed. Since panel makers have already heavily invested in toolsets to process large sheets of glass, laminating a flexible substrate to a carrier and making display devices by a sheet-to-sheet processing offers a shorter term solution to develop the value proposition of thinner, lighter, and more flexible displays. Displays have been demonstrated on polymer sheets for example polyethylene naphthalate (PEN) where the device fabrication was sheet to sheet with the PEN laminated to a glass carrier. The upper temperature limit of the PEN limits the device quality and process that can be used. In addition, the high permeability of the polymer substrate leads to environmental degradation of OLED devices where a near hermetic package is required. Thin film encapsulation offers the promise to overcome this limitation, but it has not yet been demonstrated to offer acceptable yields at large volumes.

In a similar manner, display devices can be manufactured using a glass carrier laminated to one or more thin glass substrates. It is anticipated that the low permeability and improved temperature and chemical resistance of the thin glass will enable higher performance longer lifetime flexible displays.

However, the thermal, vacuum, solvent and acidic, and ultrasonic, Flat Panel Display (FPD) processes require a robust bond for thin glass bound to a carrier. FPD processes typically involve vacuum deposition (sputtering metals, transparent conductive oxides and oxide semiconductors, Chemical Vapor Deposition (CVD) deposition of amorphous silicon, silicon nitride, and silicon dioxide, and dry etching of metals and insulators), thermal processes (including ~300-400° C. CVD deposition, up to 600° C. p-Si crystallization, 350-450° C. oxide semiconductor annealing, up to 650° C. dopant annealing, and ~200-350° C. contact annealing), acidic etching (metal etch, oxide semiconductor etch), solvent exposure (stripping photoresist, deposition of polymer encapsulation), and ultrasonic exposure (in solvent stripping of photoresist and aqueous cleaning, typically in alkaline solutions).

Adhesive wafer bonding has been widely used in Micromechanical Systems (MEMS) and semiconductor processing for back end steps where processes are less harsh. Commercial adhesives by Brewer Science and Henkel are typically thick polymer adhesive layers, 5-200 microns thick. The large thickness of these layers creates the potential for large amounts of volatiles, trapped solvents, and adsorbed species to contaminate FPD processes. These materials thermally decompose and outgas above ~250° C. The materials also may cause contamination in downstream steps by acting as a sink for gases, solvents and acids which can outgas in subsequent processes.

U.S. Provisional Application Ser. No. 61/596,727 filed on Feb. 8, 2012, entitled Processing Flexible Glass with a Carrier (hereinafter US '727) discloses that the concepts therein involve bonding a thin sheet, for example, a flexible glass sheet, to a carrier initially by van der Waals forces, then increasing the bond strength in certain regions while retaining the ability to remove portions of the thin sheet after processing the thin sheet/carrier to form devices (for example, electronic or display devices, components of electronic or display devices, organic light emitting device (OLED) materials, photo-voltaic (PV) structures, or thin film transistors), thereon. At least a portion of the thin glass is bonded to a carrier such that there is prevented device process fluids from entering between the thin sheet and carrier, whereby there is reduced the chance of contaminating downstream processes, i.e., the bonded seal portion between the thin sheet and carrier is hermetic, and in some preferred embodiments, this seal encompasses the outside of the article thereby preventing liquid or gas intrusion into or out of any region of the sealed article.

US '727 goes on to disclose that in low temperature polysilicon (LTPS) (low temperature compared to solid phase crystallization processing which can be up to about 750° C.) device fabrication processes, temperatures approaching 600° C. or greater, vacuum, and wet etch environments may be used. These conditions limit the materials that may be used, and place high demands on the carrier/thin sheet. Accordingly, what is desired is a carrier approach that utilizes the existing capital infrastructure of the manufacturers, enables processing of thin glass, i.e., glass having a thickness ≤0.3 mm thick, without contamination or loss of bond strength between the thin glass and carrier at higher processing temperatures, and wherein the thin glass de-bonds easily from the carrier at the end of the process.

One commercial advantage to the approach disclosed in US '727 is that, as noted in US '727, manufacturers will be able to utilize their existing capital investment in processing equipment while gaining the advantages of the thin glass sheets for PV, OLED, LCDs and patterned Thin Film Transistor (TFT) electronics, for example. Additionally, that approach enables process flexibility, including: that for cleaning and surface preparation of the thin glass sheet and carrier to facilitate bonding; that for strengthening the bond between the thin sheet and carrier at the bonded area; that for maintaining releasability of the thin sheet from the carrier at the non-bonded (or reduced/low-strength bond) area; and that for cutting the thin sheets to facilitate extraction from the carrier.

In the glass-to-glass bonding process, the glass surfaces are cleaned to remove all metal, organic and particulate residues, and to leave a mostly silanol terminated surface. The glass surfaces are first brought into intimate contact where van der Waals and/or Hydrogen-bonding forces pull them together. With heat and optionally pressure, the surface silanol groups condense to form strong covalent Si—O—Si bonds across the interface, permanently fusing the glass pieces. Metal, organic and particulate residue will prevent bonding by obscuring the surface preventing the intimate contact required for bonding. A high silanol surface concentration is also required to form a strong bond as the number of bonds per unit area will be determined by the probability of two silanol species on opposing surfaces reacting to condense out water. Zhuravlel has reported the average number of hydroxyls per $nm^2$ for well hydrated silica as 4.6 to 4.9. Zhuravlel, L. T., *The Surface Chemistry of Amorphous Silika, Zhuravlev Model*, Colloids and Surfaces A: Physiochemical Engineering Aspects 173 (2000) 1-38. In US '727, a non-bonding region is formed within a bonded periphery, and the primary manner described for forming such non-bonding area is increasing surface roughness. An average surface roughness of greater than 2 nm Ra can prevent glass to glass bonds forming during the elevated temperature of the bonding process. In U.S. Provisional Patent Application Ser. No. 61/736,880, filed on Dec. 13, 2012 by the same inventors and entitled Facilitated Processing for Controlling Bonding Between Sheet and Carrier (hereinafter US '880), a controlled bonding area is formed by controlling the van der Waals and/or hydrogen bonding between a carrier and a thin glass sheet, but a covalent bonding area is still used as well. Thus, although the articles and methods for processing thin sheets with carriers in US '727 and US '880 are able to withstand the harsh environments of FPD processing, undesirably for some applications, reuse of the carrier is prevented by the strong covalent bond between thin glass and glass carrier in the bonding region that is bonded by covalent, for example Si—O—Si, bonding with adhesive force ~1000-2000 $mJ/m^2$, on the order of the fracture strength of the glass. Prying or peeling cannot be used to separate the covalently bonded portion of the thin glass from the carrier and, thus, the entire thin sheet cannot be removed from the carrier. Instead, the non-bonded areas with the devices thereon are scribed and extracted leaving a bonded periphery of the thin glass sheet on the carrier.

SUMMARY

In light of the above, there is a need for a thin sheet— carrier article that can withstand the rigors of the FPD processing, including high temperature processing (without outgassing that would be incompatible with the semiconductor or display making processes in which it will be used), yet allow the entire area of the thin sheet to be removed (either all at once, or in sections) from the carrier so as to allow the reuse of the carrier for processing another thin sheet. The present specification describes ways to control the adhesion between the carrier and thin sheet to create a temporary bond sufficiently strong to survive FPD processing (including LTPS processing) but weak enough to permit debonding of the sheet from the carrier, even after high-temperature processing. Such controlled bonding can be utilized to create an article having a re-usable carrier, or alternately an article having patterned areas of controlled bonding and covalent bonding between a carrier and a sheet. More specifically, the present disclosure provides surface modification layers (including various materials and associated surface heat treatments), that may be provided on the thin sheet, the carrier, or both, to control both room-temperature van der Waals, and/or hydrogen, bonding and high temperature covalent bonding between the thin sheet and carrier. Even more specifically, the room-temperature bonding may be controlled so as to be sufficient to hold the thin sheet and carrier together during vacuum processing, wet processing, and/or ultrasonic cleaning processing. And at the same time, the high temperature covalent bonding may be controlled so as to prevent a permanent bond between the thin sheet and carrier during high temperature processing, as well as maintain a sufficient bond to prevent delamination during high temperature processing. In alternative embodiments, the surface modification layers may be used to create various controlled bonding areas (wherein the carrier and sheet remain sufficiently bonded through various processes, including vacuum processing, wet processing, and/or ultrasonic cleaning processing), together with covalent bonding regions to provide for further processing options, for example, maintaining hermeticity between the carrier and sheet even after dicing the article into smaller pieces for additional device processing. Still further, some surface modification layers provide control of the bonding between the carrier and sheet while, at the same time, reduce outgassing emissions during the harsh conditions in an FPD (for example LTPS) processing environment, including high temperature and/or vacuum processing, for example. Still further yet, in alternative embodiments, some surface modification layers may be used on a carrier having a glass bonding surface to controllably bond a thin sheet having a polymer bonding surface. The polymer bonding surface may be part of a polymer thin sheet on which electronic or other structures are formed or, alternatively, the polymer bonding surface may be part of a composite sheet comprising a glass layer on which the electronic or other structures are formed.

Additional features and advantages will be set forth in the detailed description which follows, and in part will be readily apparent to those skilled in the art from the description or recognized by practicing the various aspects as exemplified in the written description and the appended drawings. It is to be understood that both the foregoing general description and the following detailed description are merely exemplary of the various aspects, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features disclosed in this specification and in the drawings can be used in any and all combinations. By way of non-limiting example the various features may be combined with one another as set forth in the appended claims.

BRIEF DESCRIPTION OF THE DRAWINGS

FIG. 1 is a schematic side view of an article having carrier bonded to a thin sheet with a surface modification layer therebetween.

FIG. 6 is a schematic top view of a thin sheet bonded to a carrier by bonding areas.

FIG. 7 is a schematic side view of a stack of glass sheets

FIG. 8 is an exploded view of one embodiment of the stack in FIG. 7.

FIG. 9 is a schematic view of a testing setup

FIG. 11 is a graph of change in % bubble area versus temperature for a variety of materials.

FIG. 12 is another graph of change in % bubble area versus temperature for a variety of materials.

FIG. 14 is a graph of surface energy versus deposition time for a surface modification layer.

FIG. 15 is graph of thickness versus deposition time, on a log-log scale, for a surface modification layer.

FIG. 16 is a graph of surface energy versus treatment temperature for different surface modification layers.

FIG. 17 is a graph of surface modification layer surface coverage.

DETAILED DESCRIPTION

Figure 2:
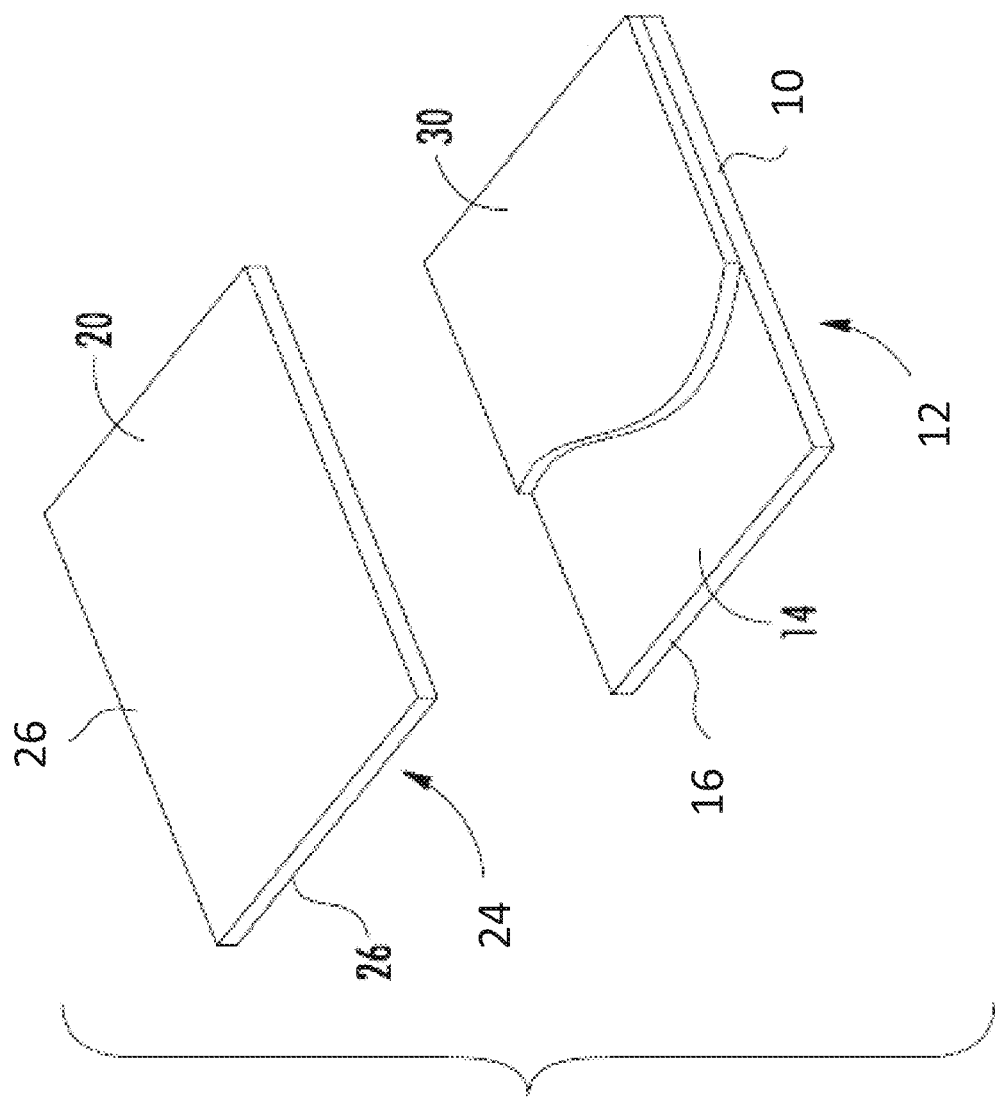
FIG. 2 is an exploded and partially cut-away view of the article in FIG. 1.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to a "component" includes aspects having two or more such components, unless the context clearly indicates otherwise.

In both US '727, and US '880, there are provided solutions for allowing the processing of a thin glass sheet on a carrier, whereby at least portions of the thin glass sheet remain "non-bonded" so that devices processed on the thin glass sheet may be removed from the carrier. However, the periphery of the thin glass is permanently (or covalently, or hermetically) bonded to the carrier glass through the formation of covalent Si—O—Si bonds. This covalently bonded perimeter prevents reuse of the carrier, as the thin glass cannot be removed in this permanently bonded zone without damaging the thin glass and carrier.

In order to maintain advantageous surface shape characteristics, the carrier is typically a display grade glass substrate. Accordingly, in some situations, it is wasteful and expensive to merely dispose of the carrier after one use. Thus, in order to reduce costs of display manufacture, it is desirable to be able to reuse the carrier to process more than one thin sheet substrate. The present disclosure sets forth articles and methods for enabling a thin sheet to be processed through the harsh environment of the FPD processing lines, including high temperature processing—wherein high temperature processing is processing at a temperature ≥400° C., and may vary depending upon the type of device being made, for example, temperatures up to about 450° C. as in amorphous silicon or amorphous indium gallium zinc oxide (IGZO) backplane processing, up to about 500-550° C. as in crystalline IGZO processing, or up to about 600-650° C. as is typical in LTPS processes—and yet still allows the thin sheet to be easily removed from the carrier without damage (for example, wherein one of the carrier and the thin sheet breaks or cracks into two or more pieces) to the thin sheet or carrier, whereby the carrier may be reused.

As shown in FIGS. 1 and 2, an article 2 has a thickness 8, and includes a carrier 10 having a thickness 18, a thin sheet 20 (i.e., one having a thickness of ≤300 microns, including but not limited to thicknesses of, for example, 10-50 microns, 50-100 microns, 100-150 microns, 150-300 microns, 300, 250, 200 190, 180, 170, 160, 150 140, 130, 120 110 100, 90, 80, 70, 60, 50, 40 30, 20, or 10, microns) having a thickness 28, and a surface modification layer 30 having a thickness 38. The article 2 is designed to allow the processing of thin sheet 20 in equipment designed for thicker sheets (i.e., those on the order of ≥0.4 mm, e.g., 0.4 mm, 0.5 mm, 0.6 mm, 0.7 mm, 0.8 mm, 0.9 mm, or 1.0 mm) although the thin sheet 20 itself is ≤300 microns. That is, the thickness 8, which is the sum of thicknesses 18, 28, and 38, is designed to be equivalent to that of the thicker sheet for which a piece of equipment—for example, equipment designed to dispose electronic device components onto substrate sheets—was designed to process. For example, if the processing equipment was designed for a 700 micron sheet, and the thin sheet had a thickness 28 of 300 microns, then thickness 18 would be selected as 400 microns, assuming that thickness 38 is negligible. That is, the surface modification layer 30 is not shown to scale; instead, it is greatly exaggerated for sake of illustration only. Additionally, the surface modification layer is shown in cut-away. In actuality, the surface modification layer would be disposed uniformly over the bonding surface 14 when providing a reusable carrier. Typically, thickness 38 will be on the order of nanometers, for example 0.1 to 2.0, or up to 10 nm, and in some instances may be up to 100 nm. The thickness 38 may be measured by ellipsometer. Additionally, the presence of a surface modification layer may be detected by surface chemistry analysis, for example by ToF Sims mass spectrometry. Accordingly, the contribution of thickness 38 to the article thickness 8 is negligible and may be ignored in the calculation for determining a suitable thickness 18 of carrier 10 for processing a given thin sheet 20 having a thickness 28. However, to the extent that surface modification layer 30 has any significant thickness 38, such may be accounted for in determining the thickness 18 of a carrier 10 for a given thickness 28 of thin sheet 20, and a given thickness for which the processing equipment was designed.

Carrier 10 has a first surface 12, a bonding surface 14, a perimeter 16, and thickness 18. Further, the carrier 10 may be of any suitable material including glass, for example. The carrier need not be glass, but instead can be ceramic, glass-ceramic, or metal (as the surface energy and/or bonding may be controlled in a manner similar to that described below in connection with a glass carrier). If made of glass, carrier 10 may be of any suitable composition including alumino-silicate, boro-silicate, alumino-boro-silicate, soda-lime-silicate, and may be either alkali containing or alkali-free depending upon its ultimate application. Thickness 18 may be from about 0.2 to 3 mm, or greater, for example 0.2, 0.3, 0.4, 0.5, 0.6, 0.65, 0.7, 1.0, 2.0, or 3 mm, or greater, and will depend upon the thickness 28, and thickness 38 when such is non-negligible, as noted above. Additionally, the carrier 10 may be made of one layer, as shown, or multiple layers (including multiple thin sheets of the same or a different material) that are bonded together. Further, the carrier may be of a Gen 1 size or larger, for example, Gen 2, Gen 3, Gen 4, Gen 5, Gen 8 or larger (e.g., sheet sizes from 100 mm×100 mm to 3 meters×3 meters or greater).

The thin sheet 20 has a first surface 22, a bonding surface 24, a perimeter 26, and thickness 28. Perimeters 16 and 26 may be of any suitable shape, may be the same as one another, or may be different from one another. Further, the thin sheet 20 may be of any suitable material including glass, ceramic, or glass-ceramic, for example. In some instances, the thin sheet 20 may be a polymer or a composite sheet having polymer and/or glass bonding surfaces. When made of glass, thin sheet 20 may be of any suitable composition, including alumino-silicate, boro-silicate, alumino-boro-silicate, soda-lime-silicate, and may be either alkali containing or alkali free depending upon its ultimate application. The coefficient of thermal expansion of the thin sheet could be matched relatively closely with that of the carrier to prevent warping of the article during processing at elevated temperatures. When the article 2 is processed at lower temperatures, where CTE matching is not such a concern, then a polymer thin sheet can be used with a glass carrier. Of course, there may be other instances where a polymer sheet may be used with a glass carrier. The thickness 28 of the thin sheet 20 is 300 microns or less, as noted above. Further, the thin sheet may be of a Gen 1 size or larger, for example, Gen 2, Gen 3, Gen 4, Gen 5, Gen 8 or larger (e.g., sheet sizes from 100 mm×100 mm to 3 meters×3 meters or greater).

Not only does the article 2 need to have the correct thickness to be processed in the existing equipment, sometimes it will also need to be able to survive the harsh environment in which the processing takes place. For example, flat panel display (FPD) processing may include wet ultrasonic, vacuum, and in some instances high temperature (e.g., ≥400° C.), processing. For some processes, as noted above, the temperature may be ≥500° C., or ≥600° C., and up to 650° C.

In order to survive the harsh environment in which article 2 will be processed, as during FPD manufacture for example, the bonding surface 14 should be bonded to bonding surface 24 with sufficient strength so that the thin sheet 20 does not separate from carrier 10. And this strength should be maintained through the processing so that the thin sheet 20 does not separate from the carrier 10 during processing. Further, to allow the thin sheet 20 to be removed from carrier 10 (so that carrier 10 may be reused), the bonding surface 14 should not be bonded to bonding surface 24 too strongly either by the initially designed bonding force, and/or by a bonding force that results from a modification of the initially designed bonding force as may occur, for example, when the article undergoes processing at high temperatures, e.g., temperatures of ≥400° C. The surface modification layer 30 may be used to control the strength of bonding between bonding surface 14 and bonding surface 24 so as to achieve both of these objectives. The controlled bonding force is achieved by controlling the contributions of van der Waals (and/or hydrogen bonding) and covalent attractive energies to the total adhesion energy which is controlled by modulating the polar and non-polar surface energy components of the thin sheet 20 and the carrier 10. This controlled bonding is strong enough to survive FPD processing (including wet, ultrasonic, vacuum, and thermal processes including temperatures ≥400° C., and in some instances, processing temperatures of ≥500° C., or ≥600° C., and up to 650° C.) and remain de-bondable by application of sufficient separation force and yet by a force that will not cause catastrophic damage to the thin sheet 20 and/or the carrier 10. Such de-bonding permits removal of thin sheet 20 and the devices fabricated thereon, and also allows for re-use of the carrier 10.

Although the surface modification layer 30 is shown as a solid layer between thin sheet 20 and carrier 10, such need not be the case. For example, the layer 30 may be on the order of 0.1 to 2 nm thick, and may not completely cover every bit of the bonding surface 14. For example, the coverage may be ≤100%, from 1% to 100%, from 10% to 100%, from 20% to 90%, or from 50% to 90%. In other embodiments, the layer 30 may be up to 10 nm thick, or in other embodiments even up to 100 nm thick. The surface modification layer 30 may be considered to be disposed between the carrier 10 and thin sheet 20 even though it may not contact one or the other of the carrier 10 and thin sheet 20. In any event, an important aspect of the surface modification layer 30 is that it modifies the ability of the bonding surface 14 to bond with bonding surface 24, thereby controlling the strength of the bond between the carrier 10 and the thin sheet 20. The material and thickness of the surface modification layer 30, as well as the treatment of the bonding surfaces 14, 24 prior to bonding, can be used to control the strength of the bond (energy of adhesion) between carrier 10 and thin sheet 20.

In general, the energy of adhesion between two surfaces is given by ("A theory for the estimation of surface and interfacial energies. I. derivation and application to interfacial tension", L. A. Girifalco and R. J. Good, J. Phys. Chem., V 61, p 904):

$$W = \gamma_1 + \gamma_2 - \gamma_{12} \quad (1)$$

where $\gamma_1$, $\gamma_2$ and $\gamma_{12}$ are the surface energies of surface 1, surface 2 and the interfacial energy of surface 1 and 2 respectively. The individual surface energies are usually a combination of two terms; a dispersion component $\gamma^d$, and a polar component $\gamma^p$ $$\gamma = \gamma^d + \gamma^p \quad (2)$$

When the adhesion is mostly due to London dispersion forces ($\gamma^d$) and polar forces for example hydrogen bonding ($\gamma^p$), the interfacial energy could be given by (Girifalco and R. J. Good, as mentioned above):

$$\gamma_{12}=\gamma_1+\gamma_2-2\sqrt{\gamma_1^d\gamma_2^d}-2\sqrt{\gamma_1^p\gamma_2^p} \quad (3)$$

After substituting (3) in (1), the energy of adhesion could be approximately calculated as:

$$W\sim 2[\sqrt{\gamma_1^d\gamma_2^d}+\sqrt{\gamma_1^p\gamma_2^p}] \quad (4)$$

In the above equation (4), only van der Waal (and/or hydrogen bonding) components of adhesion energies are considered. These include polar-polar interaction (Keesom), polar-non polar interaction (Debye) and nonpolar-nonpolar interaction (London). However, other attractive energies may also be present, for example covalent bonding and electrostatic bonding. So, in a more generalized form, the above equation is written as:

$$W\sim 2[\sqrt{\gamma_1^d\gamma_2^d}+\sqrt{\gamma_1^p\gamma_2^p}]+w_c+w_e \quad (5)$$

where $w_c$ and $w_e$ are the covalent and electrostatic adhesion energies. The covalent adhesion energy is rather common, as in silicon wafer bonding where an initially hydrogen bonded pair of wafers are heated to a higher temperature to convert much or all the silanol-silanol hydrogen bonds to Si—O—Si covalent bonds. While the initial, room temperature, hydrogen bonding produces an adhesion energy of the order of ~100-200 mJ/m² which allows separation of the bonded surfaces, a fully covalently bonded wafer pair as achieved during high temperature processing (on the order of 400 to 800° C.) has adhesion energy of ~1000-3000 mJ/m² which does not allow separation of the bonded surfaces; instead, the two wafers act as a monolith. On the other hand, if both the surfaces are perfectly coated with a low surface energy material, for example a fluoropolymer, with thickness large enough to shield the effect of the underlying substrate, the adhesion energy would be that of the coating material, and would be very low leading to low or no adhesion between the bonding surfaces 14, 24, whereby the thin sheet 20 would not be able to be processed on carrier 10. Consider two extreme cases: (a) two standard clean 1 (SC1, as known in the art) cleaned glass surfaces saturated with silanol groups bonded together at room temperature via hydrogen bonding (whereby the adhesion energy is ~100-200 mJ/m²) followed by heating to high temperature which converts the silanol groups to covalent Si—O—Si bonds (whereby the adhesion energy becomes 1000-3000 mJ/m²). This latter adhesion energy is too high for the pair of glass surfaces to be detachable; and (b) two glass surfaces perfectly coated with a fluoropolymer with low surface adhesion energy (~12 mJ/m² per surface) bonded at room temperature and heated to high temperature. In this latter case (b), not only do the surfaces not bond (because the total adhesion energy of ~24 mJ/m², when the surfaces are put together, is too low), they do not bond at high temperature either as there are no (or too few) polar reacting groups. Between these two extremes, a range of adhesion energies exist, for example between 50-1000 mJ/m², which can produce the desired degree of controlled bonding. Accordingly, the inventors have found various manners of providing a tunable surface modification layer 30 leading to an adhesion energy that is between these two extremes, and such that there can be produced a controlled bonding that is sufficient enough to maintain a pair of glass substrates (for example a glass carrier 10 and a thin glass sheet 20) bonded to one another through the rigors of FPD processing but also of a degree that (even after high temperature processing of, e.g. ≥400° C.) allows the detachment of the thin sheet 20 from the carrier 10 after processing is complete. Moreover, the detachment of the thin sheet 20 from the carrier 10 can be performed by mechanical forces, and in such a manner that there is no catastrophic damage to at least the thin sheet 20, and preferably also so that there is no catastrophic damage to the carrier 10.

Equation (5) describes that the adhesion energy is a function of four surface energy parameters plus the covalent and electrostatic energy, if any.

An appropriate adhesion energy can be achieved by judicious choice of surface modifiers, i.e., of surface modification layer 30, and/or thermal treatment of the surfaces prior to bonding. The appropriate adhesion energy may be attained by the choice of chemical modifiers of either one or both of bonding surface 14 and bonding surface 24, which in turn control both the van der Waal (and/or hydrogen bonding, as these terms are used interchangeably throughout the specification) adhesion energy as well as the likely covalent bonding adhesion energy resulting from high temperature processing (e.g., on the order of ≥400° C.). For example, taking a bonding surface of SC1 cleaned glass (that is initially saturated with silanol groups with high polar component of surface energy), and coating it with a low energy fluoropolymer provides a control of the fractional coverage of the surface by polar and non-polar groups. This not only offers control of the initial van der Waals (and/or hydrogen) bonding at room temperature, but also provides control of the extent/degree of covalent bonding at higher temperature. Control of the initial van der Waals (and/or hydrogen) bonding at room temperature is performed so as to provide a bond of one surface to the other to allow vacuum and or spin-rinse-dry (SRD) type processing, and in some instances also an easily formed bond of one surface to the other—wherein the easily formed bond can be performed at room temperature without application of externally applied forces over the entire area of the thin sheet 20 as is done in pressing the thin sheet 20 to the carrier 10 with a squeegee, or with a reduced pressure environment. That is, the initial van der Waals bonding provides at least a minimum degree of bonding holding the thin sheet and carrier together so that they do not separate if one is held and the other is allowed to be subjected to the force of gravity. In most cases, the initial van der Walls (and/or hydrogen) bonding will be of such an extent that the article may also go through vacuum, SRD, and ultrasonic processing without the thin sheet delaminating from the carrier. This precise control of both van der Waal (and/or hydrogen bonding) and covalent interactions at appropriate levels via surface modification layer 30 (including the materials from which it is made and/or the surface treatment of the surface to which it is applied), and/or by heat treatment of the bonding surfaces prior to bonding them together, achieves the desired adhesion energy that allows thin sheet 20 to bond with carrier 10 throughout FPD style processing, while at the same time, allowing the thin sheet 20 to be separated (by an appropriate force avoiding damage to the thin sheet 20 and/or carrier) from the carrier 10 after FPD style processing. In addition, in appropriate circumstances, electrostatic charge could be applied to one or both glass surfaces to provide another level of control of the adhesion energy.

FPD processing for example p-Si and oxide TFT fabrication typically involve thermal processes at temperatures above 400° C., above 500° C., and in some instances at or above 600° C., up to 650° C. which would cause glass to glass bonding of a thin glass sheet 20 with a glass carrier 10 in the absence of surface modification layer 30. Therefore controlling the formation of Si—O—Si bonding leads to a reusable carrier. One method of controlling the formation of Si—O—Si bonding at elevated temperature is to reduce the concentration of surface hydroxyls on the surfaces to be bonded.

Figure 3:
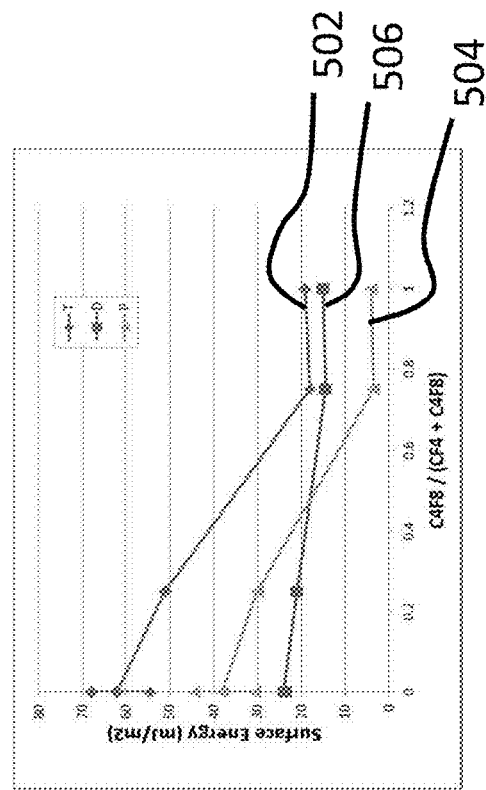
FIG. 3 is a graph of surface hydroxyl concentration on silica as a function of temperature.

As shown in FIG. 3, which is Iler's plot (R. K. Iler: The Chemistry of Silica (Wiley-Interscience, New York, 1979) of surface hydroxyl concentration on silica as a function of temperature, the number of hydroxyls (OH groups) per square nm decreases as the temperature of the surface increases. Thus, heating a silica surface (and by analogy a glass surface, for example bonding surface 14 and/or bonding surface 24) reduces the concentration of surface hydroxyls, decreasing the probability that hydroxyls on two glass surfaces will interact. This reduction of surface hydroxyl concentration in turn reduces the Si—O—Si bonds formed per unit area, lowering the adhesive force. However, eliminating surface hydroxyls requires long annealing times at high temperatures (above 750° C. to completely eliminate surface hydroxyls). Such long annealing times and high annealing temperatures result in an expensive process, and one which is not practical as it is likely to be above the strain point of typical display glass.

From the above analysis, the inventors have found that an article including a thin sheet and a carrier, suitable for FPD processing (including LTPS processing), can be made by balancing the following three concepts:

(1) Modification of the carrier and/or thin sheet bonding surface(s), by controlling initial room temperature bonding, which can be done by controlling van der Waals (and/or hydrogen) bonding, to create a moderate adhesion energy (for example, having a surface energy of >40 mJ/m$^2$ per surface prior to the surfaces being bonded) to facilitate initial room temperature bonding, and sufficient to survive non-high-temperature FPD processes, for example, vacuum processing, SRD processing, and/or ultrasonic processing;

(2) Surface modification of a carrier and/or a thin sheet in a manner that is thermally stable to survive FPD processes without outgassing which can cause delamination and/or unacceptable contamination in the device fabrication, for example, contamination unacceptable to the semiconductor and/or display making processes in which the article may be used; and (3) Controlling bonding at high temperatures, which can be done by controlling the carrier surface hydroxyl concentration, and concentration of other species capable of forming strong covalent bonds at elevated temperatures (e.g., temperature ≥400° C.), whereby there can be controlled the bonding energy between the bonding surfaces of the carrier and the thin sheet such that even after high temperature processing (especially through thermal processes in the range of 500-650° C., as in FPD processes) the adhesive force between the carrier and thin sheet remains within a range that allows debonding of the thin sheet from the carrier with a separation force that does not damage at least the thin sheet (and preferably that does not damage either the thin sheet or the carrier), and yet sufficient enough to maintain the bond between the carrier and thin sheet so that they do not delaminate during processing.

Further, the inventors have found that the use of a surface modification layer 30, together with bonding surface preparation as appropriate, can balance the above concepts so as readily to achieve a controlled bonding area, that is, a bonding area that provides a sufficient room-temperature bond between the thin sheet 20 and carrier 10 to allow the article 2 to be processed in FPD type processes (including vacuum and wet processes), and yet one that controls covalent bonding between the thin sheet 20 and carrier 10 (even at elevated temperatures ≥400° C.) so as to allow the thin sheet 20 to be removed from the carrier 10 (without damage to at least the thin sheet, and preferably without damage to the carrier also) after the article 2 has finished high temperature processing, for example, FPD type processing or LTPS processing. To evaluate potential bonding surface preparations, and surface modification layers, that would provide a reusable carrier suitable for FPD processing, a series of tests were used. Different FPD applications have different requirements, but LTPS and Oxide TFT processes appear to be the most stringent at this time and, thus, tests representative of steps in these processes were chosen, as these are desired applications for the article 2. Vacuum processes, wet cleaning (including SRD and ultrasonic type processes) and wet etching are common to many FPD applications. Typical aSi TFT fabrication requires processing up to 320° C. Annealing at 400° C. is used in oxide TFT processes, whereas crystallization and dopant activation steps over 600° C. are used in LTPS processing. Accordingly, the following five tests were used to evaluate the likelihood that a particular bonding surface preparation and surface modification layer 30 would allow a thin sheet 20 to remain bonded to a carrier 10 throughout FPD processing, while allowing the thin sheet 20 to be removed from the carrier 10 (without damaging the thin sheet 20 and/or the carrier 10) after such processing (including processing at temperatures ≥400° C.). The tests were performed in order, and a sample progressed from one test to the next unless there was failure of the type that would not permit the subsequent testing.

(1) Vacuum testing. Vacuum compatibility testing was performed in an STS Multiplex PECVD loadlock (available from SPTS, Newport, UK)—The loadlock was pumped by an Ebara A10S dry pump with a soft pump valve (available from Ebara Technologies Inc., Sacramento, Calif. A sample was placed in the loadlock, and then the loadlock was pumped from atmospheric pressure down to 70 mTorr in 45 sec. Failure, indicated by a notation of "F" in the "Vacuum" column of the tables below, was deemed to have occurred if there was: (a) a loss of adhesion between the carrier and the thin sheet (by visual inspection with the naked eye, wherein failure was deemed to have occurred if the thin sheet had fallen off of the carrier or was partially debonded therefrom); (b) bubbling between the carrier and the thin sheet (as determined by visual inspection with the naked eye— samples were photographed before and after the processing, and then compared, failure was determined to have occurred if defects increased in size by dimensions visible to the unaided eye); or (c) movement of the thin sheet relative to the carrier (as determined by visual observation with the naked eye—samples were photographed before and after testing, wherein failure was deemed to have occurred if there was a movement of bond defects, e.g., bubbles, or if edges debonded, or if there was a movement of the thin sheet on the carrier). In the tables below, a notation of "P" in the "Vacuum" column indicates that the sample did not fail as per the foregoing criteria.

(2) Wet process testing. Wet processes compatibility testing was performed using a Semitool model SRD-470S (available from Applied Materials, Santa Clara, Calif.). The testing consisted of 60 seconds 500 rpm rinse, Q-rinse to 15 MOhm-cm at 500 rpm, 10 seconds purge at 500 rpm, 90 seconds dry at 1800 rpm, and 180 seconds dry at 2400 rpm under warm flowing nitrogen. Failure, as indicated by a notation of "F" in the "SRD" column of the tables below, was deemed to have occurred if there was: (a) a loss of adhesion between the carrier and the thin sheet (by visual inspection with the naked eye, wherein failure was deemed to have occurred if the thin sheet had fallen off of the carrier or was partially debonded therefrom); (b) bubbling between the carrier and the thin sheet (as determined by visual inspection with the naked eye—samples were photographed before and after the processing, and then compared, failure was determined to have occurred if defects increased in size by dimensions visible to the unaided eye); or (c) movement of the thin sheet relative to the carrier (as determined by visual observation with the naked eye—samples were photographed before and after testing, wherein failure was deemed to have occurred if there was a movement of bond defects, e.g., bubbles, or if edges debonded, or if there was a movement of the thin sheet on the carrier); or (d) penetration of water under the thin sheet (as determined by visual inspection with an optical microscope at 50×, wherein failure was determined to have occurred if liquid or residue was observable). In the tables below, a notation of "P" in the "SRD" column indicates that the sample did not fail as per the foregoing criteria.

(3) Temperature to 400° C. testing. 400° C. process compatibility testing was performed using an Alwin21 Accuthermo610 RTP (available from Alwin21, Santa Clara Calif. A carrier with a thin sheet bonded thereto was heated in a chamber cycled from room temperature to 400° C. at 6.2° C./min, held at 400° C. for 600 seconds, and cooled at 1° C./min to 300° C. The carrier and thin sheet were then allowed to cool to room temperature. Failure, as indicated by a notation of "F" in the "400° C." column of the tables below, was deemed to have occurred if there was: (a) a loss of adhesion between the carrier and the thin sheet (by visual inspection with the naked eye, wherein failure was deemed to have occurred if the thin sheet had fallen off of the carrier or was partially debonded therefrom); (b) bubbling between the carrier and the thin sheet (as determined by visual inspection with the naked eye—samples were photographed before and after the processing, and then compared, failure was determined to have occurred if defects increased in size by dimensions visible to the unaided eye); or (c) increased adhesion between the carrier and the thin sheet whereby such increased adhesion prevents debonding (by insertion of a razor blade between the thin sheet and carrier, and/or by sticking a piece of Kapton™ tape, 1" wide×6" long with 2-3" attached to 100 mm square thin glass (K102 series from Saint Gobain Performance Plastic, Hoosik N.Y.) to the thin sheet and pulling on the tape) of the thin sheet from the carrier without damaging the thin sheet or the carrier, wherein a failure was deemed to have occurred if there was damage to the thin sheet or carrier upon attempting to separate them, or if the thin sheet and carrier could not be debonded by performance of either of the debonding methods. Additionally, after the thin sheet was bonded with the carrier, and prior to the thermal cycling, debonding tests were performed on representative samples to determine that a particular material, including any associated surface treatment, did allow for debonding of the thin sheet from the carrier prior to the temperature cycling. In the tables below, a notation of "P" in the "400° C." column indicates that the sample did not fail as per the foregoing criteria.

(4) Temperature to 600° C. testing. 600° C. process compatibility testing was performed using an Alwin21 Accuthermo610 RTP. A carrier with a thin sheet was heated in a chamber cycled from room temperature to 600° C. at 9.5° C./min, held at 600° C. for 600 seconds, and then cooled at 1° C./min to 300° C. The carrier and thin sheet were then allowed to cool to room temperature. Failure, as indicated by a notation of "F" in the "600° C." column of the tables below, was deemed to have occurred if there was: (a) a loss of adhesion between the carrier and the thin sheet (by visual inspection with the naked eye, wherein failure was deemed to have occurred if the thin sheet had fallen off of the carrier or was partially debonded therefrom); (b) bubbling between the carrier and the thin sheet (as determined by visual inspection with the naked eye—samples were photographed before and after the processing, and then compared, failure was determined to have occurred if defects increased in size by dimensions visible to the unaided eye); or (c) increased adhesion between the carrier and the thin sheet whereby such increased adhesion prevents debonding (by insertion of a razor blade between the thin sheet and carrier, and/or by sticking a piece of Kapton™ tape as described above to the thin sheet and pulling on the tape) of the thin sheet from the carrier without damaging the thin sheet or the carrier, wherein a failure was deemed to have occurred if there was damage to the thin sheet or carrier upon attempting to separate them, or if the thin sheet and carrier could not be debonded by performance of either of the debonding methods. Additionally, after the thin sheet was bonded with the carrier, and prior to the thermal cycling, debonding tests were performed on representative samples to determine that a particular material, and any associated surface treatment, did allow for debonding of the thin sheet from the carrier prior to the temperature cycling. In the tables below, a notation of "P" in the "600° C." column indicates that the sample did not fail as per the foregoing criteria.

(5) Ultrasonic testing. Ultrasonic compatibility testing was performed by cleaning the article in a four tank line, wherein the article was processed in each of the tanks sequentially from tank #1 to tank #4. Tank dimensions, for each of the four tanks, were 18.4"L×10"W×15"D. Two cleaning tanks (#1 and #2) contained 1% Semiclean KG available from Yokohama Oils and Fats Industry Co Ltd., Yokohama Japan in DI water at 50° C. The cleaning tank #1 was agitated with a NEY prosonik 2 104 kHz ultrasonic generator (available from Blackstone-NEY Ultrasonics, Jamestown, N.Y.), and the cleaning tank #2 was agitated with a NEY prosonik 2 104 kHz ultrasonic generator. Two rinse tanks (tank #3 and tank #4) contained DI water at 50° C. The rinse tank #3 was agitated by NEY sweepsonik 2D 72 kHz ultrasonic generator and the rinse tank #4 was agitated by a NEY sweepsonik 2D 104 kHz ultrasonic generator. The processes were carried out for 10 min in each of the tanks #1-4, followed by spin rinse drying (SRD) after the sample was removed from tank #4. Failure, as indicated by a notation of "F" in the "Ultrasonic" column of the tables below, was deemed to have occurred if there was: (a) a loss of adhesion between the carrier and the thin sheet (by visual inspection with the naked eye, wherein failure was deemed to have occurred if the thin sheet had fallen off of the carrier or was partially debonded therefrom); (b) bubbling between the carrier and the thin sheet (as determined by visual inspection with the naked eye—samples were photographed before and after the processing, and then compared, failure was determined to have occurred if defects increased in size by dimensions visible to the unaided eye); or (c) formation of other gross defects (as determined by visual inspection with optical microscope at 50×, wherein failure was deemed to have occurred if there were particles trapped between the thin glass and carrier that were not observed before; or (d) penetration of water under the thin sheet (as determined by visual inspection with an optical microscope at 50×, wherein failure was determined to have occurred if liquid or residue was observable. In the tables below, a notation of "P" in the "Ultrasonic" column indicates that the sample did not fail as per the foregoing criteria. Additionally, in the tables below, a blank in the "Ultrasonic" column indicates that the sample was not tested in this manner.

Bond Energy Test

The bond energy is the energy it takes to separate a thin sheet from a carrier. The bond energy may be measured in various different manners. However, as used herein, the bond energy was measured as follows.

Bond energy was measured using the double cantilever beam method (also known as the wedge method). In this method, a wedge of known thickness is placed between the bonded thin sheet and carrier glass at an edge. The wedge creates a characteristics delamination distance, L. This delamination distance is measured and used to calculated the bond energy, $\gamma_{BE}$ in equation 6.

$$\gamma_{BE} = \frac{3t_w^2 E_1 t_{s1}^3 E_2 t_{s2}^3}{16 L^4 (E_1 t_{s1}^3 + E_2 t_{s2}^3)} \quad (6)$$

Young modulus, E, for both the carrier (1) and the thin sheet (2) of EXG composition was 73.6 GPa. The typical thickness of the carrier, $t_{s1}$, 0.7 mm and thickness of the thin sheet, $t_{s2}$, 0.13 mm. Martor 37010.20 razor blades were used for a wedge consisting of a thickness, $t_w$, of 95 µm. Samples having very high bond energy where pre-cracked with a separate wedge. This allowed easier insertion of the wedge and creation of characteristics delamination length. For bond energy data reported, a value of 2500 indicates a test-limit condition and that the thin sheet could not be debonded from the carrier for that particular sample.

Preparation of Bonding Surfaces via Hydroxyl Reduction by Heating

The benefit of modifying one or more of the bonding surfaces 14, 24 with a surface modification layer 30 so the article 2 is capable of successfully undergoing FPD processing (i.e., where the thin sheet 20 remains bonded to the carrier 10 during processing, and yet may be separated from the carrier 10 after processing, including high temperature processing) was demonstrated by processing articles 2 having glass carriers 10 and thin glass sheets 20 without a surface modification layer 30 therebetween. Specifically, first there was tried preparation of the bonding surfaces 14, 24 by heating to reduce hydroxyl groups, but without a surface modification layer 30. The carriers 10 and thin sheets 20 were cleaned, the bonding surfaces 14 and 24 were bonded to one another, and then the articles 2 were tested. A typical cleaning process for preparing glass for bonding is the SC1 cleaning process where the glass is cleaned in a dilute hydrogen peroxide and base (commonly ammonium hydroxide, but tetramethylammonium hydroxide solutions for example JT Baker JTB-100 or JTB-111 may also be used). Cleaning removes particles from the bonding surfaces, and makes the surface energy known, i.e., it provides a base-line of surface energy. The manner of cleaning need not be SC1, other types of cleaning may be used, as the type of cleaning is likely to have only a very minor effect on the silanol groups on the surface. The results for various tests are set forth below in Table 1.

A strong but separable initial, room temperature or van der Waal and/or Hydrogen-bond was created by simply cleaning a thin glass sheet of 100 mm square×100 micron thick, and a glass carrier 150 mm diameter single mean flat (SMF) wafer 0.50 or 0.63 mm thick, each comprising Eagle XG® display glass (an alkali-free, alumino-boro-silicate glass, having an average surface roughness Ra on the order of 0.2 nm, available from Corning Incorporated, Corning, N.Y.). In this example, glass was cleaned 10 min in a 65° C. bath of 40:1:2 DI water: JTB-111:Hydrogen peroxide. The thin glass or glass carrier may or may not have been annealed in nitrogen for 10 min at 400° C. to remove residual water—the notation "400° C." in the "Carrier" column or the "Thin Glass" column in Table 1 below indicates that the sample was annealed in nitrogen for 10 minutes at 400° C. FPD process compatibility testing demonstrates this SC1-SC1 initial, room temperature, bond is mechanically strong enough to pass vacuum, SRD and ultrasonic testing. However, heating at 400° C. and above created a permanent bond between the thin glass and carrier, i.e., the thin glass sheet could not be removed from the carrier without damaging either one or both of the thin glass sheets and carrier. And this was the case even for Example 1c, wherein each of the carrier and the thin glass had an annealing step to reduce the concentration of surface hydroxyls. Accordingly, the above-described preparation of the bonding surfaces 14, 24 via heating alone and then bonding of the carrier 10 and the thin sheet 12, without a surface modification layer 30, is not a suitable controlled bond for FPD processes wherein the temperature will be ≥400° C.

TABLE 1 process compatibility testing of SC1-treated glass bonding surfaces

| Example | Carrier | Thin Glass | Vacuum | SRD | 400 C. | 600 C. | Ultrasonic |
|---|---|---|---|---|---|---|---|
| 1a | SC1 | SC1 | P | P | F | F | P |
| 1b | SC1, 400 C. | SC1 | P | P | F | F | P |
| 1c | SC1, 400 C. | SC1, 400 C. | P | P | F | F | P |

Preparation of Bonding Surfaces by Hydroxyl Reduction and Surface Modification Layer Hydroxyl reduction, as by heat treatment for example, and a surface modification layer 30 may be used together to control the interaction of bonding surfaces 14, 24. For example, the bonding energy (both van der Waals and/or Hydrogen-bonding at room temperature due to the polar/dispersion energy components, and covalent bonding at high temperature due to the covalent energy component) of the bonding surfaces 14, 24 can be controlled so as to provide varying bond strength from that wherein room-temperature bonding is difficult, to that allowing easy room-temperature bonding and separation of the bonding surfaces after high temperature processing, to that which—after high temperature processing—prevents the surfaces from separating without damage. In some applications, it may be desirable to have no, or very weak bonding (as when the surfaces are in a "non-bonding" region, as a "non-bonding" region is described in the thin sheet/carrier concept of US '727, and as described below). In other applications, for example providing a re-usable carrier for FPD processes and the like (wherein process temperatures ≥500° C., or ≥600° C., and up to 650° C., may be achieved), it is desirable to have sufficient van der Waals and/or Hydrogen-bonding, at room temperature to initially put the thin sheet and carrier together, and yet prevent or limit high temperature covalent bonding. For still other applications, it may be desirable to have sufficient room temperature boding to initially put the thin sheet and carrier together, and also to develop strong covalent bonding at high temperature (as when the surfaces are in a "bonding region", as "bonding region" is described in the thin sheet/carrier concept of US '727, and as discussed below). Although not wishing to be bound by theory, in some instances the surface modification layer may be used to control room temperature bonding by which the thin sheet and carrier are initially put together, whereas the reduction of hydroxyl groups on the surface (as by heating the surface, or by reaction of the hydroxyl groups with the surface modification layer, for example) may be used to control the covalent bonding, particularly that at high temperatures.

A material for the surface modification layer 30 may provide a bonding surface 14, 24 with an energy (for example, and energy <40 mJ/m$^2$, as measured for one surface, and including polar and dispersion components) whereby the surface produces only weak bonding. In one example, hexamethyldisilazane (HMDS) may be used to create this low energy surface by reacting with the surface hydroxyls to leave a trimethylsilyl (TMS) terminated surface. HMDS as a surface modification layer may be used together with surface heating to reduce the hydroxyl concentration to control both room temperature and high temperature bonding. By choosing a suitable bonding surface preparation for each bonding surface 14, 24, there can be achieved articles having a range of capabilities. More specifically, of interest to providing a reusable carrier for LTPS processing, there can be achieved a suitable bond between a thin glass sheet 20 and a glass carrier 10 so as to survive (or pass) each of the vacuum SRD, 400° C. (parts a and c), and 600° C. (parts a and c), processing tests.

In one example, following SC1 cleaning by HMDS treatment of both thin glass and carrier creates a weakly bonded surface which is challenging to bond at room temperature with van der Waals (and/or hydrogen bonding) forces. Mechanical force is applied to bond the thin glass to the carrier. As shown in example 2a of Table 2, this bonding is sufficiently weak that deflection of the carrier is observed in vacuum testing and SRD processing, bubbling (likely due to outgassing) was observed in 400° C. and 600° C. thermal processes, and particulate defects were observed after ultrasonic processing.

In another example, HMDS treatment of just one surface (carrier in the example cited) creates stronger room temperature adhesion which survives vacuum and SRD processing. However, thermal processes at 400° C. and above permanently bonded the thin glass to the carrier. This is not unexpected as the maximum surface coverage of the trimethylsilyl groups on silica has been calculated by Sindorf and Maciel in J. Phys. Chem. 1982, 86, 5208-5219 to be 2.8/nm$^2$ and measured by Suratwala et. al. in Journal of Non-Crystalline Solids 316 (2003) 349-363 as 2.7/nm$^2$, vs. a hydroxyl concentration of 4.6-4.9/nm$^2$ for fully hydroxylated silica. That is, although the trimethylsilyl groups do bond with some surface hydroxyls, there will remain some un-bonded hydroxyls. Thus one would expect condensation of surface silanol groups to permanently bond the thin glass and carrier given sufficient time and temperature.

Figure 4:
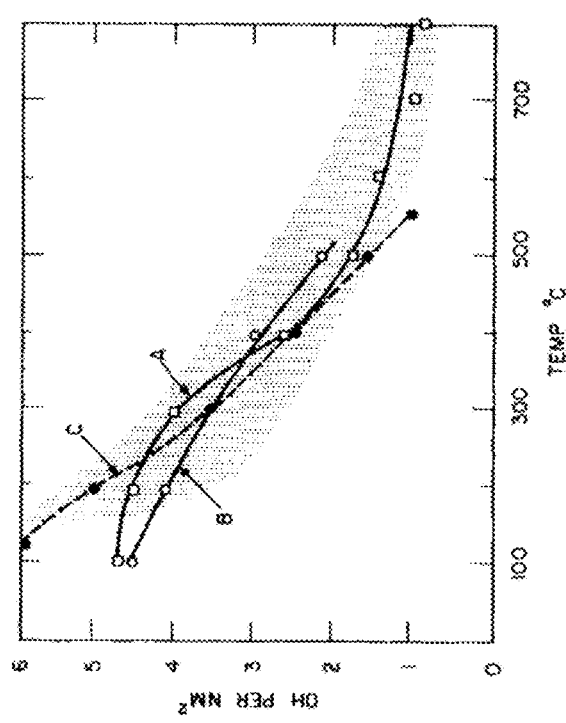
FIG. 4 is a graph of the surface energy of an SC1-cleaned sheet of glass as a function annealing temperature.

A varied surface energy can be created by heating the glass surface to reduce the surface hydroxyl concentration prior to HMDS exposure, leading to an increased polar component of the surface energy. This both decreases the driving force for formation of covalent Si—O—Si bonds at high temperature and leads to stronger room-temperature bonding, for example, van der Waal (and/or hydrogen) bonding. FIG. 4 shows the surface energy of an Eagle XG® display glass carrier after annealing, and after HMDS treatment. Increased annealing temperature prior to HMDS exposure increases the total (polar and dispersion) surface energy (line 402) after HMDS exposure by increasing the polar contribution (line 404). It is also seen that the dispersion contribution (line 406) to the total surface energy remains largely unchanged by the heat treatment. Although not wishing to be bound by theory, increasing the polar component of, and thereby the total, energy in the surface after HMDS treatment appears to be due to there being some exposed glass surface areas even after HMDS treatment because of sub-monolayer TMS coverage by the HMDS.

In example 2b, the thin glass sheet was heated at a temperature of 150° C. in a vacuum for one hour prior to bonding with the non-heat-treated carrier having a coating of HMDS. This heat treatment of the thin glass sheet was not sufficient to prevent permanent bonding of the thin glass sheet to the carrier at temperatures ≥400° C.

As shown in examples 2c-2e of Table 2, varying the annealing temperature of the glass surface prior to HMDS exposure can vary the bonding energy of the glass surface so as to control bonding between the glass carrier and the thin glass sheet.

In example 2c, the carrier was annealed at a temperature of 190° C. in vacuum for 1 hour, followed by HMDS exposure to provide surface modification layer 30. Additionally, the thin glass sheet was annealed at 450° C. in a vacuum for 1 hour before bonding with the carrier. The resulting article survived the vacuum, SRD, and 400° C. tests (parts a and c, but did not pass part b as there was increased bubbling), but failed the 600° C. test. Accordingly, although there was increased resistance to high temperature bonding as compared with example 2b, this was not sufficient to produce an article for processing at temperatures ≥600° C. (for example LTPS processing) wherein the carrier is reusable.

In example 2d, the carrier was annealed at a temperature of 340° C. in a vacuum for 1 hour, followed by HMDS exposure to provide surface modification layer 30. Again, the thin glass sheet was annealed at 450° C. for 1 hour in a vacuum before bonding with the carrier. The results were similar to those for example 2c, wherein the article survived the vacuum, SRD, and 400° C. tests (parts a and c, but did not pass part b as there was increased bubbling), but failed the 600° C. test.

As shown in example 2e, annealing both thin glass and carrier at 450° C. in vacuum for 1 hr., followed by HMDS exposure of the carrier, and then bonding of the carrier and thin glass sheet, improves the temperature resistance to permanent bonding. An anneal of both surfaces to 450° C. prevents permanent bonding after RTP annealing at 600° C. for 10 min, that is, this sample passed the 600° C. processing test (parts a and c, but did not pass part b as there was increased bubbling; a similar result was found for the 400° C. test).

TABLE 2 process compatibility testing of HMDS surface modification layers

| Example | Carrier | Thin Glass | Vacuum | SRD | 400 C. | 600 C. | Ultrasonic |
|---|---|---|---|---|---|---|---|
| 2a | SC1, HMDS | SC1, HMDS | F | F | P | P | F |
| 2b | SC1, HMDS | SC1, 150 C. | P | P | F | F | |
| 2c | SC1, 190 C., HMDS | SC1, 450 C. | P | P | P | F | |
| 2d | SC1, 340 C., HMDS | SC1, 450 C. | P | P | P | F | |
| 2e | SC1, 450 C., HMDS | SC1, 450 C. | P | P | P | P | |

In Examples 2a to 2e above, each of the carrier and the thin sheet were Eagle XG® glass, wherein the carrier was a 150 mm diameter SMF wafer 630 microns thick and the thin sheet was 100 mm square 100 microns thick The HMDS was applied by pulse vapor deposition in a YES-5 HMDS oven (available from Yield Engineering Systems, San Jose Calif.) and was one atomic layer thick (i.e., about 0.2 to 1 nm), although the surface coverage may be less than one monolayer, i.e., some of the surface hydroxyls are not covered by the HMDS as noted by Maciel and discussed above. Because of the small thickness in the surface modification layer, there is little risk of outgassing which can cause contamination in the device fabrication. Also, as indicated in Table 2 by the "SC1" notation, each of the carriers and thin sheets were cleaned using an SC1 process prior to heat treating or any subsequent HMDS treatment.

A comparison of example 2a with example 2b shows that the bonding energy between the thin sheet and the carrier can be controlled by varying the number of surfaces which include a surface modification layer. And controlling the bonding energy can be used to control the bonding force between two bonding surfaces. Also, a comparison of examples 2b-2e, shows that the bonding energy of a surface can be controlled by varying the parameters of a heat treatment to which the bonding surface is subjected before application of a surface modification material. Again, the heat treatment can be used to reduce the number of surface hydroxyls and, thus, control the degree of covalent bonding, especially that at high temperatures.

Other materials, that may act in a different manner to control the surface energy on a bonding surface, may be used for the surface modification layer 30 so as to control the room temperature and high temperature bonding forces between two surfaces. For example, a reusable carrier can also be created if one or both bonding surfaces are modified to create a moderate bonding force with a surface modification layer that either covers, or sterically hinders species for example hydroxyls to prevent the formation at elevated temperature of strong permanent covalent bonds between carrier and thin sheet. One way to create a tunable surface energy, and cover surface hydroxyls to prevent formation of covalent bonds, is deposition of plasma polymer films, for example fluoropolymer films. Plasma polymerization deposits a thin polymer film under atmospheric or reduced pressure and plasma excitation (DC or RF parallel plate, Inductively Coupled Plasma (ICP) Electron Cyclotron Resonance (ECR) downstream microwave or RF plasma) from source gases for example fluorocarbon sources (including CF4, CHF3, C2F6, C3F6, C2F2, CH3F, C4F8, chlorofluoro carbons, or hydrochlorofluoro carbons), hydrocarbons for example alkanes (including methane, ethane, propane, butane), alkenes (including ethylene, propylene), alkynes (including acetylene), and aromatics (including benzene, toluene), hydrogen, and other gas sources for example SF6. Plasma polymerization creates a layer of highly cross-linked material. Control of reaction conditions and source gases can be used to control the film thickness, density, and chemistry to tailor the functional groups to the desired application.

Figure 5:
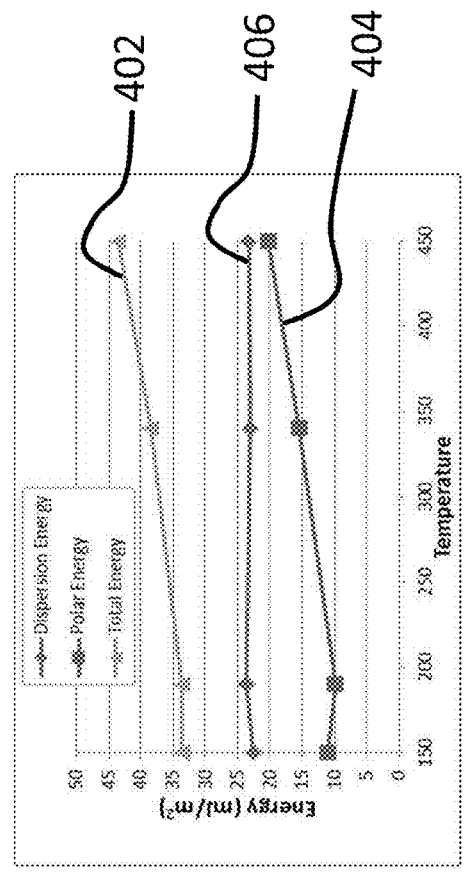
FIG. 5 is a graph of the surface energy of a thin fluoropolymer film deposited on a sheet of glass as a function of the percentage of one of the constituent materials from which the film was made.

FIG. 5 shows the total (line 502) surface energy (including polar (line 504) and dispersion (line 506) components) of plasma polymerized fluoropolymer (PPFP) films deposited from CF4-C4F8 mixtures with an Oxford ICP380 etch tool (available from Oxford Instruments, Oxfordshire UK). The films were deposited onto a sheet of Eagle XG® glass, and spectroscopic ellipsometry showed the films to be 1-10 nm thick. As seen from FIG. 5, glass carriers treated with plasma polymerized fluoropolymer films containing less than 40% C4F8 exhibit a surface energy >40 mJ/m$^2$ and produce controlled bonding between the thin glass and carrier at room temperature by van der Waal or hydrogen bonding. Facilitated bonding is observed when initially bonding the carrier and thin glass at room temperature. That is, when placing the thin sheet onto the carrier, and pressing them together at a point, a wave front travels across the carrier, but at a lower speed than is observed for SC1 treated surfaces having no surface modification layer thereon. The controlled bonding is sufficient to withstand all standard FPD processes including vacuum, wet, ultrasonic, and thermal processes up to 600° C., that is this controlled bonding passed the 600° C. processing test without movement or delamination of the thin glass from the carrier. De-bonding was accomplished by peeling with a razor blade and/or Kapton™ tape as described above. The process compatibility of two different PPFP films (deposited as described above) is shown in Table 3. PPFP 1 of example 3a was formed with C4F8/(C4F8+CF4)=0, that is, formed with CF4/H2 and not C4F8, and PPFP 2 of example 3b was deposited with C4F8/(C4F8+CF4)=0.38. Both types of PPFP films survived the vacuum, SRD, 400° C. and 600° C. processing tests. However, delamination is observed after 20 min of ultrasonic cleaning of PPFP 2 indicating insufficient adhesive force to withstand such processing. Nonetheless, the surface modification layer of PPFP2 may be useful for some applications, as where ultrasonic processing is not necessary.

TABLE 3

| | | process compatibility testing of PPFP surface modification layers | | | | | |
|---|---|---|---|---|---|---|---|
| Example | Carrier | Thin Glass | Vacuum | SRD | 400 C. | 600 C. | Ultrasonic |
| 3a | PPFP 1 | SC1, 150 C. | P | P | P | P | P |
| 3b | PPFP2 | SC1, 150 C. | P | P | P | P | F |

In Examples 3a and 3b above, each of the carrier and the thin sheet were Eagle XG® glass, wherein the carrier was a 150 mm diameter SMF wafer 630 microns thick and the thin sheet was 100 mm square 100 microns thick. Because of the small thickness in the surface modification layer, there is little risk of outgassing which can cause contamination in the device fabrication. Further, because the surface modification layer did not appear to degrade, again, there is even less risk of outgassing. Also, as indicated in Table 3, each of the thin sheets was cleaned using an SC1 process prior to heat treating at 150° C. for one hour in a vacuum.

Still other materials, that may function in a different manner to control surface energy, may be used as the surface modification layer to control the room temperature and high temperature bonding forces between the thin sheet and the carrier. For example, a bonding surface that can produce controlled bonding can be created by silane treating a glass carrier and/or glass thin sheet. Silanes are chosen so as to produce a suitable surface energy, and so as to have sufficient thermal stability for the application. The carrier or thin glass to be treated may be cleaned by a process for example O2 plasma or UV-ozone, and SC1 or standard clean two (SC2, as is known in the art) cleaning to remove organics and other impurities (metals, for example) that would interfere with the silane reacting with the surface silanol groups. Washes based on other chemistries may also be used, for example, HF, or H2SO4 wash chemistries. The carrier or thin glass may be heated to control the surface hydroxyl concentration prior to silane application (as discussed above in connection with the surface modification layer of HMDS), and/or may be heated after silane application to complete silane condensation with the surface hydroxyls. The concentration of unreacted hydroxyl groups after silanization may be made low enough prior to bonding as to prevent permanent bonding between the thin glass and carrier at temperatures ≥400° C., that is, to form a controlled bond. This approach is described below.

Example 4a

A glass carrier with its bonding surface O2 plasma and SC1 treated was then treated with 1% dodecyltriethoxysilane (DDTS) in toluene, and annealed at 150° C. in vacuum for 1 hr. to complete condensation. DDTS treated surfaces exhibit a surface energy of 45 mJ/m². As shown in Table 4, a glass thin sheet (having been SC1 cleaned and heated at 400° C. in a vacuum for one hour) was bonded to the carrier bonding surface having the DDTS surface modification layer thereon. This article survived wet and vacuum process tests but did not survive thermal processes over 400° C. without bubbles forming under the carrier due to thermal decomposition of the silane. This thermal decomposition is expected for all linear alkoxy and chloro alkylsilanes $R1_xSi(OR2)_y(Cl)_z$ where x=1 to 3, and y+z=4−x except for methyl, dimethyl, and trimethyl silane (x=1 to 3, $R1=CH_3$) which produce coatings of good thermal stability.

Example 4b

A glass carrier with its bonding surface O2 plasma and SC1 treated was then treated with 1% 3, 3, 3, trifluoropyltritheoxysilane (TFTS) in toluene, and annealed at 150° C. in vacuum for 1 hr. to complete condensation. TFTS treated surfaces exhibit a surface energy of 47 mJ/m². As shown in Table 4, a glass thin sheet (having been SC1 cleaned and then heated at 400° C. in a vacuum for one hour) was bonded to the carrier bonding surface having the TFTS surface modification layer thereon. This article survived the vacuum, SRD, and 400° C. process tests without permanent bonding of the glass thin sheet to the glass carrier. However, the 600° C. test produced bubbles forming under the carrier due to thermal decomposition of the silane. This was not unexpected because of the limited thermal stability of the propyl group. Although this sample failed the 600° C. test due to the bubbling, the material and heat treatment of this example may be used for some applications wherein bubbles and the adverse effects thereof, for example reduction in surface flatness, or increased waviness, can be tolerated.

Example 4c

A glass carrier with its bonding surface O2 plasma and SC1 treated was then treated with 1% phenyltriethoxysilane (PTS) in toluene, and annealed at 200° C. in vacuum for 1 hr. to complete condensation. PTS treated surfaces exhibit a surface energy of 54 mJ/m². As shown in Table 4, a glass thin sheet (having been SC1 cleaned and then heated at 400° C. in a vacuum for one hour) was bonded to the carrier bonding surface having the PTS surface modification layer. This article survived the vacuum, SRD, and thermal processes up to 600° C. without permanent bonding of the glass thin sheet with the glass carrier.

Example 4d

A glass carrier with its bonding surface O2 plasma and SC1 treated was then treated with 1% diphenyldiethoxysilane (DPDS) in toluene, and annealed at 200° C. in vacuum for 1 hr. to complete condensation. DPDS treated surfaces exhibit a surface energy of 47 mJ/m². As shown in Table 4, a glass thin sheet (having been SC1 cleaned and then heated at 400° C. in a vacuum for one hour) was bonded to the carrier bonding surface having the DPDS surface modification layer. This article survived the vacuum and SRD tests, as well as thermal processes up to 600° C. without permanent bonding of the glass thin sheet with the glass carrier Example 4e A glass carrier having its bonding surface O2 plasma and SC1 treated was then treated with 1% 4-pentafluorophenyl-triethoxysilane (PFPTS) in toluene, and annealed at 200° C. in vacuum for 1 hr. to complete condensation. PFPTS treated surfaces exhibit a surface energy of 57 mJ/m². As shown in Table 4, a glass thin sheet (having been SC1 cleaned and then heated at 400° C. in a vacuum for one hour) was bonded to the carrier bonding surface having the PFPTS surface modification layer. This article survived the vacuum and SRD tests, as well as thermal processes up to 600° C. without permanent bonding of the glass thin sheet with the glass carrier.

TABLE 4 process compatibility testing of silane surface modification layers

| Example | Carrier | Thin Glass | Vacuum | SRD | 400 C. | 600 C. |
|---|---|---|---|---|---|---|
| 4a | SC1, DDTS | SC1, 400 C. | P | P | F | F |
| 4b | SC1, TFTS | SC1, 400 C. | P | P | P | F |
| 4c | SC1, PTS | SC1, 400 C. | P | P | P | P |
| 4d | SC1, DPDS | SC1, 400 C. | P | P | P | P |
| 4e | SC1, PFPTS | SC1, 400 C. | P | P | P | P |

In Examples 4a to 4e above, each of the carrier and the thin sheet were Eagle XG® glass, wherein the carrier was a 150 mm diameter SMF wafer 630 microns thick and the thin sheet was 100 mm square 100 microns thick. The silane layers were self-assembled monolayers (SAM), and thus were on the order of less than about 2 nm thick. In the above examples, the SAM was created using an organosilane with an aryl or alkyl non-polar tail and a mono, di, or tri-alkoxide head group. These react with the silanol surface on the glass to directly attach the organic functionality. Weaker interactions between the non-polar head groups organize the organic layer. Because of the small thickness in the surface modification layer, there is little risk of outgassing which can cause contamination in the device fabrication. Further, because the surface modification layer did not appear to degrade in examples 4c, 4d, and 4e, again, there is even less risk of outgassing. Also, as indicated in Table 4, each of the glass thin sheets was cleaned using an SC1 process prior to heat treating at 400° C. for one hour in a vacuum.

As can be seen from a comparison of examples 4a-4e, controlling surface energy of the bonding surfaces to be above 40 mJ/m² so as to facilitate the initial room temperature bonding is not the only consideration to creating a controlled bond that will withstand FPD processing and still allow the thin sheet to be removed from the carrier without damage. Specifically, as seen from examples 4a-4e, each carrier had a surface energy above 40 mJ/m², which facilitated initial room temperature bonding so that the article survived vacuum and SRD processing. However, examples 4a and 4b did not pass 600° C. processing test. As noted above, for certain applications, it is also important for the bond to survive processing up to high temperatures (for example, ≥400° C., ≥500° C., or ≥600° C., up to 650° C., as appropriate to the processes in which the article is designed to be used) without degradation of the bond to the point where it is insufficient to hold the thin sheet and carrier together, and also to control the covalent bonding that occurs at such high temperatures so that there is no permanent bonding between the thin sheet and the carrier. As shown by the examples in Table 4, aromatic silanes, in particular phenyl silanes, are useful for providing a controlled bond that will facilitate initial room temperature bonding, and that will withstand FPD processing and still allow the thin sheet to be removed from the carrier without damage.

Fluorocarbon Surface Modification Layers, and Treatment Thereof

Another example of using plasma polymerized films to tune the surface energy of, and create alternative polar bonding sites on, a bonding surface is deposition of a surface modification layer thin film from a mixture of fluorocarbon gas sources, and then forming nitrogen based polar groups on the surface modification layer by using various methods.

Figure 13A:
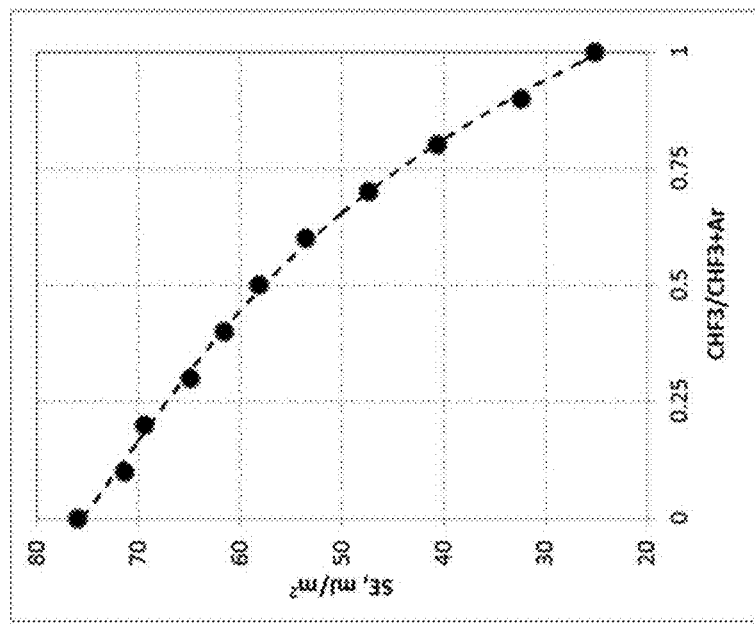
FIG. 13A is a graph of the surface energy of a fluoropolymer film deposited on a sheet of glass as a function of the percentage of one of the gasses used during deposition.
Figure 13:
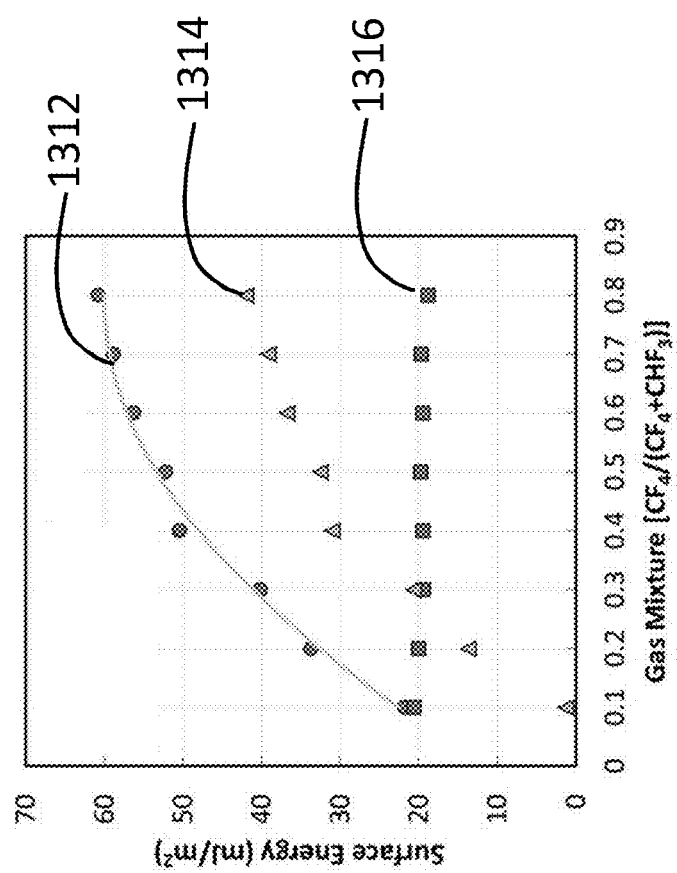
FIG. 13 is a graph of the surface energy of a fluoropolymer film deposited on a sheet of glass as a function of the percentage of one of the gasses used during deposition.

The surface modification layer may be formed by plasma polymerization of various mixtures of fluorocarbon gas sources so as to provide a variety of surface energies, including a surface energy of greater than about 50 mJ/m² as calculated by fitting a theoretical model developed by S. Wu (1971) to the contact angles (CA) of three different test liquids (in this case, de-ionized water (Water), hexadecane (HD), and di-iodomethane (DIM). (Reference: S. Wu, J. Polym. Sci. C, 34, 19, 1971, hereinafter the "Wu model"). A surface energy of greater than about 50 mJ/m2 on a carrier bonding surface is beneficial for bonding the carrier to a thin glass sheet, as it facilitates initial room-temperature bonding of the carrier to the thin glass sheet, and enables FPD processing of the carrier/thin glass sheet without them debonding in process. In some cases, depending on the surface modification layer composition and deposition conditions, a surface modification layer having this surface energy is capable of allowing debonding by peeling, even after processing the carrier and thin glass sheet at temperatures up to about 600° C., and in some cases even higher. In general, the source gasses include a mixture of an etching gas and a polymer forming gas. As discussed above in connection with FIG. 5, the etching gas may be CF4, whereas the polymer forming gas may be C4F8. Alternatively, as shown in FIG. 13, the etching gas may be CF4, whereas the polymer forming gas may be CHF3. As shown in both FIG. 5 and FIG. 13, in general, the lower the percentage of polymer forming gas, the higher the total surface energy 502, 1312 of the resulting bonding surface, wherein the total surface energy is a combination of polar 504, 1314 (triangle data points) and dispersion 506, 1316 (square data points) components. The percentage of polymer forming gas (for example CHF3) during the plasma polymerization may be controlled in a similar manner, to control the resultant surface energy, by using an inert gas (for example Ar), as shown in FIG. 13A which shows total surface energy in mJ/m2. Although not wishing to be bound by theory, the inert gas may act as an etchant, a diluent, or both. In any event, it is clear that one can modify the surface energy of a carrier glass by CHF3 alone without any CF4 in the gas stream. Deposition of the surface modification layer may take place in atmospheric or reduced pressure, and is performed with plasma excitation for example, DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application. And by controlling the film properties, the surface energy of a carrier bonding surface can be tuned. However, surface energy is just one consideration in controlling the degree of bonding.

The degree of controlled bonding, or moderate bonding, can be further tuned by controlling the polar bond used to achieve the desired surface energy. One manner of controlling the polar bond is to expose the surface modification layer (as formed above) to a further treatment to incorporate polar groups, for example treatment by a nitrogen containing plasma. This treatment increases the adhesion force through the formation of nitrogen-based polar functional groups on the thin surface modification layer. The nitrogen based polar groups, formed during the subsequent treatment, do not condense with silanol groups to cause permanent covalent bonding and, thus, are able to control the degree of bonding between the thin sheet and the carrier during subsequent treatments performed to dispose films or structures on the thin sheet. The methods of forming nitrogen based polar groups include, for example, nitrogen plasma treatment (examples 5b-d, k, l), ammonia plasma treatment (examples 5e, f, h-j), and nitrogen/hydrogen plasma treatment (example 5m).

Thin glass sheets and glass carriers bonded with a surface modification layer that was treated with nitrogen-containing plasma are observed not to permanently adhere after annealing at 600° C., i.e., they pass part (c) of the 600° C. temperature testing. Also, this moderate bonding is strong enough to survive FPD processing (including the above-described vacuum testing (1), wet process testing (2), and ultrasonic testing (5)) and remain de-bondable by application of sufficient peeling force. De-bonding permits removal of devices fabricated on thin glass, and re-use of the carrier. The nitrogen plasma treatment of the surface modification layer may obtain one or more of the following advantages: high surface energy and low water contact angle, leading to strong adherence between the thin sheet and carrier with minimal bubble defects after initial bonding (see examples 5b-f, and i-l); reduction of defect formation when thermal processing, due to the improved thermal stability of the surface modification layer (examples 5c, 5d, 5k, 5l, i.e., the samples treated with N2 exhibited a lowered bubble formation, as observed visually); and/or an easier process window because the separation of surface modification layer formation and treatment thereof permits different processes to optimize the carrier/surface modification layer as well as surface modification layer/thin glass interfaces (examples 5b-f and h-m). That is, the base material of and deposition process for the surface modification layer itself may be formulated so as to optimize interaction between the surface modification layer and the carrier bonding surface. Then, separately, after deposition of the surface modification layer on the carrier, the properties of the surface modification layer may be modified by treatment to optimize interaction of the surface modification layer with the thin sheet to be disposed thereon. In the examples of Table 5, below, various conditions were used to deposit a plasma polymerized film onto a glass carrier. The glass carrier was a substrate made from Corning® Eagle XG®, alumino boro silicate alkali-free display glass (available from Corning Incorporated, Corning N.Y.). Before surface modification layer deposition, the carriers were cleaned using an SC1 and/or an SC2 chemistry and standard cleaning techniques. The films were deposited in an Oxford Plasmalab 380 Inductively Coupled Plasma (ICP) system with 13.56 MHz RF sources on both the coil and platen, and the platen temperature was fixed at 30 C. Nitrogen and ammonia plasma treatments of the surface modification layer for samples 5a-5j were performed in an STS Multiplex PECVD apparatus (available from SPTS, Newport, UK) with triode electrode configuration mode wherein the carrier sat on a platen heated to 200 C to which a specified number of Watts of 380 kHz RF energy was applied, above the platen there was disposed a shower head to which a specified number of Watts of 13.5 MHz RF energy was applied. For the energy applied in both the Oxford ICP and STS PECVD the numbers are shown as a #/#W, wherein the number before the slash is the Wattage applied to the top electrode (coil on ICP or shower head on PECVD), and the number after the slash is the Wattage applied to the platen. Where there is only one number shown, this is for the top electrode. The flow-rates of the gasses into the chamber were as shown in Table 5 (flowrates being in standard cubic centimeters per minute—sccm). Thus, for example, the notation in the "Surface Treatment" column of Table 5 for example 5g is read as follows: in an Oxford ICP apparatus, 30 sccm of CF4, 10 sccm of C4F8, and 20 sccm of H2, were flowed together into a chamber having a pressure of 5 mTorr; 1000 W of 13.5 MHz RF energy was applied to the coil 50 W of 13.56 MHz RF energy was applied to the 30 C platen on which the carrier sat; and the deposition time was 60 seconds. The notation in the Surface Treatment column for the remaining examples can be read in a similar manner. By way of further example, in the "Plasma Treatment" column, the notation for the treatment in example 5h is read as follows: after the surface modification layer is formed as per the parameters in the Surface Treatment column of example 5h, then 100 sccm of NH3 is supplied to the STS PECVD chamber having a pressure of 1 Torr, and a temperature of 200° C.; 100 W of 13.56 MHz is applied to the showerhead; and the treatment is carried out for 30 seconds. The notation in the "Plasma Treatment" column for the remaining examples is read in a similar manner. Surface energies, both polar and dispersion components, were calculated in mJ/m² (milliJoules per square meter) by fitting the Wu model to the contact angles (CA) of three different test liquids (in this case, de-ionized water (Water), hexadecane (HD), and di-iodomethane (DIM)). For the surface energies, the polar (P) and dispersive (D) components, as well as total (T), are shown.

TABLE 5

Fluoro-Carbon Surface Modification Layers, and Treatment Thereof

| | | | Contact Angle | | | Surace Energy | | |
|---|---|---|---|---|---|---|---|---|
| Example | Surface Treatment to form Surface Modification Layer (SML) | Plasma Treatment of SML | Water CA | HD CA | DIM CA | D (mJ/m2) | P (mJ/m2) | T (mJ/m2) |
| 5a | 30CF4 10C4F8 20H2 5 mT 1500/50 W 60 s | none | 65.96 | 48 | 67.2 | 26.99 | 18.5 | 45.49 |
| 5b | 30CF4 10C4F8 20H2 5 mT 1500/50 W 60 s | 50N2 5 mT 1000/50 W 25 C. 10 s + 50H2 5 mT 1000/50 W 25 C. 10 s | 13.5 | 20.4 | 48.4 | 36.24 | 39.59 | 75.83 |
| 5c | 30CF4 10C4F8 20H2 5 mT 1500/50 W 60 s | 50N2 5 mT 1000/50 W 25 C. 30 s | 12.4 | 20.1 | 45.6 | 37.5 | 39.3 | 76.8 |
| 5d | 30CF4 10C4F8 20H2 5 mT 1500/50 W 60 s | 50N2 5 mT 1000/50 W 25 C. 10 s | 13.87 | 22.27 | 48.13 | 36.33 | 40.12 | 76.45 |
| 5e | 30CF4 10C4F8 20H2 5 mT 1500/50 W 60 s | 100NH3 1000He 1 torr 50 W 200 C. 60 s | 4.2 | 15.27 | 39.1 | 40.57 | 39.23 | 79.8 |
| 5f | 30CF4 10C4F8 20H2 5 mT 1500/50 W 60 s | 100NH3 1 torr 300 W 200 C. 60 s | 4.8 | 5.6 | 37 | 41.51 | 38.83 | 80.34 |

TABLE 5-continued

Fluoro-Carbon Surface Modification Layers, and Treatment Thereof

| Example | Surface Treatment to form Surface Modification Layer (SML) | Plasma Treatment of SML | Contact Angle | | | Surace Energy | | |
|---|---|---|---|---|---|---|---|---|
| | | | Water CA | HD CA | DIM CA | D (mJ/m2) | P (mJ/m2) | T (mJ/m2) |
| 5g | 30CF4 10C4F8 20H2 5 mT 1000/50 W 60 s | none | 79.8 | 60.1 | 73.1 | 23.3 | 12.9 | 36.2 |
| 5h | 30CF4 10C4F8 5 mT 1000/50 W 60 s | 100NH3 1 torr 100 W 200 C. 30 s | 31.35 | 2 | | 27.6 | 37.37 | 64.95 |
| 5i | 30CF4 10C4F8 5 mT 1000/50 W 60 s | 100NH3 1 torr 300 W 200 C. 60 s | 15.4 | 16.8 | 40.8 | 39.8 | 37.7 | 77.5 |
| 5j | 30CF4 10C4F8 5 mT 1000/50 W 60 s | 100NH3 1000He 1 torr 50 W 200 C. 60 s | 15.2 | 19.9 | 42 | 39.2 | 37.9 | 77.1 |
| 5k | 30CF4 10C4F8 5 mT 1000/50 W 60 s | 50N2 5 mT 800/50 W 25 C. 10 s | 13.4 | 12.1 | 46.4 | 37.1 | 39.2 | 76.3 |
| 5l | 30CF4 10C4F8 5 mT 1000/50 W 60 s | 50N2 5 mT 800/50 W 25 C. 60 s | 16.3 | 7.9 | 51 | 34.9 | 39.4 | 74.3 |
| 5m | 30CF4 10C4F8 5 mT 1000/50 W 60 s | 12N2 50H2 10 mT 800/50 W 25 C. 60 s | 72.8 | 57.4 | 69.2 | 26.1 | 15.2 | 41.3 |

In the examples 5b-5f and 5h-5l of Table 5, nitrogen based polar groups are formed on the surface modification layer, wherein these polar groups create moderate adhesion between a carrier and thin sheet (for example a glass carrier and a glass thin sheet) to create a temporary bond sufficiently strong to survive FPD processing but weak enough to permit debonding. After treatment, the polar group concentration on the surface of the surface modification layer is greater than that in the bulk of the surface modification layer.

Examples of Treatment by NH3 Plasma (5e, f, and h-j).

A moderate surface energy SML was deposited in an ICP plasma system from 30 sccm CF4 10 sccm C4F8 20 sccm H2 at 5 mT with 1500 W coil and 50 W platen RF power (control example 5a), and another from 30 sccm CF4 10 sccm C4F8 20 sccm H2 at 5 mT with 1000 W coil and 50 W platen RF power (control example 5g). Surface energy of the untreated fluoropolymer films are shown in the Table 5. Samples were transferred to an STS PECVD system and exposed to an ammonia plasma with the conditions listed in Table 5 (examples 5e, 5f, 5h-j). Surface tension as measured with DI water and hexadecane by the Wu equation increased from about 40 to about 65-80 mJ/m2 depending on ammonia plasma conditions. A thin glass sheet was bonded to each of these NH3 plasma modified samples. After 600° C. temperature testing, almost no change in bubble area was observed, visually (no formal outgassing test was performed), and the thin glass sheet in all these samples easily de-bonded by hand.

Examples of Treatment by N2 Plasma (5c, d, k, l).

A moderate surface energy SML was deposited in an ICP plasma system from 30 sccm CF4 10 sccm C4F8 20 sccm H2 at 5 mT with 1500 W coil and 50 W platen RF power (control example 5a), and another from 30 sccm CF4 10 sccm C4F8 20 sccm H2 at 5 mT with 1000 W coil and 50 W platen RF power (control example 5g). Surface energy of the untreated fluoropolymer films is shown in Table 5. Samples 5c, d, k, 1, were N2 plasma treated in-situ in the ICP system with the conditions listed in Table 5. Surface energy increased from about 40 to over 70 mJ/m2 depending on plasma conditions. A thin glass sheet was bonded to each of these samples. The thin glass sheet of all the samples were easily de-bonded by hand after 600° C. temperature testing.

Example of Treatment by Simultaneous N2 and H2 Plasma (5m).

A moderate surface energy SML was deposited in an ICP plasma system from 30 sccm CF4 10 sccm C4F8 20 sccm H2 at 5 mT with 1000 W coil and 50 W platen RF power (control example 5g). Surface tension of the untreated fluoropolymer is shown in Table 5. Sample 5m was subjected to simultaneous N2+H2 plasma treatment in-situ in the ICP system with the conditions listed in Table 5. Surface energy was not shown to differ from the untreated fluoropolymer film.

Example of Treatment by Sequential N2 and H2 Plasma (5b).

A moderate surface energy SML was deposited in an ICP plasma system from 30 sccm CF4 10 sccm C4F8 20 sccm H2 at 5 mT with 1500 W coil and 50 W platen RF power (control example 5a). Surface energy of the untreated fluoropolymer is shown in Table 5. This sample was then subjected to sequential N2 and H2 plasma treated in-situ in the ICP system with the conditions listed in Table 5. Surface energy rose to over 70 mJ/m2. This value is similar to values obtained with ammonia or nitrogen plasma. A thin glass sheet was bonded to this sample, and underwent 600° C. temperature testing, after which the thin glass sheet could be de-bonded from the carrier, i.e., this sample passed part (c) of the 600° C. processing test.

XPS data revealed that the impact of ammonia and nitrogen plasma treatments on the surface modification layer. Particularly, ammonia plasma treatment roughly halves the carbon content of the surface modification and diminishes the fluorine concentration by about a quarter and adds about 0.4 at % nitrogen. Silicon, oxygen, and other glass constituents are seen to increase as well, consistent with the ammonia plasma removing the fluoropolymer while adding a small amount of nitrogen species to the surface. Nitrogen plasma treatment increases nitrogen content to 2 at %, but also decreases carbon and fluorine content similar to ammonia. Silicon, oxygen and other glass constituents also increase consistent with a decrease in film thickness. Thus, the ammonia and nitrogen plasma treatments are shown to add polar groups to the surface modification layer, but also decrease the surface layer thickness. The resulting thickness of the surface modification layer was generally less than 20 nm. Thus, an effective surface modification layer will generally balance surface modification layer thickness with subsequent surface treatment time to achieve controlled bonding.

The thin glass sheet bonded to the carriers as per the examples of Table 5, as described above, was a substrate made from Corning® Willow® Glass, an alumino boro silicate alkali-free glass (Available from Corning Incorporated, Corning N.Y.), and having a thickness of 100, 130, and 150 microns. Before bonding, the Willow® Glass was cleaned using an oxygen plasma followed by SC1 and/or an SC2 chemistry and standard cleaning techniques.

In the examples of Table 5, although the bonding surface on which the surface modification layers were disposed was glass, such need not be the case. Instead, the bonding surface may be another suitable material having a similar surface energy and properties as glass, for example, silicon, polysilicon, single crystal silicon, ceramic, glass-ceramic, sapphire, or quartz.

The use of a plasma polymerized fluoropolymer surface modification layer, less than 20 nm thick, to control the bonding energy of a glass bonding surface, was demonstrated in the examples of Tables 3 and 5. The initial bonding of a glass thin sheet to such a glass carrier having the surface modification layer thereon is similar to bonding glass to glass: the bond front moves rapidly due to the strong attractive interaction between the thin sheet and the coated glass carrier. The physical origin of this attractive interaction is the dipole-dipole (Keesom) interaction between polar groups on the thin glass sheet (mostly silanol groups) and polar groups on the surface modification layer of the carrier, either with or without hydrogen-bonded molecular water. The fluoropolymer surface modification treatment, however, prevents permanent bonding of the thin sheet to the carrier at temperature up to 600° C. relevant for device fabrication. To offer a compelling cost advantage to low yield acid thinning of thicker glass, the carrier needs to be re-usable. This is a concern when using a fluorinated surface modification layer, as the fluoropolymer deposition process etches the carrier surface. While re-use of carriers has been demonstrated with those surface modification layers, the surface roughness increases from 0.3 nm to about 1.2 nm Ra. This increase in roughness can impact carrier reusability by reducing the bond energy (on carriers that have been re-used after deposition, removal, and re-deposition of the surface modification layer) due to limiting the bond area Also, the surface roughness increase can limit the carrier reuse in other applications, such as using the carrier itself as a display substrate, by not meeting specifications for roughness of incoming glass. It has also been observed that after annealing a bonded pair of thin glass sheet and carrier at temperature >300° C., a roughness has been induced on the bonding surface side of the thin glass sheet. The increased roughness on the thin sheet bonding surface is likely due to etching of the thin glass bonding surface by desorbed fluorine containing gases from the surface-modification-layer treated carrier bonding surface. In some cases, this increase in roughness of the bonding surface is not consequential. In other instances, although the roughness increase is small, this increase may not be acceptable, as it may limit re-use of a carrier, for example. Additionally, there may be reasons, for example health and safety, for not wanting to use fluorinated gasses in certain manufacturing operations.

Thus, there may be instances wherein it is desirable to use an alternative polar bond to create sufficient surface energy (for example, >50 mJ/m$^2$ as discussed above in connection with the examples in Table 5) for creating a controlled bond, i.e., one that is strong enough to survive FPD processing, yet allow the thin sheet to be separated from the carrier without damage (even after high temperature processing, for example processing above 400° C. or 600° C.). Accordingly, the inventors explored alternative ways to form suitable polar bonds that may be used for controlled bonding of a thin sheet to a carrier.

The inventors explored using a hydrocarbon polymer, or more generally a carbonaceous layer, so that little or no fluorine would be available to etch the glass. However, several key challenges had to be overcome. The carbonaceous layer surface energy should be greater than about 50 mJ/m$^2$ for the carbonaceous layer to bond with glass. In order to provide a bond strong enough to survive wet processing without liquid infiltration between the thin sheet and carrier, in some instances, the carbonaceous surface modification layer should have a surface energy of 65 mJ/m2 or higher. At 65 mJ/m2, the surface energy of the carrier (for bonding to a thin glass sheet) is sufficient for preventing liquid (for example water) infiltration between the carrier and thin sheet during subsequent processing. With a surface energy of about 50 mJ/m2, the bond to a thin glass sheet may be sufficient for most FPD processing, but may need heat treatment to prevent liquid infiltration. Specifically, the polar component of the hydrocarbon layer needs to be increased in-order to achieve strong dipole-dipole bonds directly with the silanol groups of the thin glass sheet or mediated by hydrogen-bonded molecular water. The carbonaceous layer should also exhibit thermal, chemical, and vacuum compatibility so that it will be useful for a carrier-thin-sheet article that will undergo at least amorphous silicon (aSi) TFT, color filter (CF), or capacitive touch device making processes. This appeared possible as aliphatic hydrocarbons like polyethylene exhibit great thermal stability in an inert atmosphere. Unlike fluoropolymers which may depolymerize under certain circumstances, HDPE simply chars. Even though the HDPE may char, if the thickness of polymer is low enough, one can still see through it. A final concern was that mechanical stability and wet process compatibility appeared to require a higher adhesion than can be achieved with Van der Waals forces alone. It was seen that about 250 to about 275 mJ/m2 bond energy was beneficial for surviving wet ultrasonic processing with the glass thin sheets used. This large bond energy may be due to particles and edge defects rather than fundamental requirements of the bonding processes. At best bonding two clean glass surfaces can produce a bond energy of about 150 mJ/m2. Some covalent bonding is required to achieve the 250-275 mJ/m2 bond strength.

The surface modification layers explored in the examples of Tables 6-12 are organic ones based on source materials that did not contain fluorine. As will be described in more detail below, an amorphous hydrocarbon layer (or simply a carbonaceous layer) could be produced on the glass carrier (Table 6), but the surface energy did not produce sufficient adhesion to a clean glass surface to survive FPD processing. This was not surprising, because the organic surface modification layer based on methane and hydrogen contained no strongly polar groups. In order to increase the polar groups available for bonding to the thin glass sheet, additional gasses were added during the plasma polymerization, and could achieve sufficient surface energy (Table 7). However, although sufficient surface energy could be achieved in some cases, this one-step process involves a certain amount of complexity in obtaining an appropriate mix of source materials. Therefore, a two-step process was developed, where: in the first step, a surface modification layer was formed (for example, from two gasses similar to the manner in which this was done in the examples of Table 6); then, in the second step, the surface modification layer was treated in various manners to increase the surface energy and polar groups available for bonding to the thin glass sheet. Although more steps, this process was less complex to manage to obtain desirable results. The treatments increase the polar groups at the surface of the surface modification layer that will be bonded to the thin sheet. Thus, polar groups are available for bonding the carbonaceous layer to the thin sheet, even though the bulk of the surface modification layer may not, in some instances, contain polar groups. The various manners of treating the initial surface modification layer are explored in the examples of Tables 8-12, wherein: in the examples of Table 8, the surface modification layer is treated with NH3; in the examples of Table 9, the surface modification layer is treated with N2; in the examples of Table 10, the surface modification layer is treated sequentially with N2 then H2; the examples of Table 11, the surface modification layer is treated sequentially with N2-O2 and then with N2; in the examples of Table 12, the surface modification layer is treated with N2-O2; and in the alternative examples following Table 12, the surface modification layer is treated with O2 alone. These example show the use of nitrogen and oxygen polar groups, but other polar groups may be possible.

Forming a Carbonaceous Surface Modification Layer with Hydrocarbon (For Example, Methane CH4), and Optionally Hydrogen (For Example, H2)

Another example of using plasma polymerized films to tune the surface energy of, and cover surface hydroxyls on, a bonding surface is deposition of a surface modification layer thin film from a carbon-containing gas, for example, a hydrocarbon gas, for example methane, optionally together with another gas (for example, hydrogen H2) during plasma polymerization. In most cases, though, hydrogen flow is preferred because otherwise the deposited material tends to be graphitic, dark and has a low band gap. This is the same throughout the carbonaceous surface modification layer examples of Tables 6-12 and 16. The surface modification layer may be formed in atmospheric or reduced pressure, and is performed with plasma excitation for example, DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application and by controlling the film properties, the surface energy of a bonding surface can be tuned. The surface energy can be tuned so as to control the degree of bonding, i.e., so as to prevent permanent covalent bonding, between the thin sheet and the carrier during subsequent treatments performed to dispose films or structures on the thin sheet.

In the examples of Table 6, below, various conditions were used to deposit a plasma polymerized film onto a glass carrier. The deposition parameters explored in the examples of Table 6 were: gas ratio (methane:hydrogen); pressure, ICP coil and RF bias power. The glass carrier was a substrate made from Corning® Eagle XG®, alumino boro silicate alkali-free display glass (Available from Corning Incorporated, Corning N.Y.). Before film deposition, the carriers were cleaned using an SC1 and/or an SC2 chemistry and standard cleaning techniques. The films were deposited in an Oxford Plasmalab 380 ICP (available from Oxford Instruments, Oxfordshire UK) Inductively Coupled Plasma (ICP) tool wherein the carrier sat on a platen to which a specified number of Watts (noted in the "RF Bias" column) of 13.56 MHz RF energy was applied, above the platen there was disposed a coil to which a specified number of Watts (noted in the "Coil" column) of 13.5 MHz RF energy was applied. The flow-rates of the methane (CH4) and hydrogen (H2) source into the chamber were as shown in the CH4 and H2 columns respectively (flowrates being in standard cubic centimeters per minute—sccm). The CH4 and H2 gasses were flowed together. Also shown is the ratio of H2:CH4 source gasses in the "H2/CH4" column, and the pressure of the chamber (in mTorr) in the "Pressure" column. Thus, for example, the notation in Table 6 for example 6a is read as follows: in an Oxford ICP apparatus, 6.7 sccm of CH4 and 33.3 sccm of H2 were flowed together into a chamber having a pressure of 20 mTorr; 1500 W of 13.5 MHz RF energy was applied to the coil and 300 W of 13.56 MHz RF energy was applied to the platen on which the carrier sat. Platen temperature was 30 C for all depositions. The notation for the remaining examples can be read in a similar manner. Surface energies were calculated in mJ/m$^2$ (milli Joules per square meter) by using the contact angles (CA) of three different test liquids (in this case, de-ionized water (shown in column "W"), hexadecane (shown in column "H"), and di-iodomethane (shown in column "DIM")) and the Wu model. For the surface energies, the polar (P) and dispersive (D) components, as well as total (T), are shown.

TABLE 6

Forming Surface Modification Layers from Methane and Methane/Hydrogen Source Gasses

| | Source Gasses | | | Chamber Conditions | | | Contact Angles | | | Surface Energy (mJ/m^2) | | |
| --- | --- | --- | --- | --- | --- | --- | --- | --- | --- | --- | --- | --- |
| Example | H2/CH4 | CH4 | H2 | Pressure (mtorr) | RF Bias (W) | Coil (W) | W | H | DIM | D | P | T |
| 6a | 5 | 6.7 | 33.3 | 20 | 300 | 1500 | 85.2 | 4.6 | 40.9 | 32.87 | 7.61 | 40.48 |
| 6b | 0 | 40.0 | 0.0 | 5 | 300 | 1500 | 72 | 4.47 | 35.33 | 33.92 | 13.31 | 47.23 |
| 6c | 0 | 40.0 | 0.0 | 20 | 300 | 750 | 79.7 | 3.8 | 40.63 | 32.95 | 9.97 | 42.92 |
| 6d | 5 | 6.7 | 33.3 | 20 | 50 | 750 | 82.37 | 3.47 | 40.6 | 32.95 | 8.82 | 41.77 |
| 6e | 0 | 40.0 | 0.0 | 20 | 50 | 1500 | 82.27 | 4.5 | 44.07 | 32.24 | 9.03 | 41.27 |
| 6f | 2.5 | 11.4 | 28.6 | 12.5 | 175 | 1125 | 81.67 | 4.67 | 38.53 | 33.33 | 9 | 42.33 |
| 6g | 2.5 | 11.4 | 28.6 | 12.5 | 175 | 1125 | 72.5 | 4.37 | 41.53 | 32.76 | 13.36 | 46.12 |
| 6h | 5 | 6.7 | 33.3 | 5 | 50 | 1500 | 72 | 4.8 | 34.97 | 33.97 | 13.3 | 47.27 |
| 6i | 0 | 40.0 | 0.0 | 5 | 50 | 750 | 73.17 | 3.73 | 34.57 | 34.06 | 12.71 | 46.77 |
| 6j | 5 | 6.7 | 33.3 | 5 | 300 | 750 | 66.3 | 3.7 | 36.07 | 33.79 | 16.15 | 49.94 |

The surface energies for examples 6a-6j varied from about 40 to about 50 mJ/m$^2$. However, by and large, the surface energies for these examples were less than about 50 mJ/m$^2$ (considered appropriate for controllably bonding a glass carrier to a glass thin sheet). The thickness of the surface modification layer was about 6 nm. These examples did not produce sufficient adhesion between the carrier and a thin glass sheet to survive FPD processing, i.e., they were observed to bubble during vacuum testing, and were observed to have hot water infiltration during the wet process testing.

Although, these surface modification layers themselves were not suitable for bonding to a thin glass sheet, they may be used in other applications, for example, applying a polymer thin sheet to a glass carrier for processing electronic or other structures onto the thin polymer sheet, as discussed below. Alternatively, the thin sheet may be a composite sheet having a polymer surface that may be bonded to the glass carrier. In this instance, the composite sheet may include a glass layer on which electronic or other structures may be disposed, whereas the polymer portion forms the bonding surface for controlled bonding with a glass carrier.

In the examples of Table 6, although the bonding surface on which the surface modification layers were disposed was glass, such need not be the case. Instead, the bonding surface may be another suitable material having a similar surface energy and properties as glass, for example, silicon, polysilicon, single crystal silicon, ceramic, glass-ceramic, sapphire, or quartz.

One-Step Forming of a Surface Modification Layer with a Mixture of Non-Fluorinated Sources Another example of using plasma polymerized films to tune the surface energy of, and cover surface hydroxyls on, a bonding surface is deposition of a surface modification layer thin film from a mixture of non-fluorinated gas sources, including a carbon-containing gas, for example, a hydrocarbon. Deposition of the surface modification layer may take place in atmospheric or reduced pressure, and is performed with plasma excitation for example, DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application, and by controlling the film properties, the surface energy of a bonding surface can be tuned. The surface energy can be tuned so as to control the degree of bonding, i.e., so as to prevent permanent covalent bonding, between the thin sheet and the carrier during subsequent treatments performed to dispose films or structures on the thin sheet.

In the examples of Table 7, below, various conditions were used to deposit a plasma polymerized film onto a glass carrier. The glass carrier was a substrate made from Corning® Eagle XG®, alumino boro silicate alkali-free display glass (Available from Corning Incorporated, Corning N.Y.). Before film deposition, the carriers were cleaned using an SC1 and/or an SC2 chemistry and standard cleaning techniques. The films were deposited in an Oxford Plasmalab 380 ICP (available from Oxford Instruments, Oxfordshire UK) in Inductively Coupled Plasma (ICP) configuration mode wherein the carrier sat on a platen to which a specified number of Watts (noted in the "RF Bias" column) of 13.56 MHz RF energy was applied, above the platen there was disposed a coil to which a specified number of Watts (noted in the "Coil" column) of 13.5 MHz RF energy was applied. The flow-rates of the methane (CH4), nitrogen (N2) and hydrogen (H2), source gasses into the chamber were as shown in the CH4, N2 and H2 columns respectively (flow-rates being in standard cubic centimeters per minute—sccm). The CH4, N2, and H2, gasses were flowed together. Also shown is the ratio of N2:CH4 source gasses in the "N2/CH4" column, and the pressure of the chamber (in mTorr) in the "Pressure" column. Thus, for example, the notation in Table 7 for example 7g is read as follows: in an Oxford 380 ICP apparatus, 15.4 sccm of CH4, 3.8 sccm of N2, and 30.8 sccm of H2 were flowed together into the chamber having a pressure of 5 mTorr; 1500 W of 13.5 MHz RF energy was applied to the shower head; and 50 W of 13.56 MHz RF energy was applied to the platen on which the carrier sat. Platen temperature was 30 C for all samples in Table 7. The notation for the remaining examples can be read in a similar manner. Surface energies were calculated in $mJ/m^2$ (milli Joules per square meter) by using the contact angles (CA) of three different test liquids (in this case, de-ionized water (shown in column "W"), hexadecane (shown in column "H"), and di-iodomethane (shown in column "DIM")) and the Wu model. For the surface energies, the polar (P) and dispersive (D) components, as well as total (T), are shown. Additionally, in the "Thickness" column are shown are thickness values (in Angstroms) for the surface modification layer deposited as per the conditions noted for that particular example.

TABLE 7

Forming Surface Modification Layer with Methane Nitrogen and Hydrogen

| | Source Gasses | | | | Chamber Conditions | | | Contact Angle | | | Surface Energy (mJ/m^2) | | | Thickness | Roughness |
| --- | --- | --- | --- | --- | --- | --- | --- | --- | --- | --- | --- | --- | --- | --- | --- |
| | | | | | Pressure | RF Bias | Coil | | | | | | | | |
| Example | N2/CH4 | CH4 | N2 | H2 | (mtorr) | (W) | (W) | W | H | DIM | D | P | T | (A) | (A) |
| 7a | 0 | 50.0 | 0.0 | 0.0 | 5 | 50 | 1500 | 77.93 | 3.93 | 37.1 | 33.61 | 10.63 | 44.24 | 70.4 | 108 |
| 7b | 0.25 | 40.0 | 10.0 | 0.0 | 5 | 50 | 1500 | 42.53 | 4.03 | 36.27 | 33.75 | 28.73 | 62.48 | 50.3 | 12.6 |
| 7c | 0.5 | 33.3 | 16.7 | 0.0 | 5 | 50 | 1500 | 41.7 | 4.27 | 35.73 | 33.85 | 29.11 | 62.96 | 60.5 | 0.1 |
| 7d | 1 | 25.0 | 25.0 | 0.0 | 5 | 50 | 1500 | 36.07 | 4.43 | 51.17 | 30.76 | 33.36 | 64.12 | 58.6 | 0.62 |
| 7e | 4 | 10.0 | 40.0 | 0.0 | 5 | 50 | 1500 | 41.77 | 23.03 | 45.83 | 30.58 | 30.39 | 60.97 | 59.4 | 2.3 |
| 7f | 0 | 16.6 | 0.0 | 33.2 | 5 | 50 | 1500 | 75.87 | 4.57 | 29.23 | 34.94 | 11.24 | 46.18 | 52.2 | 14.5 |
| 7g | 0.25 | 15.4 | 3.8 | 30.8 | 5 | 50 | 1500 | 44.4 | 3.63 | 59.97 | 28.87 | 29.74 | 58.61 | 51.47 | 13.2 |
| 7h | 0.5 | 14.3 | 7.1 | 28.6 | 5 | 50 | 1500 | 34 | 4.33 | 34.37 | 34.08 | 32.88 | 66.96 | 52.6 | 9 |
| 7i | 1 | 12.5 | 12.5 | 25.0 | 5 | 50 | 1500 | 38.63 | 3.93 | 34.33 | 34.11 | 30.55 | 64.66 | 58 | 0.434 |
| 7j | 4 | 7.1 | 28.7 | 14.2 | 5 | 50 | 1500 | 33.7 | 4.57 | 33.6 | 34.22 | 32.98 | 67.2 | 58.6 | 1.86 |

Example 7a shows a surface modification layer made from methane alone. Under these deposition conditions, the methane-formed surface modification layer achieved on the carrier a surface energy of only about 44 mJ/m². Although this is not at the desired level for glass to glass controlled bonding, it may be useful for bonding a polymer bonding surface to a glass carrier.

Examples 7b to 7e show a surface modification layer made from plasma polymerization of methane and nitrogen at various ratios of N2:CH4. Under these deposition conditions, the methane-nitrogen formed surface modification layer achieved on the carrier a surface energy of from about 61 mJ/m² (example 7e) to about 64 mJ/m² (example 7d). These surface energies are sufficient for controllably bonding a thin glass sheet to a glass carrier.

Example 7f shows a surface modification layer made from plasma polymerization of methane and hydrogen (H2). Under these deposition conditions, the methane-hydrogen formed surface modification layer achieved on the carrier a surface energy of about 60 mJ/m², which is sufficient for controllably bonding a thin glass sheet to a glass carrier.

Examples 7g to 7j show a surface modification layer made from plasma polymerization of methane, nitrogen, and hydrogen. Under these deposition conditions, the methane-nitrogen-hydrogen formed surface modification layer achieved on the carrier a surface energy of from about 58 mJ/m² (example 7g) to about 67 mJ/m² (example 7j), which are sufficient for controllably bonding a thin glass sheet to a glass carrier.

Thin glass and carriers bonded with a surface modification layer formed as per examples 7b to 7j were observed not to permanently adhere after annealing at 450° C., i.e., they pass part (c) of the 400° C. temperature testing. De-bonding permits removal of devices fabricated on thin glass, and re-use of the carrier.

The thin glass sheet bonded to each of the carriers as per the examples (7b to 7j) of Table 7 was a substrate made from Corning® Willow® Glass, an alumino boro silicate alkali-free glass (Available from Corning Incorporated, Corning N.Y.), and having a thickness of 100, 130, and 150, microns. Before bonding, the Willow® Glass was cleaned using an oxygen plasma followed by SC1 and/or SC2 chemistry and standard cleaning techniques.

In the examples of Table 7, although the bonding surface on which the surface modification layers were disposed was glass, such need not be the case. Instead, the bonding surface may be another suitable material having a similar surface energy and properties as glass, for example, silicon, poly-silicon, single crystal silicon, ceramic, glass-ceramic, sapphire, or quartz.

The surface modification layers of the examples of Table 7 are formed in a one-step process. That is, appropriate surface energy and polar group inclusion are achieved by depositing the surface modification layer from a select mixture of gasses under appropriate conditions. Although the appropriate gasses and conditions were achieved, the process involves a certain amount of complexity to carry out the appropriate gas mixture. Thus, a simpler process was sought. It was postulated that an appropriate surface energy and appropriate polar groups could be achieved from a two-step process, wherein each step would be simple and stable. Specifically, it was postulated that in the first step, there would be deposited a carbonaceous surface modification layer, whereas in the second step, the surface modification layer would be treated to increase surface energy and develop the appropriate polar groups for controlled boning, wherein the polar groups may be more concentrated at the surface of the surface modification layer to which the thin sheet will be bonded than they are in the bulk material. From the examples of Table 6, it was learned that pressure and coil power have the largest impact on surface energy. Also, it was learned that thickness of the film was seen to increase with increasing bias and decreasing pressure. Thus, from these results there was chosen as the starting point, for further exploration of treatments to increase surface energy and incorporate polar groups, an amorphous hydrocarbon polymer surface modification layer deposition process of 20 sccm CH4 40 sccm H2 5 mT 1500/50 W 60 s that created a carbonaceous surface modification layer of about 6.5 nm in thickness. To the base surface modification layer, various treatments were performed in a second step, as set forth in the examples of Tables 8-11, to modify the polar groups, and concentrations thereof, at the surface of the surface modification layer to which the thin sheet is to be bonded. Although specific examples of starting materials for the surface modification layer and treatment materials are discussed below, generally, a carbonaceous layer is formed from a carbon-containing source, and then polar groups are added by subsequent treatment. Similarly, although specific polar groups are shown through the examples, others may be possible.

Introduction of Polar Groups, by NH3 Treatment, to a Carbonaceous Surface Modification Layer Another example of using plasma polymerized films to tune the surface energy of, and create alternative polar bonding sites on, a bonding surface is deposition of a thin surface modification layer film from a carbon source, for example, methane (a carbon-containing gas source), and from hydrogen H2, followed by nitrogen treatment of the just-formed surface modification layer. The nitrogen treatment may be performed with an ammonia plasma treatment, for example. Deposition of the surface modification layer may take place in atmospheric or reduced pressure, and with plasma excitation for example DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the film thickness, density, and chemistry to tailor the functional groups to the desired application and by controlling the film properties, the surface energy of a bonding surface can be tuned. The nitrogen based polar groups, formed during the subsequent ammonia plasma treatment, do not condense with silanol groups to cause permanent covalent bonding and, thus, are able to control the degree of bonding between the thin sheet and the carrier during subsequent treatments performed to dispose films or structures on the thin sheet.

In the examples of Table 8, below, various conditions were used to deposit a plasma polymerized surface modification layer film onto a glass carrier. The glass carrier was a substrate made from Corning® Eagle XG®, alumino boro silicate alkali-free display glass (Available from Corning Incorporated, Corning N.Y.). Before film deposition, the carriers were cleaned using an SC1 and/or an SC2 chemistry and standard cleaning techniques. The surface treatments were deposited in an Oxford Plasmalab 380 ICP (available from Oxford Instruments, Oxfordshire UK) in Inductively Coupled Plasma (ICP) configuration mode wherein the carrier sat on a platen to which a specified number of Watts of 13.56 MHz RF energy was applied, above the platen there was disposed a coil to which a specified number of Watts of 13.5 MHz RF energy was applied. For the energy applied, more generally, the numbers are shown as a #/#W, wherein the number before the slash is the Wattage applied to the coil (shower head), and the number after the slash is the Wattage applied to the platen. Where there is only one number shown, this is for the coil. The flow-rates of the gasses into the chamber were as shown in Table 8 (flowrates being in standard cubic centimeters per minute—sccm). During the plasma treatment of the surface modification layer (SML), the temperature of the chamber was 30° C. Thus, for example, the notation in the "Surface Treatment" column of Table 8 for example 8a is read as follows: in an Oxford ICP apparatus, 40 sccm of CH4, was flowed into a chamber having a pressure of 5 mTorr; 1500 W of 13.5 MHz RF energy was applied to the shower head; 50 W of 13.56 MHz RF energy was applied to the platen on which the carrier sat; the chamber was at a temperature of 30° C.; and the deposition time was 60 seconds. The notation in the Surface Treatment column for the remaining examples can be read in a similar manner except that surface treatments were performed in an STS Multiplex PECVD (available from SPTS, Newport, UK). Carriers sat on a grounded electrode held at 200 C, and gases were introduced through a 13.56 MHz RF driven showerhead. By way of further example, in the "Plasma Treatment" column, the notation for the treatment in example 8a is read as follows: after the surface modification layer is formed as per the parameters in the Surface Treatment column of example 8a, then 100 sccm of NH3 is supplied to the chamber having a pressure of 1 Torr, and a temperature of 200° C.; 300 W of 13.56 MHz RF is applied to the showerhead and the treatment is carried out for 60 seconds. The notation in the "Plasma Treatment" column for the remaining examples is read in a similar manner. Surface energies were calculated in mJ/m$^2$ (milli Joules per square meter) by using the contact angles of three different test liquids (in this case, de-ionized water, hexadecane (H), and di-iodomethane (DIM)) and the Wu model. For the surface energies, the polar (P) and dispersive (D) components, as well as total (T), are shown.

ammonia was used by itself with 300 W of power, whereas in example 8d, the ammonia was diluted with helium and the polymerization carried out at a lower power of 50 W. Thin glass and carriers bonded with a surface modification layer formed as per examples 8a-8d were observed not to permanently adhere after annealing at 450° C., i.e., they were able to survive part (c) of the 400° C. temperature testing. Outgassing tests were not performed on these samples. Also, these examples were strong enough to survive FPD processing (including the above-described vacuum testing (1), wet process testing (2), and ultrasonic testing (5)) and remained de-bondable by application of sufficient peeling force. De-bonding permits removal of devices fabricated on thin glass, and re-use of the carrier.

The thin glass sheet bonded to each of the carriers as per the examples of Table 8 was a substrate made from Corning® Willow® Glass, an alumino boro silicate alkali-free glass (Available from Corning Incorporated, Corning N.Y.), and having a thickness of 100, 130, and 150, microns. Before bonding, the Willow® Glass was cleaned using an oxygen plasma followed by SC1 and/or SC2 chemistry and standard cleaning techniques.

In the examples of Table 8, although the bonding surface on which the surface modification layers were disposed was glass, such need not be the case. Instead, the bonding surface may be another suitable material having a similar surface energy and properties as glass, for example, silicon, poly-silicon, single crystal silicon, ceramic, glass-ceramic, sapphire, or quartz.

Introduction of Polar Groups, by N2 Treatment, to a Carbonaceous Surface Modification Layer Another example of using plasma polymerized films to tune the surface energy of, and create alternative polar bonding sites on, a bonding surface is deposition of a surface modification layer thin film from a carbon source (for example a carbon-containing gas, for example, methane), and from hydrogen H2, followed by nitrogen treatment of

TABLE 8

Ammonia Treatment of Methane, and Methane/Hydrogen, Formed Surface Modification Layers

| Example | Surface Layer Deposition | Plasma Treatment | Contact Angle | | | Surface Energy (mJ/m^2) | | |
|---|---|---|---|---|---|---|---|---|
| | | | W | H | DIM | D | P | T |
| 8a | 40CH4 5 mT 1500/50 W 60 s | 100NH3 1 torr 300 W 200 C. 60 s | 13.4 | 3.77 | 42.2 | 32.63 | 41.36 | 73.99 |
| 8b | 40CH4 5 mT 1500/50 W 60 s | 100NH3 1000He 1 torr 50 W 200 C. 60 s | 38.63 | 3.33 | 24.27 | 35.69 | 29.95 | 65.64 |
| 8c | 20CH4 40H2 5 mT 1500/50 W 60 s | 100NH3 1 torr 300 W 200 C. 60 s | 20.93 | 3.07 | 37.07 | 33.62 | 38.63 | 72.25 |
| 8d | 20CH4 40H2 5 mT 1500/50 W 60 s | 100NH3 1000He 1 torr 50 W 200 C. 60 s | 43.9 | 3.37 | 28.47 | 35.08 | 27.51 | 62.59 |

Examples 8a and 8b show a plasma polymerized hydrocarbon surface modification layer that was subsequently treated with a nitrogen-containing gas (ammonia). In the case of example 8a, the ammonia was used by itself with 300 W of power, whereas in example 8b, the ammonia was diluted with helium and the polymerization carried out at a lower power of 50 W. In each case, though, a sufficient surface energy was attained on the carrier bonding surface to allow it to be controllably bonded to a thin glass sheet. Examples 8c and 8d show a plasma polymerized hydrocarbon surface modification layer that was formed by hydrocarbon-containing (methane) and hydrogen-containing (H2) gasses and then subsequently treated with a nitrogen-containing gas (ammonia). In the case of example 8c, the the just-formed surface modification layer. The nitrogen treatment, to form nitrogen based polar groups on the surface modification layer, may be performed by plasma treatment with N2 gas. Deposition of the surface modification layer may take place in atmospheric or reduced pressure, and with plasma excitation for example, DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application and by controlling the film properties, the surface energy of a bonding surface can be tuned. The nitrogen based polar groups, formed during the subsequent plasma treatment, do not condense with silanol groups to cause permanent covalent bonding and, thus, are able to control the degree of bonding between the thin sheet and the carrier during subsequent treatments performed to dispose films or structures on the thin sheet.

In the examples of Table 9, below, various conditions were used to nitrogen treat a plasma polymerized film deposited onto a glass carrier. The glass carrier was a substrate made from Corning® Eagle XG®, alumino boro silicate alkali-free display glass (Available from Corning Incorporated, Corning N.Y.). Before surface modification layer deposition, the carriers were cleaned using an SC1 and/or an SC2 chemistry and standard cleaning techniques. The surface modification layers were deposited in an Oxford Plasmalab 380 ICP (available from Oxford Instruments, Oxfordshire UK) in Inductively Coupled Plasma (ICP) configuration mode wherein the carrier sat on a platen to which 50 W of 13.56 MHz energy was applied, above the platen there was disposed a coil to which 1500 W of 13.5 MHz RF energy was applied. 20 sccm of methane (CH4) and 40 sccm of hydrogen (H2) were flowed into a chamber at a pressure of 5 mTorr. Surface treatment times were 60 sec, and platen temperature was 30 C for all samples listed in Table 9. After the foregoing deposition, the surface modification layer was treated with nitrogen. Specifically, during treatment a specified number of Watts (noted in the "RF Bias" column) of 13.56 MHz RF energy was applied to the platen, above the platen there was disposed a coil to which a specified number of Watts (noted in the "Coil" column) of 13.5 MHz RF energy was applied. N2 was flowed into the chamber at a rate of 40 sccm for the time (in seconds—s) listed in the table. Thus, for example, the notation for nitrogen treatment in Table 9 for example 9a is read as follows: in an Oxford ICP apparatus, 40 sccm of N2 was flowed into a chamber having a pressure of 5 mTorr; 1500 W of 13.5 MHz RF energy was applied to the shower head; and 300 W of 13.56 MHz RF energy was applied to the platen on which the carrier sat which was temperature controlled to 30 C, and the treatment was carried out for 10 seconds. The notation for the remaining examples can be read in a similar manner. Surface energies were calculated in mJ/m2 (milli Joules per square meter) by using the contact angles (CA) of three different test liquids (in this case, de-ionized water (shown in column "W"), hexadecane (shown in column "HD"), and di-iodomethane (shown in column "DIM")) and the Wu model. For the surface energies, the polar (P) and dispersive (D) components, as well as total (T), are shown.

TABLE 9

Nitrogen Treatment of Methane/Hydrogen Formed Surface Modification Layer

| | Chamber Conditions | | | | Contact Angle | | | Surface Energy (mJ/m^2) | | |
|---|---|---|---|---|---|---|---|---|---|---|
| Example | Time (s) | Pressure (mtorr) | RF Bias (W) | Coil (W) | W | HD | DIM | D | P | T |
| 9a | 10.0 | 5 | 300 | 1500 | 42.67 | 4.8 | 37.83 | 33.46 | 28.73 | 62.19 |
| 9b | 60.0 | 5 | 50 | 1500 | 40.43 | 4.8 | 37.57 | 33.51 | 29.91 | 63.42 |
| 9c | 60.0 | 5 | 300 | 750 | 40.87 | 4.87 | 35.47 | 33.87 | 29.51 | 63.38 |
| 9d | 35.0 | 12.5 | 175 | 1125 | 48.07 | 5.23 | 37.03 | 33.59 | 25.86 | 59.45 |
| 9e | 35.0 | 12.5 | 175 | 1125 | 41.23 | 5.33 | 35.87 | 33.79 | 29.39 | 63.18 |
| 9f | 60.0 | 20 | 300 | 1500 | 41.67 | 4.93 | 44.93 | 32.05 | 29.87 | 61.92 |
| 9g | 10.0 | 20 | 50 | 1500 | 43.7 | 5.37 | 35.5 | 33.86 | 28.06 | 61.92 |
| 9h | 10.0 | 5 | 50 | 750 | 54.13 | 4.67 | 36.33 | 33.73 | 22.54 | 56.27 |
| 9i | 60.0 | 20 | 50 | 750 | 57.6 | 5.3 | 39.7 | 33.08 | 20.88 | 53.96 |
| 9J | 10.0 | 20 | 300 | 750 | 52.6 | 4.43 | 37.77 | 33.47 | 23.43 | 56.9 |

Examples 9a-9j show that various conditions may be used for the nitrogen treatment of a methane/hydrogen formed surface modification layer, whereby a variety of surface energies may be obtained, i.e., from about 53 mJ/m$^2$ (example 9i) to about 63 mJ/m$^2$ (example 9b), which are suitable for bonding to a thin glass sheet. These surface energies, obtained after nitrogen treatment, were increased from about 42 mJ/m$^2$ (obtained from the base layer formed from methane-hydrogen plasma polymerization). Thin glass and carriers bonded with a surface modification layer formed as per examples 9a-9j were observed not to permanently adhere after annealing at 450° C., i.e., they pass part (c) of the 400° C. temperature testing. Outgassing tests were not performed on these samples. Also, these examples were strong enough to survive FPD processing (including the above-described vacuum testing (1), wet process testing (2), and ultrasonic testing (5)) and remained de-bondable by application of sufficient peeling force. De-bonding permits removal of devices fabricated on thin glass, and re-use of the carrier.

The thin glass sheet bonded to each of the carriers as per the examples of Table 9 was a substrate made from Corning® Willow® Glass, an alumino boro silicate alkali-free glass (Available from Corning Incorporated, Corning N.Y.), and having a thickness of 100, 130, and 150, microns. Before bonding, the Willow® Glass was cleaned using an oxygen plasma followed by SC1 and/or SC2 chemistry and standard cleaning techniques.

In the examples of Table 9, although the bonding surface on which the surface modification layers were disposed was glass, such need not be the case. Instead, the bonding surface may be another suitable material having a similar surface energy and properties as glass, for example, silicon, polysilicon, single crystal silicon, ceramic, glass-ceramic, sapphire, or quartz.

Introduction of Polar Groups, by Sequential N2 then H2 Treatment, to a Carbonaceous Surface Modification Layer Another example of using plasma polymerized films to tune the surface energy of, and create alternative polar bonding sites on, a bonding surface is deposition of a surface modification layer thin film from a carbon source, for example methane (a carbon-containing gas), and from hydrogen H2, followed by sequential nitrogen then hydrogen treatment of the just-formed surface modification layer. Deposition of the surface modification layer may take place in atmospheric or reduced pressure, and is performed with plasma excitation for example, DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application, and by controlling the film properties, the surface energy of a bonding surface can be tuned. The nitrogen based polar groups, formed during the subsequent plasma treatment, do not condense with silanol groups to cause permanent covalent bonding and, thus, are able to control the degree of bonding between the thin sheet and the carrier during subsequent treatments performed to dispose films or structures on the thin sheet.

In the examples of Table 10, below, various conditions were used to treat (with nitrogen and sequentially then with hydrogen) a plasma polymerized film deposited onto a glass carrier. The glass carrier was a substrate made from Corning® Eagle XG®, alumino boro silicate alkali-free display glass (Available from Corning Incorporated, Corning N.Y.). Before film deposition, the carriers were cleaned using an SC1 and/or an SC2 chemistry and standard cleaning techniques. The films were deposited in an Oxford Plasmalab 380 ICP (available from Oxford Instruments, Oxfordshire UK) in Inductively Coupled Plasma (ICP) configuration mode wherein the carrier sat on a platen to which 50 W of 13.56 MHz energy was applied, above the platen there was disposed a coil to which 1500 W of 13.5 MHz RF energy was applied. 20 sccm of methane (CH4) and 40 sccm of hydrogen (H2) were flowed into a chamber at a pressure of 5 mTorr. Surface treatment times were 60 sec, and platen temperature was 30 C for all samples listed in Table 9. After the foregoing deposition, the surface modification layer was treated sequentially with nitrogen and then with hydrogen. Specifically, in each case, for nitrogen treating: 40 sccm of N2 was flowed into the chamber to which 1500 W of 13.5 MHz RF energy was applied; the chamber was at a pressure of 5 mTorr; to the platen was applied 50 W of 13.56 MHz RF energy; and the treatment was carried out for 60 seconds. Then, during the hydrogen treatment a specified number of Watts (noted in the "RF" column of Table 10) of 13.56 MHz RF energy was applied to the platen, above the platen there was disposed a coil to which a specified number of Watts (noted in the "Coil" column) of 13.5 MHz RF energy was applied. H2 was flowed into the chamber at a rate of 40 sccm for the time (in seconds—s) listed in the table. Thus, for example, the notation for hydrogen treatment (carried out after the thin film deposition, and the N2 treating thereof as described above) in Table 10 for example 10a is read as follows: in an Oxford ICP apparatus, 40 sccm of H2 was flowed into a chamber having a pressure of 20 mTorr; 750 W of 13.5 MHz RF energy was applied to the shower head; and 50 W of 13.56 MHz RF energy was applied to the platen on which the carrier sat, and the treating was carried out for 15 seconds. The notation for the remaining examples can be read in a similar manner. Surface energies were calculated in mJ/m2 (milli Joules per square meter) by using the contact angles (CA) of three different test liquids (in this case, de-ionized water (shown in column "W"), hexadecane (shown in column "H"), and di-iodomethane (shown in column "DIM")) and the Wu model. For the surface energies, the polar (P) and dispersive (D) components, as well as total (T), are shown.

TABLE 10

Sequential Nitrogen, then Hydrogen, Treatment of Methane/Hydrogen Formed Surface Modification Layer

| | Chamber Conditions | | | | Contact Angle | | | Surface Energy (mJ/m^2) | | |
|---|---|---|---|---|---|---|---|---|---|---|
| Example | Time (s) | Pressure (mT) | Coil (W) | RF (W) | W | H | DIM | D | P | T |
| 10a | 15.0 | 20.0 | 750.0 | 50.0 | 36.67 | 14.63 | 45.73 | 31.39 | 32.71 | 64.1 |
| 10b | 15.0 | 5.0 | 750.0 | 300.0 | 41.57 | 4.73 | 40.8 | 32.89 | 29.53 | 62.42 |
| 10c | 60.0 | 5.0 | 750.0 | 300.0 | 43.1 | 3.7 | 36.53 | 33.72 | 28.42 | 62.14 |
| 10d | 60.0 | 5.0 | 2000.0 | 50.0 | 46.53 | 3.07 | 37.9 | 33.47 | 26.65 | 60.12 |
| 10e | 15.0 | 5.0 | 2000.0 | 50.0 | 39.97 | 3.7 | 36.03 | 33.81 | 30.05 | 63.86 |
| 10f | 15.0 | 20.0 | 2000.0 | 300.0 | 43 | 3.8 | 46.3 | 31.81 | 29.22 | 61.03 |
| 10g | 60.0 | 5.0 | 750.0 | 50.0 | 43.37 | 4.23 | 39.5 | 33.15 | 28.48 | 61.63 |
| 10h | 60.0 | 20.0 | 750.0 | 300.0 | 44.93 | 3.9 | 37.53 | 33.53 | 27.54 | 61.07 |
| 10i | 60.0 | 5.0 | 2000.0 | 300.0 | 42 | 3.67 | 37.1 | 33.61 | 29.04 | 62.65 |
| 10j | 60.0 | 20.0 | 2000.0 | 300.0 | 43.63 | 3.67 | 38 | 33.45 | 28.26 | 61.71 |
| 10k | 15.0 | 20.0 | 750.0 | 300.0 | 41.13 | 4.27 | 38.37 | 33.36 | 29.61 | 62.97 |
| 10l | 60.0 | 20.0 | 750.0 | 50.0 | 40.2 | 3.87 | 39.6 | 33.14 | 30.17 | 63.31 |
| 10m | 60.0 | 20.0 | 2000.0 | 50.0 | 43.73 | 3.4 | 37.33 | 33.51 | 28.18 | 61.69 |
| 10n | 15.0 | 20.0 | 2000.0 | 50.0 | 37.47 | 3.73 | 44.73 | 32.14 | 31.97 | 64.11 |
| 10o | 15.0 | 5.0 | 750.0 | 50.0 | 38.8 | 3.73 | 37.8 | 33.48 | 30.75 | 64.23 |
| 10p | 15.0 | 5.0 | 2000.0 | 300.0 | 39.27 | 3.47 | 38.77 | 33.3 | 30.57 | 63.87 |

Sequential N2 and then H2 plasma treatment, of a methane-hydrogen formed plasma polymerized surface modification layer, can be carried out under various conditions to achieve a variety of surface energies. As seen from Table 10, the surface energies varied from about 60 mJ/m$^2$ (example 10d) to about 64 mJ/m$^2$ (examples 10a, 10n, 10o, and 10p), which are suitable for bonding to a thin glass sheet. Thin glass and carriers bonded with a surface modification layer formed as per examples 10a-10p were observed not to permanently adhere after annealing at 450° C., i.e., they were able to pass part (c) of the 400° C. processing test. Also, these examples were strong enough to survive FPD processing (including the above-described vacuum testing (1), wet process testing (2), and ultrasonic testing (5)) and remained de-bondable by application of sufficient peeling force. De-bonding permits removal of devices fabricated on thin glass, and re-use of the carrier.

The thin glass sheet bonded to each of the carriers as per the examples of Table 10 was a substrate made from Corning® Willow® Glass, an alumino boro silicate alkali-free glass (Available from Corning Incorporated, Corning N.Y.), and having a thickness of 100, 130, and 150, microns. Before bonding, the Willow® Glass was cleaned using an oxygen plasma followed by SC1 and/or SC2 chemistry and standard cleaning techniques.

In the examples of Table 10, although the bonding surface on which the surface modification layers were disposed was glass, such need not be the case. Instead, the bonding surface may be another suitable material having a similar surface energy and properties as glass, for example, silicon, polysilicon, single crystal silicon, ceramic, glass-ceramic, sapphire, or quartz.

As a variation of the examples in Table 10, there was also performed the sequential nitrogen then hydrogen treatment of a methane-formed surface modification layer. In this case, the methane was used alone (without hydrogen) when forming by plasma polymerization the initial surface modification layer on the glass carrier. Specifically, 40 sccm of methane was flowed at a pressure of 5 mTorr, under a power of 1500/50 W for 60 seconds. The surface energy was measured to be about 42 $mJ/m^2$. Upon sequential treatment with nitrogen (40 sccm N2 at 5 mTorr pressure, 1500/50 W power, for 15 seconds) and then hydrogen (40 sccm H2 at 5 mTorr pressure, 1500/50 W power, for 15 seconds), the surface energy achieved on the carrier bonding surface increased to about 64 $mJ/m^2$, suitable for bonding a thin glass sheet to the glass carrier.

Sequential N2 and H2 treatment of the carbonaceous surface modification layer, as described above, achieves a surface energy of about 64 mJ/m2 and forms an initial room-temperature bond to the thin glass sheet with a bond front speed slightly less than typical with the fluorinated surface modification layers. As with the examples in Table 10, these samples were observed not to permanently adhere after annealing at 450° C., i.e., they were able to pass part (c) of the 400° C. processing test. Also, these examples were strong enough to survive FPD processing (including the above-described vacuum testing (1), wet process testing (2), and ultrasonic testing (5)) and remained de-bondable by application of sufficient peeling force. De-bonding permits removal of devices fabricated on thin glass, and re-use of the carrier.

Introduction of Polar Groups, by Sequential N2-O2 then N2 Treatment, to a Carbonaceous Surface Modification Layer Based on an idea to try to create more polar imide groups on the surface to increase bond front speed, there was explored sequential N2-O2 then N2 plasma treatment of the carbonaceous surface modification layer.

In this example of using plasma polymerized films to tune the surface energy of, and create alternative polar bonding sites on, a bonding surface is deposition of a carbonaceous surface modification layer thin film from a carbon source, for example a carbon-containing gas, (for example methane), and from hydrogen H2, followed by sequential N2-O2 and then N2 treatment of the just-formed surface modification layer. Deposition of the surface modification layer may take place in atmospheric or reduced pressure, and with plasma excitation for example, DC or RF parallel plate, Inductively Coupled Plasma (ICP), Electron Cyclotron Resonance (ECR), downstream microwave or RF plasma. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application and by controlling the film properties, the surface energy of a bonding surface can be tuned. The nitrogen based polar groups, formed during the subsequent plasma treatment, do not condense with silanol groups to cause permanent covalent bonding and, thus, are able to control the degree of bonding between the thin sheet and the carrier during subsequent treatments performed to dispose films or structures on the thin sheet.

In the examples of Table 11, below, various conditions were used to treat a plasma polymerized film deposited onto a glass carrier to increase surface energy and incorporate polar groups. The glass carrier was a substrate made from Corning® Eagle XG®, alumino boro silicate alkali-free display glass (Available from Corning Incorporated, Corning N.Y.). Before surface modification layer deposition, the carriers were cleaned using an SC1 and/or an SC2 chemistry and standard cleaning techniques.

In step 1, the surface modification layers were deposited in an Oxford Plasmalab 380 ICP (available from Oxford Instruments, Oxfordshire UK) in Inductively Coupled Plasma (ICP) configuration mode wherein the carrier sat on a platen to which 50 W of 13.56 MHz energy was applied, above the platen there was disposed a coil to which 1500 W of 13.5 MHz RF energy was applied. 20 sccm of methane (CH4) and 40 sccm of hydrogen (H2) were flowed into a chamber at a pressure of 5 mTorr. Surface treatment times were 60 sec, and platen temperature was 30 C for all samples listed in Table 11.

After the foregoing deposition of step 1, in step 2 the surface modification layer was treated with nitrogen and oxygen. Specifically, during the step 2 treatment, 50 W of 13.56 MHz RF energy was applied to the platen, above the platen there was disposed a coil to which 800 W of 13.5 MHz RF energy was applied. N2 and O2 were flowed into the chamber at the specified rate (in sccm) for the time (in seconds—s) listed in the table. Thus, for example, the notation for Step 2 in Table 11 for example 11a is read as follows: after the surface modification layer deposition in step 1, in an Oxford ICP apparatus, 35 sccm of N2 was flowed together with 5 sccm O2 into a chamber having a pressure of 15 mTorr; 800 W of 13.5 MHz RF energy was applied to the shower head; and 50 W of 13.56 MHz RF energy was applied to the platen on which the carrier sat which was temperature controlled to 30° C., and the treatment was carried out for 5 seconds. The notation for the remaining examples can be read in a similar manner.

After the foregoing treatment of step 2, in step 3 the surface modification layer was treated with nitrogen. Specifically, during the step 3 treatment, 50 W of 13.56 MHz RF energy was applied to the platen, above the platen there was disposed a coil to which 1500 W of 13.5 MHz RF energy was applied. N2 was flowed into the chamber at the specified rate (in sccm) for the time (in seconds—s) listed in the table. Thus, for example, the notation for Step 3 in Table 11 for example 11a is read as follows: after the surface modification layer deposition in step 1, and after the nitrogen-oxygen treatment in step 2, in an Oxford ICP apparatus, 40 sccm of N2 was flowed into a chamber having a pressure of 5 mTorr; 1500 W of 13.5 MHz RF energy was applied to the shower head; and 50 W of 13.56 MHz RF energy was applied to the platen on which the carrier sat which was temperature controlled to 30° C., and the treatment was carried out for 15 seconds. The notation for the remaining examples can be read in a similar manner.

Surface energies were calculated in mJ/m2 (milli Joules per square meter) by using the contact angles (CA) of three different test liquids (in this case, de-ionized water, hexadecane, and di-iodomethane) and the Wu model. For the surface energies, the total (T, which includes both polar and dispersion components) surface energy is shown. The bond energy was calculated in mJ/m2 as described above. The number of bubbles after initial bonding is indicated in the column entitled "23 C % Area", whereas the number of bubbles after a 400° C. temperature testing is indicated in the column entitled "400 C % Area". The number of bubbles was determined by optical scanner as described below in connection with "Outgassing". Lastly, the change in bubble area from that initially at 23° C. to that after the 400° C. temperature testing is indicated in the column entitled "Delta % Area".

process testing (2), and ultrasonic testing (5)) and remained de-bondable by application of sufficient peeling force after 400° C. temperature testing. De-bonding permits removal of devices fabricated on thin glass, and re-use of the carrier.

The impact of these sequential steps on surface energy, bond energy, and bubbling is shown in Table 11. Increasing the oxygen fraction in the N2-O2 step decreases surface energy and increased bubbling during outgassing testing. Performance with a brief (about 5 seconds) low oxygen fraction (38/2) N2-O2 step and subsequent short (15 second) N2 plasma treatment (example 11d) creates a surface energy of 69 mJ/m2 and a bubble area of 1.2% during a 400° C. temperature test (the change in % bubble area from that at 23° C. is −0.01, indicating no outgassing). The performance of samples 11a-e is comparable to the fluorinated surface modification layers at applications up to 400° C. temperature testing.

The thin glass sheet bonded to each of the carriers as per the examples of Table 11 was a substrate made from Corning® Willow® Glass, an alumino boro silicate alkali-free glass (Available from Corning Incorporated, Corning

TABLE 11

Sequential N2—O2, then N2, Treatment of Surface Modification Layer

| | Step 1 | Step 2 | Step 3 | T | Bond Energy | 23 C. % Area | 400 C. % Area | Delta % Area |
|---|---|---|---|---|---|---|---|---|
| 11a | 20CH4 40H2 5 mT 1500/50 W 60 s | 35N2 5O2 15 mT 800/50 W 5 s | 40N2 5 mT 1500/50 W 25 C. 15 s | 64.74 | 294.14 | 1.17 | 3.02 | 1.85 |
| 11b | 20CH4 40H2 5 mT 1500/50 W 60 s | 35N2 5O2 15 mT 800/50 W 15 s | 40N2 5 mT 1500/50 W 25 C. 15 s | 69.42 | 229.68 | 1.12 | 3.55 | 2.43 |
| 11c | 20CH4 40H2 5 mT 1500/50 W 60 s | 35N2 5O2 15 mT 800/50 W 5 s | 40N2 5 mT 1500/50 W 25 C. 60 s | 68.3 | 274.53 | 1.04 | 1.15 | 0.11 |
| 11d | 20CH4 40H2 5 mT 1500/50 W 60 s | 38N2 2O2 15 mT 800/50 W 5 s | 40N2 5 mT 1500/50 W 25 C. 15 s | 69.4 | 236.03 | 1.22 | 1.20 | −0.01 |
| 11e | 20CH4 40H2 5 mT 1500/50 W 60 s | 30N2 10O2 15 mT 800/50 W 5 s | 40N2 5 mT 1500/50 W 25 C. 15 s | 65.59 | 221.79 | 1.35 | 1.81 | 0.46 |
| 11f | 20CH4 40H2 5 mT 1500/50 W 60 s | 35N2 5O2 15 mT 800/50 W 5 s | | 65.62 | 86.09 | 1.53 | 16.36 | 14.83 |

Examples 11a-11e show that various conditions may be used for the sequential nitrogen-oxygen and then nitrogen treatment of a methane/hydrogen formed surface modification layer, whereby a variety of surface energies may be obtained, i.e., from about 65 mJ/m$^2$ (examples 11a and 11e) to about 70 mJ/m$^2$ (examples 11b and 11d), which are suitable for bonding to a thin glass sheet. These surface energies, obtained after sequential nitrogen-oxygen and then nitrogen treatments, were increased from about 40-50 mJ/m$^2$ (obtained from the base layer formed from methane-hydrogen plasma polymerization). Thin glass and carriers bonded with a surface modification layer formed as per examples 11a-11f were observed not to permanently adhere after annealing at 400° C., i.e., they pass part (c) of the 400° C. temperature testing. As shown for examples 11a-11e, the change in % bubble area during the 400° C. annealing is consistent with no outgassing. On the other hand, the change in % bubble area during 400° C. annealing for example 11f is consistent with some outgassing of the materials in the surface modification layer. Thus, to obtain no outgassing of a surface modification layer deposited according to the conditions in Table 11, step 3 is important. However, under other deposition/treatment conditions for steps 1 and 2, step 3 may not be necessary to obtain similar no outgassing results as obtained with step 3 for examples 11a-e. Also, these examples were strong enough to survive FPD processing (including the above-described vacuum testing (1), wet N.Y.), and having a thickness of 100, 130, and 150, microns. Before bonding, the Willow® Glass was cleaned using an oxygen plasma followed by SC1 and/or SC2 chemistry and standard cleaning techniques.

In the examples of Table 11, although the bonding surface on which the surface modification layers were disposed was glass, such need not be the case. Instead, the bonding surface may be another suitable material having a similar surface energy and properties as glass, for example, silicon, polysilicon, single crystal silicon, ceramic, glass-ceramic, sapphire, or quartz.

The above-described examples exemplify how an inductively coupled plasma (ICP) system can be utilized to deposit a thin organic surface modification layer suitable for controllably bonding a thin glass sheet to a glass carrier for device processing. However, the scalability of this solution for display applications (wherein substrates having large area are advantageous) is a concern. ICP tools utilize a planar, cylindrical, or hemispherical coil to inductively couple electrical current to create time varying magnetic fields which cause ions to circulate. Typically, a second RF source is connected to the platen upon which the substrate sits. An advantage of ICP plasma is that the ICP source can achieve high levels of ionization independent of the substrate bias which is controlled by the platen RF source. Current parallel plate reactive ion etch (RIE) systems cannot achieve as high levels of ionization. In addition, bias and ionization are coupled through RF power and pressure. TEL and others have scaled ICP etchers to Gen 5, but scaling larger is challenging to produce a uniform ICP plasma source. RIE mode processes, on the other hand, are suitable for parallel plate tools which have scaled to Gen 10. Thus, the inventors explored manners of achieving in an RIE mode process, similar results to those achieved with the ICP tools as described above.

Initial attempts to produce an RIE mode surface modification layer from non-fluorinated source materials by simply utilizing the Oxford in RIE mode (no coil power) and a bias power of 200 W, (equivalent to what is used for deposition of fluorinated surface modification layers) produced dark thick layers which could be nitrogen modified to bond to thin glass sheets. However, this dark material created many bubbles covering about 25% of the bonded area after undergoing a 400° C. processing test. Characterization of the dark deposits by spectroscopic ellipsometry showed films were about 100 nm thick and exhibited a much narrower optical band gap, 0.6 eV vs 1.7 eV for the ICP deposited surface modification layers. From this result it was concluded that the material was likely graphitic and increasing the hydrogen content would be a consideration for reducing the bubbling.

An experiment was performed to capture optical emission spectroscopy (OES) spectra to map the RIE process variables $H2/CH4$ ratio, RF power, and pressure. However, within the process window of the Oxford tool being used, these ratios could not be matched. This experiment did show, though, that the process would benefit from very high hydrogen dilution of the polymer forming gas, high RF power, and low pressure.

In addition to OES to guide the process translation from ICP to RIE mode, residual gas analysis (RGA) was used to map the gas phase species present in the Oxford as a function of hydrogen/methane ratio, RF power, and pressure in RIE mode. The contour map of $m/e=/16$ vs pressure and $H2/CH4$ gas ratio again showed that high hydrogen dilution is beneficial to match the ICP ratio of about 44. The higher order alkanes correlate with decreasing $H2/CH4$ gas ratio and increasing pressure. The contour map shows $m/e=28/16$ increasing with both RF and $H2/CH4$ gas ratio. Fitting the RGA response surfaces suggests the $H2/CH4$ and $C2H6/CH4$ ratios could be matched at 40:1 $H2/CH4$, 25 mTorr 275 W RF. A carbonaceous RIE mode surface modification layer deposited with this condition matched the about 6 nm thickness and 1.6 eV optical band gap of ICP mode carbonaceous surface modification layer. Initial experiments with nitrogen plasma treatment of the carbonaceous RIE surface modification layers also showed low bubbling.

The kinetics of RIE mode carbonaceous surface modification layer deposition using the process identified by the RGA experiment is shown in FIGS. 14 and 15. Surface energy, including total (T) as well as the polar (P) and dispersion (D) components, is shown in FIG. 14. As shown in FIG. 14, surface energy is relatively unchanged, with a slight peak at 60 sec deposition time, whereas in FIG. 15 it can be seen that film thickness increases nearly linearly on a log-log scale. This is not a self-limited process as the etch-back from hydrogen cannot keep up with the polymer deposition.

As discussed above, from experience it was seen that a surface energy of ≥ about 50 or ≥65 $mJ/m2$ is beneficial in minimizing bubble area both at initial room-temperature bonding, as well as during thermal cycling. From FIG. 14, it can be seen that the surface energy is right on the borderline. In some instances, this may be suitable for bonding a thin sheet to a carrier, depending upon the time-temperature cycle through which it will undergo, as well as depending upon the other FPD processes which it must endure. On the other hand, though, it would be beneficial to raise the surface energy of this surface modification layer. Any of the above-described subsequent treatments could be used, for example, ammonia treatment, nitrogen treatment, sequential nitrogen then hydrogen treatment, nitrogen-oxygen treatment, sequential nitrogen-oxygen then nitrogen treatment. As an example, a nitrogen-oxygen treatment will be described in connection with Table 12.

Introduction of Polar Groups, by Nitrogen-Oxygen Treatment, to a Carbonaceous Surface Modification Layer Another example of using plasma polymerized films to tune the surface energy of, and create alternative polar bonding sites on, a bonding surface is deposition of a thin surface modification layer film in RIE mode from a carbon source (for example, methane, a carbon-containing gas), and from hydrogen (H2), followed by nitrogen-oxygen treatment of the just-formed surface modification layer. The nitrogen-oxygen treatment may be performed with a nitrogen-oxygen plasma treatment, for example. Deposition of the surface modification layer may take place in atmospheric or reduced pressure. The plasma polymerized surface modification layer may be disposed on a carrier, a thin sheet, or both. As noted above in connection with the examples of Table 3, plasma polymerization creates a layer of highly cross-linked material. Control of reaction conditions and source gases can be used to control the film thickness, density, and chemistry to tailor the functional groups to the desired application and by controlling the film properties, the surface energy of a bonding surface can be tuned. The nitrogen based polar groups, formed during the subsequent nitrogen-oxygen treatment, do not condense with silanol groups to cause permanent covalent bonding and, thus, are able to control the degree of bonding between the thin sheet and the carrier during subsequent treatments performed to dispose films or structures on the thin sheet.

In the examples of Table 12, below, various conditions were used to deposit a plasma polymerized surface modification layer film onto a glass carrier. The glass carrier was a substrate made from Corning® Eagle XG®, alumino boro silicate alkali-free display glass (Available from Corning Incorporated, Corning N.Y.). Before film deposition, the carriers were cleaned using an SC1 and/or an SC2 chemistry and standard cleaning techniques. The surface modification layers were deposited in an Oxford Plasmalab 380 ICP (available from Oxford Instruments, Oxfordshire UK) in RIE configuration mode wherein the carrier sat on a platen to which 275 W of RF energy was applied, above the platen there was disposed a coil to which no energy was applied. In step 1, 2 sccm of methane (CH4) and 38 sccm of hydrogen (H2) were flowed into a chamber at a pressure of 25 mTorr. Surface treatment times were 60 sec, and platen temperature was 30 C, for all samples listed in Table 12. After the foregoing deposition, the surface modification layer was treated in Step 2 with nitrogen and oxygen. Specifically, during the Step 2 treatment a specified number of Watts (noted in the "RF" column) of 13.56 MHz RF energy was applied to the platen, above the platen there was disposed a coil to which no energy was applied. N2 was flowed into the chamber at a rate of sccm listed in the "N2" column, and O2 was flowed into the chamber at a rate of sccm listed in the "O2" column, for the time (in seconds—s) listed in the "Time (s)" column of the table. The chamber was at a pressure, in mTorr, as listed in the "Pr" column. Thus, for example, the notation for the Step 2 nitrogen and oxygen treatment in Table 12 for example 12b is read as follows: in an Oxford ICP apparatus, 25 sccm of N2 was flowed together with 25 sccm of O2 into a chamber having a pressure of 10 mTorr; 300 W of 13.56 MHz RF energy was applied to the platen on which the carrier sat which was temperature controlled to 30 C, and the treatment was carried out for 10 seconds. The notation for the remaining examples can be read in a similar manner.

Surface energies were calculated in mJ/m2 (milli Joules per square meter) by using the contact angles of three different test liquids (in this case, de-ionized water (W), hexadecane (HD), and di-iodomethane (DIM)) and the Wu model. For the surface energies, the polar (P) and dispersive (D) components, as well as total (T), are shown. Also shown are the thickness of the surface modification layer ("th" in Angstroms), the average surface roughness of the carrier after the deposition of the surface modification layer and the N2-O2 treatment thereof ("Ra" in Angstroms), the bond energy ("BE" in mJ/m2) and the change in % Bubble area ("Δ Bubble Area" between bubble area after initially bonding a thin glass sheet to the carrier via the surface modification layer at room temperature, and that after heating the carrier through 400° C. process testing).

had a change in percent bubble area of less than 2, which is consistent with no outgassing at this temperature, see Bubble % column in Table 12; and also that samples 12a, 12b, 12c, 12g, and 12j, each had a bond energy that allowed debonding of the thin sheet from the carrier after this temperature test, see the BE column in Table 12; but examples 12d, 12e, 12f, 12h, and 12i, were not able to be debonded after 400° C. process testing, as indicated by the value of 2500 in the BE column of Table 12.

Surface energy, bubble area, bond energy, and thickness by ellipsometry were mapped as a function of % O2, RF, and pressure, as per the examples of Table 12. A reduction in thickness was seen to correlate to increasing RF power (compare example 12g with example 12b) and % O2 (compare example 12a with example 12b) consistent with ashing of the hydrocarbon layer. Bond energy was dependent only on pressure: samples treated at 10 mTorr could be de-bonded after annealing at 400° C. (see examples 12a, 12b, 12c, 12g). Those treated at 35 mTorr and above could not. See, for example, example 12d treated at a pressure of 40 mTorr, having a Bond Energy of 2500, and also example 12e having a pressure of 70 mTorr and a Bond Energy of 2500. A bond energy in the "BE" column of 2500 indicates that the thin glass sheet could not be debonded from the carrier. The

TABLE 12

N2—O2 Treatment of Surface Modification Layer

| | Step 1 aCH layer | Step 2 % O2 | N2 | O2 | RF | Pr | Time (s) | th(A) | Ra (A) | W | HD | DIM | D | P | T | SE | Δ Blister % |
|---|---|---|---|---|---|---|---|---|---|---|---|---|---|---|---|---|---|
| 12a | 2CH4 38H2 25 mT 275 W 60 s | 5 | 47.5 | 2.5 | 300 | 10 | 10 | 84.1 | 8.44 | 29.53 | 5.53 | 40.8 | 32.87 | 35.52 | 68.39 | 437.86 | 1.272 |
| 12b | 2CH4 38H2 25 mT 275 W 60 s | 50 | 25 | 25 | 300 | 10 | 10 | 82.6 | 12.3 | 32.6 | 6.67 | 42.97 | 32.41 | 34.28 | 66.69 | 373.19 | 0.626 |
| 12c | 2CH4 38H2 25 mT 275 W 60 s | 5 | 47.5 | 2.5 | 50 | 10 | 10 | 88.2 | 23.4 | 36.8 | 4.23 | 38.8 | 33.28 | 31.83 | 65.11 | 492.05 | 0.4 |
| 12d | 2CH4 38H2 25 mT 275 W 60 s | 27.5 | 36.3 | 13.8 | 175 | 40 | 10 | 83.1 | 13.3 | 29.67 | 6.37 | 43.4 | 32.33 | 35.68 | 68.01 | 2500 | 0.722 |
| 12e | 2CH4 38H2 25 mT 275 W 60 s | 5 | 47.5 | 2.5 | 50 | 70 | 10 | 86.4 | 24.1 | 30.17 | 5.93 | 43.77 | 32.26 | 35.48 | 67.74 | 2500 | 0.542 |
| 12f | 2CH4 38H2 25 mT 275 W 60 s | 50 | 25 | 25 | 300 | 70 | 10 | 79 | 4.6 | 30.37 | 5.7 | 43.47 | 32.33 | 35.36 | 67.69 | 2500 | 0.922 |
| 12g | 2CH4 38H2 25 mT 275 W 60 s | 50 | 25 | 25 | 50 | 10 | 10 | 86 | 16.2 | 29.13 | 5.33 | 42.77 | 32.48 | 35.88 | 68.36 | 456.81 | 1.503 |
| 12h | 2CH4 38H2 25 mT 275 W 60 s | 50 | 25 | 25 | 50 | 70 | 10 | 85.9 | 21.1 | 26.8 | 5.37 | 42.57 | 32.52 | 36.86 | 69.38 | 2500 | 0.703 |
| 12i | 2CH4 38H2 25 mT 275 W 60 s | 5 | 47.5 | 2.5 | 300 | 70 | 10 | 83.2 | 8.2 | 30.67 | 4.63 | 42.43 | 32.58 | 35.1 | 67.68 | 2500 | 0.72 |
| 12j | 2CH4 38H2 25 mT 275 W 60 s | | | | | | | 86.7 | 32.6 | 61.47 | 3.17 | 36.3 | 33.77 | 18.62 | 52.39 | 349.69 | 0.464 |

The thin glass sheet bonded to each of the carriers as per the examples of Table 12 was a substrate made from Corning® Willow® Glass, an alumino boro silicate alkali-free glass (Available from Corning Incorporated, Corning N.Y.), and having a thickness of 100, 130, and 150, microns. Before bonding, the Willow® Glass was cleaned using an oxygen plasma followed by SC1 and/or SC2 chemistry and standard cleaning techniques.

In the examples of Table 12, although the bonding surface on which the surface modification layers were disposed was glass, such need not be the case. Instead, the bonding surface may be another suitable material having a similar surface energy and properties as glass, for example, silicon, poly-silicon, single crystal silicon, ceramic, glass-ceramic, sapphire, or quartz.

From the treatments in the examples of Table 12, it can be seen that after 400° C. processing: examples 12a to 12j all surface energy of all the treated films was 65-72 mJ/m2 independent of thickness. See examples 12a to 12i, and 12k. These results suggest that the high pressure N2-O2 plasma treatment creates a discontinuous film. In fact, the high pressure rapidly ablates the films, whereby lower pressures are beneficial. As for bubbling, the amount appeared to decrease with increasing % O2*RF. Further, it was seen that: H2O partial pressure increases with increasing % O2 and increasing RF; surface modification layer thickness decreases with increasing pressure in step 2, and that % blister area increases with increasing pressure (therefore lower pressures are beneficial during step 2); as treatment time increased, surface modification layer thickness decreased and that the polar groups decreased, therefore leading to shorter treatment times as beneficial.

A balance of suitable bond energy and bubbling was sought. The starting point for the nitrogen-oxygen treatment was 50% O2, 10 mTorr 300 W and varied process time. Three sets of samples were prepared with 20 seconds, 60 seconds and 180 seconds RIE CH4-H2 deposition followed by N2-O2 plasma treatments of 0, 5, 15, and 60 seconds. Both surface energy and bond energy peak at 5-15 seconds N2-O2 plasma treatment time independent of CH4-H2 deposition time. Thin 20 seconds CH4-H2 layers are ablated away and the thin glass sheet permanently bonds to the carrier. The peak occurs before the polymer layer is ablated away, consistent with the formation of polar groups on the polymer film rather than simply ablation exposing the glass substrate. Bubble area does increase with increasing surface modification layer deposition time, so simply increasing the thickness of the surface modification layer to avoid too much ablation during subsequent N2-O2 surface treatment is not beneficial. Accordingly, a good compromise between bonding and bubble area is a balance of surface modification layer deposition time and N2-O2 treatment time. Based on balancing surface modification layer deposition time (not too long, as such would lead to greater thickness that results in increased outgassing) with N2-O2 treatment time—one not too long so as to ablate or remove the surface modification layer (which leads to permanent bonding of the carrier to the thin sheet) but long enough to incorporate polar groups with the surface modification layer. A good compromise is 60 seconds RIE deposition of the carbonaceous layer followed by a short N2-O2 treatment time of 5-10 seconds. Examples 12a, 12b, 12c, 12g, and 12k, work well for RIE mode.

Incorporating Polar Groups on the Surface Modification Layer

XPS N1s speciation was used to study the mechanism N2-O2 plasma treatments create a highly polar surface. In order to study and confirm the speciation of these surface modification layers, there was studied the surface chemistry of relatively thick films of CH4/H2 deposited on Eagle XG® glass wafers such that they achieved complete coverage of the glass and subsequently treated with N2/O2 plasma for different durations. The advantage of the thick hydrocarbon film is that allows us to distinguish those nitrogen species that occur only hydrocarbon film and separate these from those occurring on the exposed glass.

The surface composition of EagleXG® glass wafers first exposed to 600 seconds of CH4/H2 plasma to deposit a thick hydrocarbon film followed by N2/O2 plasma for 5, 15, 60 and 600 seconds. Elements present in the glass (such as Al and Ca) are not detected for the 5 second and 15 second treatments indicating that in those instances the carbonaceous film layer is thicker than the probe depth of XPS which is about 10 nm.

Exposure of the carbonaceous film to the N2/O2 plasma at 60 seconds and 600 seconds results in some degree of thinning of the carbonaceous layer since in those cases, XPS can detect elements occurring in the glass. This observation is further confirmed by considering the surface concentration of carbon. For the 60 seconds and 600 seconds treatments, the C concentration is less than 10 at % strongly suggesting that for those cases the surface is partially covered by the carbonaceous layer.

NH3+ species are detected only when substantial amounts of the carbonaceous film has been etched away. This very strongly suggests that the NH3+ species are likely present only on the glass and the other species involve primarily reaction between nitrogen and the carbonaceous layer. The speciation of nitrogen species as a percentage of all atoms on the surface (i.e. fraction of species x fraction of nitrogen detected) is presented in Table 13, below.

TABLE 13

| N2—O2 time (SEC) | nitrogen compounds on the carbon | | | | | nitrogen on glass |
|---|---|---|---|---|---|---|
| | Nitrogen-carbon only compounds | | | | | |
| | N=C | N≡C | N=C=C | NH2 | NHC=O | NH3+ |
| 5 | 1.68 | 0.00 | 1.42 | 1.43 | 0.42 | 0.02 |
| 15 | 1.34 | 1.21 | 0.07 | 2.08 | 0.29 | 0.13 |
| 60 | 0.1 | 0.06 | 0.00 | 0.19 | 0.25 | 0.36 |
| 600 | 0.12 | 0.00 | 0.00 | 0.08 | 0.14 | 1.05 |

It can be seen that the primary effect of this N2-O2 treatment is the etching of the carbonaceous surface modification layer. In fact very little carbonaceous material is present on the surface for the 60 and 600 second treatments. The other observation is that nitrogen species are present on the surface modification layer even after very short N2-O2 treatment times, e.g., 5 and 15 seconds. Thereafter, the nitrogen species rapidly decrease, whereas the ammonia species (indicating presence of the underlying glass surface) rapidly increases. An XPS evaluation of the carbon speciation for the 5 second N2-O2 plasma treatment of the carbonaceous surface modification layer also reveals that several different species containing oxygen and nitrogen are present on the surface modification layer. That oxygen-containing species were present lead to the thought that O2 plasma alone may be sufficient to impart polar groups to the surface modification layer. Indeed, this was found to be the case, and is discussed below.

Based on the assumption that $NH_3^+$ species occurs only on the glass and not on the carbonaceous layer, surface coverage can be estimated by calculating the ratio of $NH_3^+/\Sigma$ (all nitrogen compounds). The results of this surface coverage estimation are given in FIG. 17. There is very little change between 5 seconds and 15 seconds. The greatest change comes between 15 seconds and 60 seconds of N2-O2 plasma treatment time.

A model of the N2-O2 plasma treatment of the carbonaceous surface modification layer is as follows. The CH4-H2 deposition produces a continuous hydrocarbon layer. In the first seconds of N2-O2 plasma treatment, polar —NH2 groups are formed on the polymer surface as the hydrocarbon layer is oxidized and ablated. Imide or amide groups may also be formed in this time but the XPS is inconclusive. With longer N2-O2 plasma treatment, polymer removal reaches the glass surface where polar —NH3+ groups are formed from interaction of the N2-O2 plasma and the glass surface.

O2 Alone as a Surface Treatment of a Surface Modification Layer

As an alternative to N2-O2 treatment of the carbonaceous layer, there was also explored the use of O2 alone to increase surface energy and create polar groups on the carbonaceous layer. As noted above, an XPS carbon speciation of the 5 second N2-O2 plasma treatment of the carbonaceous layer showed that oxygen-containing species were, indeed, present on the surface modification layer. Thus, an O2 treatment of the carbonaceous layer was tried. The O2 treatment was performed in both ICP mode, and in RIE mode.

In ICP mode, a base carbonaceous layer was formed as per step 1 in Table 11 above. A step 2 surface treatment was then performed by flowing 40 sccm O2, 0 sccm N2, with 800/50 W power under 15 mTorr pressure, which produced the desired increase in surface energy and the desired polar groups on the surface of the carbonaceous layer. The thin glass sheet easily bonded to the surface modification layer at room temperature. Also, this sample was observed not to permanently adhere after annealing at 450° C., i.e., it was able to pass part (c) of the 400° C. processing test. Also, this sample was strong enough to survive FPD processing (including the above-described vacuum testing (1), wet process testing (2), and ultrasonic testing (5)) and remained de-bondable by application of sufficient peeling force. De-bonding permits removal of devices fabricated on thin glass, and re-use of the carrier.

In RIE mode, a base carbonaceous layer was formed as per Step 1 in Table 12. A step 2 surface treatment was then performed by flowing 50 sccm O2, 0 sccm N2, with 200 W power under 50 mTorr pressure. Similarly to the ICP mode, these conditions also produced the desired increase in surface energy and the desired polar groups on the surface of the carbonaceous layer. The thin glass sheet easily bonded to the surface modification layer at room temperature. Also, this sample was observed not to permanently adhere after annealing at 450° C., i.e., it was able to pass part (c) of the 400° C. processing test. Also, this sample was strong enough to survive FPD processing (including the above-described vacuum testing (1), wet process testing (2), and ultrasonic testing (5)) and remained de-bondable by application of sufficient peeling force. De-bonding permits removal of devices fabricated on thin glass, and re-use of the carrier.

Thus, it was seen that O2 treatment behaves in a similar manner as the N2-O2 treatment. Similar considerations apply with respect to the balance of initial surface modification layer deposition time (which increases thickness) and O2 treatment time.

Small Amounts of Fluorine

Several atomic % F, about 2.2%, was found in an XPS analysis of ICP mode hydrocarbon polymer deposited carbonaceous layer. This was traced to the fact that the Oxford is used for fluorine and chlorine etches of glasses, dielectrics, and metals. It was found that a small amount of fluorine is beneficial to the hydrocarbon deposited surface modification layer properties. The typical reactor cleaning process is SF6-O2 clean followed by an O2 clean and H2 plasma clean. Each step is 30 min in length and includes a pump/purge step in-between. SF6-O2 is used in the initial cleaning as the etch rate of the hydrocarbon polymer is considerably higher than O2 alone. The H2 plasma cleaning step should remove most the tramp fluorine from the deposits on the reactor walls. If one skips the H2 plasma clean one would expect to incorporate a higher amount of fluorine in the hydrocarbon surface modification layer. FIG. 16 shows the impact of skipping the H2 plasma step with a hydrocarbon surface modification layer. Bond energy is lowered, displacing permanent bonding until 600° C. with no large increase in bubbling. Thus, a small amount of fluorine, i.e., at least up to about 3%, in the hydrocarbon surface modification layer is beneficial.

Surface Roughness

The change in surface roughness of a glass bonding surface due to deposition of a hydrocarbon-formed surface modification layer was explored. Specifically, there was chosen a methane-hydrogen formed surface modification layer that was subsequently sequentially nitrogen and then hydrogen treated. Two carriers were prepared with methane-hydrogen formed surface modification layer followed by sequential in-situ N2 and then H2 plasma treatments (20CH4 40H2 5 mT 1500/50 W for 60 seconds, then 40N2 5 mT 1500/50 W for 15 seconds, then 40H2 15 mT 1500/50 W 15 for seconds). The surface modification layer of the first carrier (example 14a) was removed by O2 plasma cleaning followed by SC1 cleaning. The surface modification of the second carrier (example 14b) was left in place. A third carrier (example 14c) was used as a reference and had no surface modification layer applied thereto. AFM was used to evaluate the surface roughness of the surface-modification-layer applied and then stripped carrier (example 14a), the carrier still having a surface modification layer thereon (example 14b), and the reference carrier (example 14c). The Rq, Ra, and Rz, ranges from the AFM measurements are shown in the unit of nm (nanometers) in Table 14. The roughness of examples 14a and 14b, are indistinguishable from that of example 14c. It should be noted that for example 14c, the excessive z-range in the 5×5 micron scan was due to a particle in the scanned area. Thus, it is seen that the hydrocarbon-formed surface modification layers of the present disclosure do not change the surface roughness of the glass bonding surface. In certain circumstances, the unchanged surface roughness of the bonding surface may be advantageous, for example, for re-use of the carrier. The glass carriers in these examples were substrates made from Corning® Eagle XG®, alumino boro silicate alkali-free display glass (Available from Corning Incorporated, Corning N.Y.).

TABLE 14

Surface Modification Layer Effect on Surface Roughness

| | Rms (nm) | | | Ra (nm) | | | Z range (nm) | | |
|---|---|---|---|---|---|---|---|---|---|
| Example | 5 × 5 μm | 2 × 2 μm | 1 × 1 μm | 5 × 5 μm | 2 × 2 μm | 1 × 1 μm | 5 × 5 μm | 2 × 2 μm | 1 × 1 μm |
| 14a | 0.22 | 0.18 | 0.17 | 0.18 | 0.14 | 0.13 | 1.8 | 1.36 | 1.3 |
| 14b | 0.21 | 0.16 | 0.16 | 0.17 | 0.13 | 0.13 | 1.9 | 1.4 | 1.4 |
| 14c | 0.23 | 0.19 | 0.13 | 0.18 | 0.15 | 0.1 | 5.6 | 2.2 | 1 |

General Considerations

The above-described separation of thin sheets from carriers in examples 2-12, is performed at room temperature without the addition of any further thermal or chemical energy to modify the bonding interface between the thin sheet and carrier. The only energy input is mechanical pulling and/or peeling force.

Because the surface modification layers of examples 3 and 5-12 are thin organic layers, they are sensitive to oxygen in thermal and plasma processing. Accordingly, these surface modification layers should be protected during device fabrication. The surface modification layers may be protected by the use of a non-oxygen containing environment (for example a N2 environment) during thermal processing. Alternatively, depositing a protective coating, for example a thin metal layer, over the edge of the interface between the bonded thin glass sheet and carrier is sufficient to protect the surface modification layer against the effects of an oxygen environment at elevated temperature.

When the thin sheet and carrier both include glass bonding surfaces, the surface modification materials described above in examples 3 through 12 can be applied to the carrier, to the thin sheet, or to both the carrier and thin sheet surfaces that will be bonded together. Alternatively, when one bonding surface is a polymer bonding surface and the other bonding surface is a glass bonding surface (as further described below), appropriate surface modification materials (based on surface energy of the polymer bonding surface) described above in examples 3 through 12 will be applied to the glass bonding surface. Further, the entire carrier or thin sheet need not be made of the same material, but may include different layers and/or materials therein, as long as the bonding surface thereof is suited to receiving the surface modification layer of interest. For example, the bonding surface may be glass, glass-ceramic, ceramic, silicon, or metal, wherein the remainder of the carrier and/or thin sheet may be of a different material. For example, the thin sheet 20 bonding surface may be of any suitable material including silicon, polysilicon, single crystal silicon, sapphire, quartz, glass, ceramic, or glass-ceramic, for example. For example, the carrier 10 bonding surface, may be a glass substrate, or another suitable material having a similar surface energy as glass, for example, silicon, polysilicon, single crystal silicon, ceramic, glass-ceramic, sapphire, or quartz.

As can be seen from the examples discussed herein, the surface modification layers, together with the subsequent treatments thereof, provide a manner of widely varying the surface energy on a glass bonding surface. For example, from all of the examples, it is seen that the surface energy of a glass bonding surface may be varied from about 36 mJ/m2 (as in example 5g) to about 80 mJ/m2 (example 5f). Using non-fluorinated source materials, in a one step process, without subsequent surface treatment, it is seen that the surface energy of a glass bonding surface may be varied from about 37 mJ/m2 (example 16b) to about 67 mJ/m2 (examples 7h and 7j). Using a carbonaceous surface modification layer with subsequent treatment to increase polar groups, it is seen that the surface energy of a glass bonding surface may be varied from about 52 mJ/m2 (example 12j) to about 74 mJ/m2 (example 8a). Using non-fluorinated source materials in either a one step process, or a two-step process, it is seen that the surface energy of a glass bonding surface may be varied from about 37 mJ/m2 (example 16b) to about 74 mJ/m2 (example 8a). Using either fluorine-containing, or non-fluorine-containing source materials to deposit a surface modification layer, with a subsequent treatment thereof, it is seen that the surface energy of a glass bonding surface may be varied from about 41 mJ/m2 (example 5m) to about 80 mJ/m2 (example 5f).

Additionally, as can be seen from the examples discussed herein, the thickness of the surface modification layer can be varied greatly. Desirable results were attained with a surface modification layer thickness in the range of from about 2 nm (as in example 3) to about 8.8 nm (as in example 12c).

Uses of Controlled Bonding

Reusable Carrier

One use of controlled bonding via surface modification layers (including materials and the associated bonding surface heat treatment) is to provide reuse of the carrier in an article undergoing processes requiring a temperature ≥600° C., as in LTPS processing, for example. Surface modification layers (including the materials and bonding surface heat treatments), as exemplified by the examples 2e, 3a, 3b, 4c, 4d, and 4e, and the examples of table 5, above, may be used to provide reuse of the carrier under such temperature conditions. Specifically, these surface modification layers may be used to modify the surface energy of the area of overlap between the bonding areas of the thin sheet (having a glass bonding surface) and carrier (having a glass bonding surface), whereby the entire thin sheet may be separated from the carrier after processing. The thin sheet may be separated all at once, or may be separated in sections as, for example, when first removing devices produced on portions of the thin sheet and thereafter removing the remaining portions to clean the carrier for reuse. In the event that the entire thin sheet is removed from the carrier, the carrier can be reused as is by simply by placing another thin sheet thereon. Alternatively, the carrier may be cleaned and once again prepared to carry a thin sheet by forming a surface modification layer anew. Because the surface modification layers prevent permanent bonding of the thin sheet with the carrier, they may be used for processes wherein temperatures are ≥600° C. Of course, although these surface modification layers may control bonding surface energy during processing at temperatures ≥600° C., they may also be used to produce a thin sheet and carrier combination that will withstand processing at lower temperatures, and may be used in such lower temperature applications to control bonding. Moreover, where the thermal processing of the article will not exceed 400° C., surface modification layers as exemplified by the examples 2c, 2d, 4b, the examples of tables 7-11 (including the examples discussed as alternatives of the examples of table 10), examples 12a, 12b, 12c, 12g, 12g, and the examples of a surface treatment with O2 alone, may also be used in this same manner.

One advantage to using the surface modification layers described herein, for example those including the examples of table 3, examples 4b, 4c, 4d, 4e, the examples of tables 5 and 7-11, examples 12a, 12b, 12c, 12g, 12j, and the examples of a surface treatment with O2 alone, is that the carrier can be re-used at the same size. That is, the thin sheet may be removed from the carrier, the surface modification layer removed from the carrier by a non-destructive manner (for example O2 or other plasma cleaning), and re-used without having to cut the carrier in any manner (for example, at its edges).

To Provide a Controlled Bonding Area

A second use of controlled bonding via surface modification layers (including materials and the associated bonding surface heat treatments) is to provide a controlled bonding area, between a glass carrier and a glass thin sheet. More specifically, with the use of the surface modification layers an area of controlled bonding can be formed wherein a sufficient separation force can separate the thin sheet portion from the carrier without damage to either the thin sheet or the carrier caused by the bond, yet there is maintained throughout processing a sufficient bonding force to hold the thin sheet relative to the carrier. With reference to FIG. 6, a glass thin sheet 20 may be bonded to a glass carrier 10 by a bonded area 40. In the bonded area 40, the carrier 10 and thin sheet 20 are covalently bonded to one another so that they act as a monolith. Additionally, there are controlled bonding areas 50 having perimeters 52, wherein the carrier 10 and thin sheet 20 are connected, but may be separated from one another, even after high temperature processing, e.g. processing at temperatures $\geq 600°$ C. Although ten controlled bonding areas 50 are shown in FIG. 6, any suitable number, including one, may be provided. The surface modification layers 30, including the materials and bonding surface heat treatments, as exemplified by the examples 2a, 2e, 3a, 3b, 4c, 4d, and 4e, the examples of table 5, above, may be used to provide the controlled bonding areas 50 between the carrier 10 having a glass bonding surface and the thin sheet 20 having a glass bonding surface. Specifically, these surface modification layers may be formed within the perimeters 52 of controlled bonding areas 50 either on the carrier 10 or on the thin sheet 20. Accordingly, when the article 2 is processed at high temperature, either to form covalent bonding in the bonding area 40 or during device processing, there can be provided a controlled bond between the carrier 10 and the thin sheet 20 within the areas bounded by perimeters 52 whereby a separation force may separate (without catastrophic damage to the thin sheet or carrier) the thin sheet and carrier in this region, yet the thin sheet and carrier will not delaminate during processing, including ultrasonic processing. The controlled bonding of the present application, as provided by the surface modification layers and any associated heat treatments, is thus able to improve upon the carrier concept in US '727. Specifically, Although the carriers of US '727 were demonstrated to survive FPD processing, including high temperature processing $\geq$ about 600° C. with their bonded peripheries and non-bonded center regions, ultrasonic processes for example wet cleans and resist strip processing remained challenging. Specifically, pressure waves in the solution were seen to induce sympathic vibrations in the thin glass in the non-bonding region (as non-bonding was described in US '727), as there was little or no adhesive force bonding the thin glass and carrier in that region. Standing waves in the thin glass can be formed, wherein these waves may cause vibrations that can lead to breakage of the thin glass at the interface between the bonded and non-bonded regions if the ultrasonic agitation is of sufficient intensity. This problem can be eliminated by minimizing the gap between the thin glass and the carrier and by providing sufficient adhesion, or controlled bonding between the carrier 20 and thin glass 10 in these areas 50. Surface modification layers (including materials and any associated heat treatments as exemplified by examples 2a, 2e, 3a, 3b, 4c, 4d, 4e, and the examples of Table 5, of the bonding surfaces control the bonding energy so as to provide a sufficient bond between a glass bonding surface on the thin sheet 20 and a glass surface on the carrier 10 to avoid these unwanted vibrations in the controlled bonding region.

Then, during extraction of the desired parts 56 having perimeters 57, the portions of thin sheet 20 within the perimeters 52 may simply be separated from the carrier 10 after processing and after separation of the thin sheet along perimeters 57. Because the surface modification layers control bonding energy to prevent permanent bonding of the thin sheet with the carrier, they may be used for processes wherein temperatures are $\geq 600°$ C. Of course, although these surface modification layers may control bonding surface energy during processing at temperatures $\geq 600°$ C., they may also be used to produce a thin sheet and carrier combination that will withstand processing at lower temperatures, and may be used in such lower temperature applications. Moreover, where the thermal processing of the article will not exceed 400° C., surface modification layers as exemplified by the examples 2c, 2d, 4b, the examples of tables 7-11 (including the examples discussed as alternatives of the examples of table 10), examples 12a, 12b, 12c, 12g, 12g, and the examples of a surface treatment with O2 alone, may also be used—in some instances, depending upon the other process requirements—in this same manner to control bonding surface energy.

To Provide a Bonding Area

A third use of controlled bonding via surface modification layers (including materials and any associated bonding surface heat treatment) is to provide a bonding area between a glass carrier and a glass thin sheet. With reference to FIG. 6, a glass thin sheet 20 may be bonded to a glass carrier 10 by a bonded area 40.

In one embodiment of the third use, the bonded area 40, the carrier 10 and thin sheet 20 may be covalently bonded to one another so that they act as a monolith. Additionally, there are controlled bonding areas 50 having perimeters 52, wherein the carrier 10 and thin sheet 20 are bonded to one another sufficient to withstand processing, and still allow separation of the thin sheet from the carrier even after high temperature processing, e.g. processing at temperatures $\geq 600°$ C. Accordingly, surface modification layers 30 (including materials and bonding surface heat treatments) as exemplified by the examples 1a, 1b, 1c, 2b, 2c, 2d, 4a, 4b, 12d, 12e, 12f, 12h, and 12i, above, may be used to provide the bonding areas 40 between the carrier 10 and the thin sheet 20. Specifically, these surface modification layers and heat treatments may be formed outside of the perimeters 52 of controlled bonding areas 50 either on the carrier 10 or on the thin sheet 20. Accordingly, when the article 2 is processed at high temperature, or is treated at high temperature to form covalent bonds, the carrier and the thin sheet 20 will bond to one another within the bonding area 40 outside of the areas bounded by perimeters 52. Then, during extraction of the desired parts 56 having perimeters 57, when it is desired to dice the thin sheet 20 and carrier 10, the article may be separated along lines 5 because these surface modification layers and heat treatments covalently bond the thin sheet 20 with the carrier 10 so they act as a monolith in this area. Because the surface modification layers provide permanent covalent bonding of the thin sheet with the carrier, they may be used for processes wherein temperatures are $\geq 600°$ C. Moreover, where the thermal processing of the article, or of the initial formation of the bonding area 40, will be $\geq 400°$ C. but less than 600° C., surface modification layers, as exemplified by the materials and heat treatments in example 4a may also be used in this same manner.

In a second embodiment of the third use, in the bonded area 40, the carrier 10 and thin sheet 20 may be bonded to one another by controlled bonding via various surface modification layers described above. Additionally, there are controlled bonding areas 50, having perimeters 52, wherein the carrier 10 and thin sheet 20 are bonded to one another sufficient to withstand processing, and still allow separation of the thin sheet from the carrier even after high temperature processing, e.g. processing at temperatures $\geq 600°$ C. Accordingly, if processing will be performed at temperatures up to 600° C., and it is desired not to have a permanent or covalent bond in area 40, surface modification layers 30 (including materials and bonding surface heat treatments) as exemplified by the examples 2e, 3a, 3b, 4c, 4d, 4e, and the examples of table 5, above, may be used to provide the bonding areas 40 between a glass bonding surface of the carrier 10 and a glass bonding surface of the thin sheet 20. Specifically, these surface modification layers and heat treatments may be formed outside of the perimeters 52 of controlled bonding areas 50, and may be formed either on the carrier 10 or on the thin sheet 20. The controlled bonding areas 50 may be formed with the same, or with a different, surface modification layer as was formed in the bonding area 40. Alternatively, if processing will be performed at temperatures only up to 400° C., and it is desired not to have a permanent or covalent bond in area 40, surface modification layers 30 (including materials and bonding surface heat treatments) as exemplified by the examples 2c, 2d, 2e, 3a, 3b, 4b, 4c, 4d, 4e, the examples of table 5, the examples of tables 7-11 (including the examples discussed as alternatives of the examples of table 10), examples 12a, 12b, 12c, 12g, 12g, and the examples of a surface treatment with O2 alone, above, may be used to provide the bonding areas 40 between the a glass bonding surface of carrier 10 and a glass bonding surface of the thin sheet 20.

Instead of controlled bonding in areas 50, there may be non-bonding regions in areas 50, wherein the non-bonding regions may be areas of increased surface roughness as described in US '727, or may be provided by surface modification layers as exemplified by example 2a.

For Bulk Annealing or Bulk Processing

A fourth use of the above-described manners of controlling bonding is for bulk annealing of a stack of glass sheets. Annealing is a thermal process for achieving compaction of the glass. Compaction involves reheating a glass body to a temperature below the glass softening point, but above the maximum temperature reached in a subsequent processing step. This achieves structural rearrangement and dimensional relaxation in the glass prior to, rather than during, the subsequent processing. Annealing prior to subsequent processing is beneficial to maintain precise alignment and/or flatness in a glass body during the subsequent processing, as in the manufacture of flat panel display devices, wherein structures made of many layers need to be aligned with a very tight tolerance, even after being subject to high temperature environments. If the glass compacts in one high temperature process, the layers of the structures deposited onto the glass prior to the high temperature process may not align correctly with the layers of the structures deposited after the high temperature process.

It is economically attractive to compact glass sheets in stacks. However, this necessitates interleaving, or separating, adjacent sheets to avoid sticking. At the same time, it is beneficial to maintain the sheets extremely flat and with an optical-quality, or pristine, surface finish. Additionally, for certain stacks of glass sheets, for example sheets having small surface area, it may be beneficial to have the glass sheets "stick" together during the annealing process so that they may easily be moved as a unit without separating, but readily separate from one another (by peeling for example) after the annealing process so that the sheets may be individually used. Alternatively, it may be beneficial to anneal a stack of glass sheets wherein selected ones of the glass sheets are prevented from permanently bonding with one another, while at the same time, allowing other ones of the glass sheets, or portions of those other glass sheets, e.g., their perimeters, to permanently bond with each other. As still another alternative, it may be beneficial to stack glass sheets to, in bulk, selectively permanently bond the perimeters of selected adjacent pairs of the sheets in the stack. The above-described manners of controlling bonding between glass sheets may be used to achieve the foregoing bulk annealing and/or selective bonding. In order to control bonding at any particular interface between adjacent sheets, there may be used a surface modification layer on at least one of the major surfaces facing that interface.

One embodiment of a stack of glass sheets, suitable for bulk annealing or bulk permanent bonding in selected areas (for example around the perimeter), will be described with reference to FIGS. 7 and 8. Wherein FIG. 7 is a schematic side view of a stack 760 of glass sheets 770-772, and FIG. 8 is an exploded view thereof for purposes of further explanation.

A stack 760 of glass sheets may include glass sheets 770-772, and surface modification layers 790 to control the bonding between the glass sheets 770-772. Additionally, the stack 760 may include cover sheets 780, 781 disposed on the top and bottom of the stack, and may include surface modification layers 790 between the covers and the adjacent glass sheets.

As shown in FIG. 8, each of the glass sheets 770-772 includes a first major surface 776 and a second major surface 778. The glass sheets may be made of any suitable glass material, for example, an alumino-silicate glass, a borosilicate glass, or an alumino-boro-silicate glass. Additionally, the glass may be alkali containing, or may be alkali-free. Each of the glass sheets 770-772 may be of the same composition, or the sheets may be of different compositions. Further, the glass sheets may be of any suitable type. That is, for example, the glass sheets 770-772 may be all carriers as described above, may be all thin sheets as described above, or may alternately be carriers and thin sheets. It is beneficial to have a stack of carriers, and a separate stack of thin sheets when bulk annealing requires a different time-temperature cycle for the carriers than for the thin sheets. Alternatively, with the right surface modification layer material and placement, it may be desirable to have a stack with alternate carriers and thin sheets, whereby if desired pairs of a carrier and a thin sheet, i.e., those forming an article, may be covalently bonded to one another in bulk for later processing, while at the same time preserving the ability to separate adjacent articles from one another. Still further, there may be any suitable number of glass sheets in the stack. That is, although only three glass sheets 770-772 are shown in FIGS. 7 and 8, any suitable number of glass sheets may be included in a stack 760.

In any particular stack 760 any one glass sheet may include no surface modification layers, one surface modification layer, or two surface modification layers. For example, as shown in FIG. 8, sheet 770 includes no surface modification layers, sheet 771 includes one surface modification layer 790 on its second major surface 778, and sheet 772 includes two surface modification layers 790 wherein one such surface modification layer is on each of its major surfaces 776, 778.

The cover sheets 780, 781 may be any material that will suitably withstand (not only in terms of time and temperature, but also with respect to other pertinent considerations like outgassing, for example) the time-temperature cycle for a given process. Advantageously, the cover sheets may be made of the same material as the glass sheets being processed. When the cover sheets 780, 781 are present, and are of a material that undesirably would bond with the glass sheets upon putting the stack through a given time-temperature cycle, a surface modification layer 790 may be included between the glass sheet 771 and the cover sheet 781 and/or between the glass sheet 772 and the cover sheet 780, as appropriate. When present between a cover and a glass sheet, the surface modification layer may be on the cover (as shown with cover 781 and adjacent sheet 771), may be on the glass sheet (as shown with cover 780 and sheet 772), or may be on both the cover and the adjacent sheet (not shown). Alternatively, if the cover sheets 780, 781 are present, but are of a material that will not bond with the adjacent sheets 772, 772, then surface modification layers 790 need not be present therebetween.

Between adjacent sheets in the stack, there is an interface. For example, between adjacent ones of the glass sheets 770-772, there is defined an interface, i.e., there is an interface 791 between sheet 770 and sheet 771, and interface 792 between sheet 770 and sheet 772. Additionally, when the cover sheets 780, 781 are present, there is an interface 793 between cover 781 and sheet 771, as well as an interface 794 between sheet 772 and cover 780.

In order to control bonding at a given interface 791, 792 between adjacent glass sheets, or at a given interface 793, 794 between a glass sheet and a cover sheet, there may be used a surface modification layer 790. For example, as shown, there is present at each interface 791, 792, a surface modification layer 790 on at least one of the major surfaces facing that interface. For example, for interface 791, the second major surface 778 of glass sheet 771 includes a surface modification layer 790 to control the bonding between sheet 771 and adjacent sheet 770. Although not shown, the first major surface 776 of sheet 770 could also include a surface modification layer 790 thereon to control bonding with sheet 771, i.e., there may be a surface modification layer on each of the major surfaces facing any particular interface.

The particular surface modification layer 790 (and any associated surface modification treatment—for example a heat treatment on a particular surface prior to application of a particular surface modification layer to that surface, or a surface heat treatment of a surface with which a surface modification layer may contact) at any given interface 791-794, may be selected for the major surfaces 776, 778 facing that particular interface 791-794 to control bonding between adjacent sheets and, thereby, achieve a desired outcome for a given time-temperature cycle to which the stack 760 is subjected.

If it was desired to bulk anneal a stack of glass sheets 770-772 at a temperature up to 400° C., and to separate each of the glass sheets from one another after the annealing process, then bonding at any particular interface, for example interface 791, could be controlled using a material according to any one of the examples 2a, 2c, 2d, 2e, 3a, 3b, 4b-4e, the examples of table 5, the examples of tables 7-11 (including the examples discussed as alternatives of the examples of table 10), examples 12a, 12b, 12c, 12g, 12g, or the examples of a surface treatment with O2 alone, together with any associated surface preparation. More specifically, the first surface 776 of sheet 770 would be treated as the "Thin Glass" in Tables 2-4, whereas the second surface 778 of sheet 771, would treated as the "Carrier" in Tables 2-4, or vice versa. A suitable time-temperature cycle, having a temperature up to 400° C., could then be chosen based on the desired degree of compaction, number of sheets in the stack, as well as size and thickness of the sheets, so as to achieve the requisite time-temperature throughout the stack.

Similarly, if it was desired to bulk anneal a stack of glass sheets 770-772 at a temperature up to 600° C., and to separate each of the glass sheets from one another after the annealing process, then bonding at any particular interface, for example interface 791, could be controlled using a material according to any one of the examples 2a, 2e, 3a, 3b, 4c, 4d, 4e, or the examples of table 5, together with any associated surface preparation. More specifically, the first surface 776 of sheet 770 would be treated as the "Thin Glass" in Tables 2-4, whereas the second surface 778 of sheet 771, would treated as the "Carrier" in Tables 2-4, or vice versa. A suitable time-temperature cycle, having a temperature up to 600° C., could then be chosen based on the desired degree of compaction, number of sheets in the stack, as well as size and thickness of the sheets, so as to achieve the requisite time-temperature throughout the stack.

Further, it is possible to preform bulk annealing, and bulk article formation, by appropriately configuring the stack of sheets and the surface modification layers between each pair of them. If it was desired to bulk anneal a stack of glass sheets 770-772 at a temperature up to 400° C., and then in-bulk covalently bond pairs of adjacent sheets to one another to form articles 2, suitable materials and associated surface preparation could be selected for controlling bonding. For example, around the peripheries (or at other desired bonding areas 40), the bonding at the interface between pairs of glass sheets to be formed into an article 2, for example sheets 770 and 771, could be controlled using: (i) a material according to any one of the examples 2c, 2d, 4b, the examples of tables 7-11 (including the examples discussed as alternatives of the examples of table 10), examples 12a, 12b, 12c, 12g, 12g, or the examples of a surface treatment with O2 alone, together with any associated surface preparation, around the perimeter (or other desired bonding area 40) of the sheets 770, 771; and (ii) a material according to any one of the examples 2a, 2e, 3a, 3b, 4c, 4d, 4e, or the examples of table 5, together with any associated surface preparation, on an interior area (i.e., an area interior of the perimeter as treated in (i), or in desired controlled bonding areas 50 where separation of one sheet from the other is desired) of the sheets 770, 771. In this case, device processing in the controlled bonding areas 50 could then be performed at temperatures up to 600° C.

Materials and heat treatments could be appropriately selected for compatibility with one another. For example, any of the materials 2c, 2d, or 4b, could be used for the bonding areas 40 with a material according to example 2a for the controlled bonding areas. Alternatively, the heat treatment for the bonding areas and controlled bonding areas could be appropriately controlled to minimize the effect of heat treatment in one area adversely affecting the desired degree of bonding in an adjacent area.

After appropriately selecting surface modification layers 790 and associated heat treatments for the glass sheets in the stack, those sheets could be appropriately arranged into a the stack and then heated up to 400° C. to bulk anneal all the sheets in the stack without them being permanently bonded to one another. Then, the stack could be heated up to 600° C. to form covalent bonds in the desired bonding areas of a pair of adjacent sheets to form an article 2 having a pattern of bonding areas and controlled bonding areas. The bonding at the interface between one pair of sheets that are to be covalently bonded by bonding areas 40 to form an article 2, and another pair of such sheets forming a separate but adjacent article 2, could be controlled with the materials and associated heat treatments of examples 2a, 2e, 3a, 3b, 4c, 4d, 4e, the examples of table 5, so that adjacent articles 2 would not be covalently bonded to one another. In this same manner of controlling bonding between adjacent articles, there could be controlled the bonding between an article and any cover sheet that is present in the stack.

Still further, similarly to the above, it is possible to form articles 2 in bulk from a stack 760 without annealing that same stack 760 beforehand. Instead, the sheets could have been separately annealed, or annealed in a different stack and separated therefrom, prior to configuring them for the desired controlled bonding in a stack to produce articles in bulk. From the immediately above-described manner of bulk annealing and then forming articles in bulk from one and the same stack, the bulk annealing is simply omitted.

Although only the manners of controlling bonding at interface 791 were explained in detail above, of course the same may be done at interface 792, or for any other interface that may be present in a particular stack—as in the case of more than three glass sheets in a stack, or as when there is a cover sheet that would undesirably bond to a glass sheet. Further, although the same manner of controlling bonding may be used at any interfaces 791, 792, 793, 794 that are present, different ones of the above-described manners of controlling bonding may also be used at different interfaces to produce the same or a different outcome in terms of the type of bond desired.

In the above processes of bulk annealing, or forming articles 2 in bulk, when HMDS is used as a material for controlling bonding at an interface, and the HMDS is exposed to the outer periphery of the stack, the heating above about 400° C. should be performed in an oxygen-free atmosphere when it is desired to prevent covalent bonding in the area of the HMDS. That is, if the HMDS is exposed to an amount of oxygen in the atmosphere (at a temperature above about 400° C.) sufficient to oxidize the HMDS, the bonding in any such area where the HMDS has been oxidized will become covalent bonding between adjacent glass sheets. Other alkyl hydrocarbon silanes similarly can be affected by exposure to oxygen at higher temperatures, e.g., above about 400° C., e.g., ethyl, propyl, butyl, or steryl, silanes. Similarly, if using other materials for the surface modification layer, the environment for the bulk annealing should be chosen so that the materials will not degrade over the time-temperature cycle of the anneal. As used herein, oxygen free may mean an oxygen concentration of less than 1000 ppm by volume, more preferred less than 100 ppm by volume.

Once the stack of sheets has been bulk annealed, individual sheets may be separated from the stack. The individual sheets can be treated (for example, by oxygen plasma, heating in an oxygen environment at a temperature ≥400° C., or by chemical oxidation, SC1, or SC2) to remove the surface modification layer 790. The individual sheets can be used as desired, for example, as electronic device substrates, for example OLED, FPD, or PV devices).

The above-described methods of bulk annealing, or bulk processing, have the advantage of maintaining clean sheet surfaces in an economical manner. More specifically, the sheets do not need to be kept in a clean environment from start to finish, as in a clean-room annealing lehr. Instead, the stack can be formed in a clean environment, and then processed in a standard annealing lehr (i.e., one in which cleanliness is not controlled) without the sheet surfaces getting dirty with particles because there is no fluid flow between the sheets. Accordingly, the sheet surfaces are protected from the environment in which the stack of sheets is annealed. After annealing, the stack of sheets can be easily transported to a further processing area (either in the same or a different facility) because the sheets maintain some degree of adhesion, yet remain separable from one another upon sufficient force without damaging the sheets. That is, a glass manufacturer (for example) can assemble and anneal a stack of glass sheets, and then ship the sheets as a stack wherein they remain together during shipping (without fear of them separating in transit), whereupon arriving at their destination the sheets may be separated from the stack by a customer who may use the sheets individually or in smaller groups. Once separation is desired, the stack of sheets can again be processed in a clean environment (after washing the stack as necessary).

Example of Bulk Annealing

Glass substrates were used as-received from the fusion draw process. The fusion drawn glass composition was (in mole %): $SiO_2$ (67.7), $Al_2O_3$ (11.0), $B_2O_3$ (9.8), CaO (8.7), MgO (2.3), SrO (0.5). Seven (7), 0.7 mm thick by 150 mm diameter, fusion drawn glass substrates were patterned by lithographic methods with 200 nm deep fiducials/verniers using HF. Two (2) nm of a plasma deposited fluoropolymer as a surface modification layer was coated on all bonding surfaces of all glass substrates, i.e., each surface of a substrate that faced another substrate was coated, whereupon the resulting surface energy of each sheet surface was approximately 35 mJ/m2. The 7 coated individual glass substrates were placed together to form a single, thick substrate (referred to as the "glass stack"). The glass stack was annealed in a nitrogen purged tube furnace ramping from 30° C. to 590° C. over a 15 minute period, holding 30 minutes at 590° C., then ramping down to about 230° C. over a 50 minute period, then removing the glass stack from the furnace and cooling to room temperature of about 30° C. in about 10 minutes. After cooling, the substrates were removed from the furnace and easily separated into individual sheets (i.e., the samples did not permanently bond, globally or locally) using a razor wedge. Compaction was measured on each individual substrate by comparing the glass fiducials to a non-annealed quartz reference. The individual substrates were found to compact about 185 ppm. Two of the substrates as individual samples (not stacked together) went through a second anneal cycle as described above (590° C./30 minute hold). Compaction was measured again and the substrates were found to further compact less than 10 ppm (actually 0 to 2.5 ppm) due to the second heat treatment (change in glass dimensions—as compared with original glass dimension—after the second heat treatment minus the change in glass dimensions after the first heat treatment). Thusly, the inventors have demonstrated that individual glass sheets can be coated, stacked, heat treated at a high temperature to achieve compaction, cooled, separated into individual sheets and have <10 ppm, and even <5 ppm in dimension change (as compared to their size after the first heat treatment) after a second heat treatment.

Although the furnace in the above-described annealing example was purged with nitrogen, annealing furnaces may also be purged with other gasses including, air, argon, oxygen, $CO_2$, or combinations thereof, depending upon the annealing temperature, and the stability of the surface modification layer material at those temperatures in a particular environment. Alternatively to an inert atmosphere, the furnace in the above-described annealing could be a vacuum environment.

Additionally, although not shown, the glass may be annealed in a spool, instead of sheet, form. That is, a suitable surface modification layer may be formed on one or both sides of a glass ribbon, and the ribbon then rolled. The entire roll could be subject to the same treatment as noted above for sheets, whereupon the glass of the entire spool would be annealed without sticking one wrap of the glass to an adjacent one. Upon un-rolling, the surface modification layer may be removed by any suitable process.

Outgassing

Polymer adhesives used in typical wafer bonding applications are generally 10-100 microns thick and lose about 5% of their mass at or near their temperature limit. For such materials, evolved from thick polymer films, it is easy to quantify the amount of mass loss, or outgassing, by mass-spectrometry. On the other hand, it is more challenging to measure the outgassing from thin surface treatments that are on the order of 10 nm thick or less, for example the plasma polymer or self-assembled monolayer surface modification layers described above, as well as for a thin layer of pyrolyzed silicone oil. For such materials, mass-spectrometry is not sensitive enough. There are a number of other ways to measure outgassing, however.

A first manner of measuring small amounts of outgassing is based on surface energy measurements, and will be described with reference to FIG. 9. To carry out this test, a setup as shown in FIG. 9 may be used. A first substrate, or carrier, 900 having the to-be-tested surface modification layer thereon presents a surface 902, i.e., a surface modification layer corresponding in composition and thickness to the surface modification layer 30 to be tested. A second substrate, or cover, 910 is placed so that its surface 912 is in close proximity to the surface 902 of the carrier 900, but not in contact therewith. The surface 912 is an uncoated surface, i.e., a surface of bare material from which the cover is made. Spacers 920 are placed at various points between the carrier 900 and cover 910 to hold them in spaced relation from one another. The spacers 920 should be thick enough to separate the cover 910 from the carrier 900 to allow a movement of material from one to the other, but thin enough so that during testing the amount of contamination from the chamber atmosphere on the surfaces 902 and 912 is minimized. The carrier 900, spacers 920, and cover 910, together form a test article 901.

Figure 10:
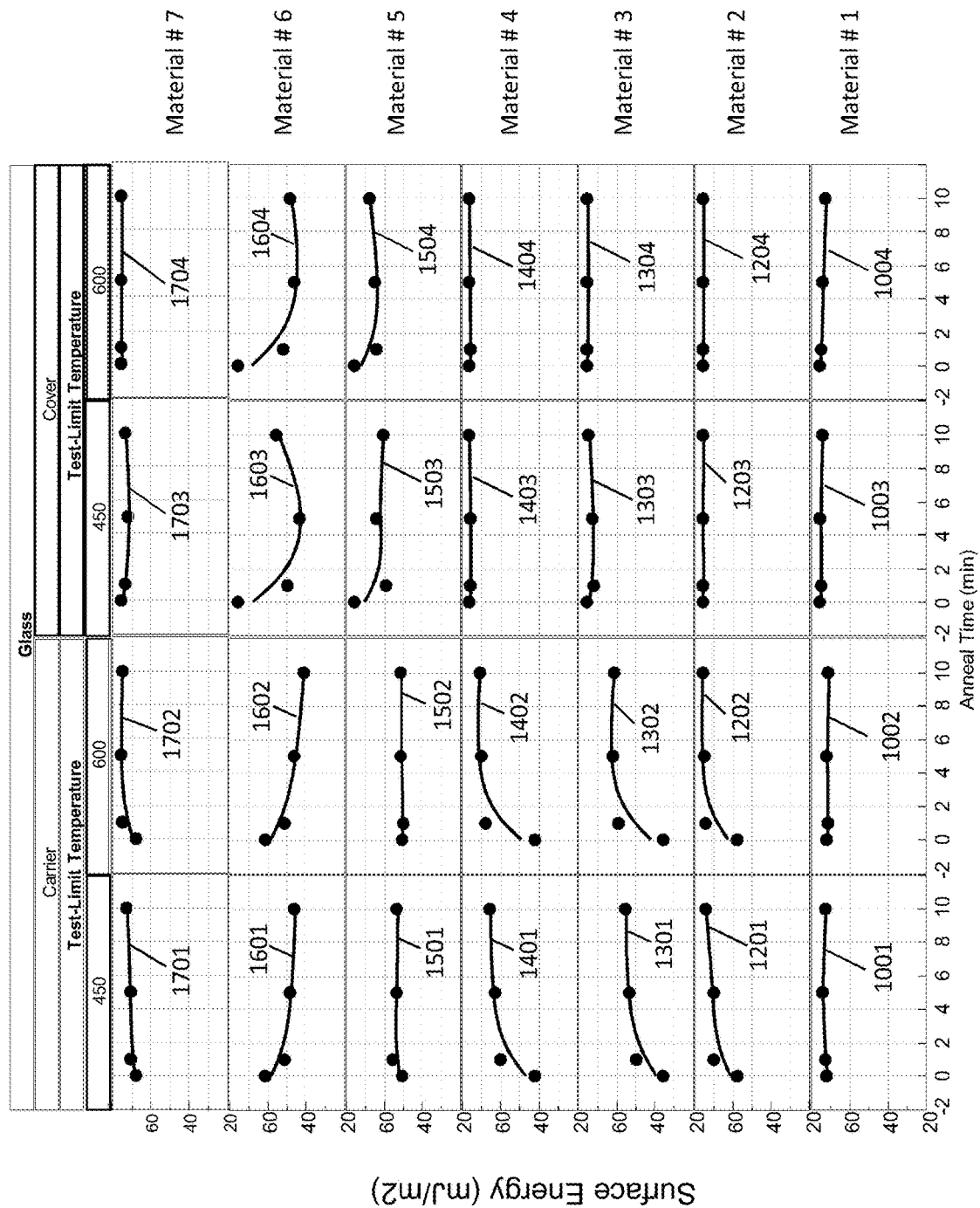
FIG. 10 is a collection of graphs of surface energy (of different parts of the test setup of FIG. 9) versus time for a variety of materials under different conditions.

Prior to assembly of the test article 901, the surface energy of bare surface 912 is measured, as is the surface energy of the surface 902, i.e., the surface of carrier 900 having the surface modification layer provided thereon. The surface energies as shown in FIG. 10, both polar and dispersion components, were measured by fitting the Wu model to the contact angles of three test liquids; water, diiodomethane and hexadecane.

After assembly, the test article 901 is placed into a heating chamber 930, and is heated through a time-temperature cycle. The heating is performed at atmospheric pressure and under flowing N2 gas, i.e., flowing in the direction of arrows 940 at a rate of 2 standard liters per minute.

During the heating cycle, changes in the surface 902 (including changes to the surface modification layer due to evaporation, pyrolysis, decomposition, polymerization, reaction with the carrier, and de-wetting, for example) are evidenced by a change in the surface energy of surface 902. A change in the surface energy of surface 902 by itself does not necessarily mean that the surface modification layer has outgassed, but does indicate a general instability of the material at that temperature as its character is changing due to the mechanisms noted above, for example. Thus, the less the change in surface energy of surface 902, the more stable the surface modification layer. On the other hand, because of the close proximity of the surface 912 to the surface 902, any material outgassed from surface 902 will be collected on surface 912 and will change the surface energy of surface 912. Accordingly, the change in surface energy of surface 912 is a proxy for outgassing of the surface modification layer present on surface 902.

Thus, one test for outgassing uses the change in surface energy of the cover surface 912. Specifically, if there is a change in surface energy—of surface 912—of ≥10 mJ/m2, then there is outgassing. Changes in surface energy of this magnitude are consistent with contamination which can lead to loss of film adhesion or degradation in material properties and device performance. A change in surface energy of ≤5 mJ/m2 is close to the repeatability of surface energy measurements and inhomogeneity of the surface energy. This small change is consistent with minimal outgassing.

During testing that produced the results in FIG. 10, the carrier 900, the cover 910, and the spacers 920, were made of Eagle XG glass, an alkali-free alumino-boro-silicate display-grade glass available from Corning Incorporated, Corning, N.Y., although such need not be the case. The carrier 900 and cover 910 were 150 mm diameter 0.63 mm thick. Generally, the carrier 910 and cover 920 will be made of the same material as carrier 10 and thin sheet 20, respectively, for which an outgassing test is desired. During this testing, silicon spacers 0.63 mm thick, 2 mm wide, and 8 cm long, thereby forming a gap of 0.63 mm between surfaces 902 and 912. During this testing, the chamber 930 was incorporated in MPT-RTP600s rapid thermal processing equipment that was cycled from room temperature to the test limit temperature at a rate of 9.2° C. per minute, held at the test limit temperature for varying times as shown in the graphs as "Anneal Time", and then cooled at furnace rate to 200° C. After the oven had cooled to 200° C., the test article was removed, and after the test article had cooled to room temperature, the surface energies of each surface 902 and 912 were again measured. Thus, by way of example, using the data for the change in cover surface energy, tested to a limit temperature of 450° C., for Material #1, line 1003, the data was collected as follows. The data point at 0 minutes shows a surface energy of 75 mJ/m2 (milli-Joules per square meter), and is the surface energy of the bare glass, i.e., there has been no time-temperature cycle yet run. The data point at one minute indicates the surface energy as measured after a time-temperature cycle performed as follows: the article 901 (having Material #1 used as a surface modification layer on the carrier 900 to present surface 902) was placed in a heating chamber 930 at room temperature, and atmospheric pressure; the chamber was heated to the test-limit temperature of 450° C. at a rate of 9.2° C. per minute, with a N2 gas flow at two standard liters per minute, and held at the test-limit temperature of 450° C. for 1 minute; the chamber was then allowed to cool to 300° C. at a rate of 1° C. per minute, and the article 901 was then removed from the chamber 930; the article was then allowed to cool to room temperature (without N2 flowing atmosphere); the surface energy of surface 912 was then measured and plotted as the point for 1 minute on line 1003. The remaining data points for Material #1 (lines 1003, 1004), as well as the data points for Material #2 (lines 1203, 1204), Material #3 (lines 1303, 1304), Material #4 (lines 1403, 1404), Material #5 (lines 1503, 1504), Material #6 (lines 1603, and 1604), and Material #7 (lines 1703, 1704) were then determined in a similar manner with the minutes of anneal time corresponding to the hold time at the test-limit temperature, either 450° C., or 600° C., as appropriate. The data points for lines 1001, 1002, 1201, 1202, 1301, 1302, 1401, 1402, 1501, 1502, 1601, 1602, 1701, and 1702 representing surface energy of surface 902 for the corresponding surface modification layer materials (Materials #1-7) were determined in a similar manner, except that the surface energy of the surface 902 was measured after each time-temperature cycle.

The above assembly process, and time-temperature cycling, were carried out for seven different materials as set forth below, and the results are graphed in FIG. 10. Of the seven materials, Materials #1-4 and 7 correspond to surface modification layer materials described above. Materials #5 and #6 are comparative examples.

Material #1 is a CHF3-CF4 plasma polymerized fluoropolymer. This material is consistent with the surface modification layer in example 3b, above. As shown in FIG. 10, lines 1001 and 1002 show that the surface energy of the carrier did not significantly change. Thus, this material is very stable at temperatures from 450° C. to 600° C. Additionally, as shown by the lines 1003 and 1004, the surface energy of the cover did not significantly change either, i.e., the change is ≤5 mJ/m2. Accordingly, there was no outgassing associated with this material from 450° C. to 600° C.

Material #2 is a phenylsilane, a self-assembled monolayer (SAM) deposited form 1% toluene solution of phenyltriethoxysilane and cured in vacuum oven 30 minutes at 190° C. This material is consistent with the surface modification layer in example 4c, above. As shown in FIG. 10, lines 1201 and 1202 indicate some change in surface energy on the carrier. As noted above, this indicates some change in the surface modification layer, and comparatively, Material #2 is somewhat less stable than Material #1. However, as noted by lines 1203 and 1204, the change in surface energy of the carrier is ≤5 mJ/m2, showing that the changes to the surface modification layer did not result in outgassing.

Material #3 is a pentafluorophenylsilane, a SAM deposited from 1% toluene solution of pentafluorophenyltriethoxysilane and cured in vacuum oven 30 minutes at 190° C. This material is consistent with the surface modification layer in example 4e, above. As shown in FIG. 10, lines 1301 and 1302 indicate some change in surface energy on the carrier. As noted above, this indicates some change in the surface modification layer, and comparatively, Material #3 is somewhat less stable than Material #1. However, as noted by lines 1303 and 1304, the change in surface energy of the carrier is ≤5 mJ/m2, showing that the changes to the surface modification layer did not result in outgassing.

Material #4 is hexamethyldisilazane (HMDS) deposited from vapor in a YES HMDS oven at 140° C. This material is consistent with the surface modification layer in Example 2b, of Table 2, above. As shown in FIG. 10, lines 1401 and 1402 indicate some change in surface energy on the carrier. As noted above, this indicates some change in the surface modification layer, and comparatively, Material #4 is somewhat less stable than Material #1. Additionally, the change in surface energy of the carrier for Material #4 is greater than that for any of Materials #2 and #3 indicating, comparatively, that Material #4 is somewhat less stable than Materials #2 and #3. However, as noted by lines 1403 and 1404, the change in surface energy of the carrier is ≤5 mJ/m2, showing that the changes to the surface modification layer did not result in outgassing that affected the surface energy of the cover. However, this is consistent with the manner in which HMDS outgasses. That is, HMDS outgasses ammonia and water which do not affect the surface energy of the cover, and which may not affect some electronics fabrication equipment and/or processing. On the other hand, when the products of the outgassing are trapped between the thin sheet and carrier, there may be other problems, as noted below in connection with the second outgassing test.

Material #5 is Glycidoxypropylsilane, a SAM deposited from 1% toluene solution of glycidoxypropyltriethoxysilane and cured in vacuum oven 30 minutes at 190° C. This is a comparative example material. Although there is relatively little change in the surface energy of the carrier, as shown by lines 1501 and 1502, there is significant change in surface energy of the cover as shown by lines 1503 and 1504. That is, although Material #5 was relatively stable on the carrier surface, it did, indeed outgas a significant amount of material onto the cover surface whereby the cover surface energy changed by ≤10 mJ/m2. Although the surface energy at the end of 10 minutes at 600° C. is within 10 mJ/m2, the change during that time does exceed 10 mJ/m2. See, for example the data points at 1 and 5 minutes. Although not wishing to be bound by theory, the slight uptick in surface energy from 5 minutes to 10 minutes is likely do to some of the outgassed material decomposing and falling off of the cover surface.

Material #6 is DC704 a silicone coating prepared by dispensing 5 ml Dow Corning 704 diffusion pump oil tetramethyltetraphenyl trisiloxane (available from Dow Corning) onto the carrier, placing it on a 500° C. hot plate in air for 8 minutes. Completion of sample preparation is noted by the end of visible smoking. After preparing the sample in the above manner, the outgassing testing described above was carried out. This is a comparative example material. As shown in FIG. 10, lines 1601 and 1602 indicate some change in surface energy on the carrier. As noted above, this indicates some change in the surface modification layer, and comparatively, Material #6 is less stable than Material #1. Additionally, as noted by lines 1603 and 1604, the change in surface energy of the carrier is ≥10 mJ/m2, showing significant outgassing. More particularly, at the test-limit temperature of 450° C., the data point for 10 minutes shows a decrease in surface energy of about 15 mJ/m2, and even greater decrease in surface energy for the points at 1 and 5 minutes. Similarly, the change in surface energy of the cover during cycling at the 600° C. test-limit temperature, the decrease in surface energy of the cover was about 25 mJ/m2 at the 10 minute data point, somewhat more at 5 minutes, and somewhat less at 1 minute. Altogether, though, a significant amount of outgassing was shown for this material over the entire range of testing.

Material #7 is a is CH4-H2 plasma deposited polymer sequentially treated with brief N2-O2 and N2 plasmas. This material is similar to the surface modification layer in the examples of Table 11, above. As shown in FIG. 10, lines 7001 and 7002 show that the surface energy of the carrier did not significantly change. Thus, this material is very stable at temperatures from 450° C. to 600° C. Additionally, as shown by the lines 7003 and 7004, the surface energy of the cover did not significantly change either, i.e., the change is ≤5 mJ/m2. Accordingly, there was no outgassing associated with this material from 450° C. to 600° C.

Significantly, for Materials #1-4, and 7 the surface energies throughout the time-temperature cycling indicate that the cover surface remains at a surface energy consistent with that of bare glass, i.e., there is collected no material outgassed from the carrier surface. In the case of Material #4, as noted in connection with Table 2, the manner in which the carrier and thin sheet surfaces are prepared makes a big difference in whether an article (thin sheet bonded together with a carrier via a surface modification layer) will survive FPD processing. Thus, although the example of Material #4 shown in FIG. 10 may not outgas, this material may or may not survive the 400° C. or 600° C. tests as noted in connection with the discussion of Table 2.

A second manner of measuring small amounts of outgassing is based on an assembled article, i.e., one in which a thin sheet is bonded to a carrier via a surface modification layer, and uses a change in percent bubble area to determine outgassing. That is, during heating of the article, bubbles formed between the carrier and the thin sheet indicate outgassing of the surface modification layer. As noted above in connection with the first outgassing test, it is difficult to measure outgassing of very thin surface modification layers. In this second test, the outgassing under the thin sheet may be limited by strong adhesion between the thin sheet and carrier. Nonetheless, layers ≤10 nm thick (plasma polymerized materials, SAMs, and pyrolyzed silicone oil surface treatments, for example) may still create bubbles during thermal treatment, despite their smaller absolute mass loss. And the creation of bubbles between the thin sheet and carrier may cause problems with pattern generation, photolithography processing, and/or alignment during device processing onto the thin sheet. Additionally, bubbling at the boundary of the bonded area between the thin sheet and the carrier may cause problems with process fluids from one process contaminating a downstream process. A change in % bubble area of ≥5 is significant, indicative of outgassing, and is not desirable. On the other hand a change in % bubble area of ≤1 is insignificant and an indication that there has been no outgassing.

The average bubble area of bonded thin glass in a class 1000 clean room with manual bonding is 1%. The % bubbles in bonded carriers is a function of cleanliness of the carrier, thin glass sheet, and surface preparation. Because these initial defects act as nucleation sites for bubble growth after heat treatment, any change in bubble area upon heat treatment less than 1% is within the variability of sample preparation. To carry out this test, a commercially available desktop scanner with transparency unit (Epson Expression 10000XL Photo) was used to make a first scan image of the area bonding the thin sheet and carrier immediately after bonding. The parts were scanned using the standard Epson software using 508 dpi (50 micron/pixel) and 24 bit RGB. The image processing software first prepares an image by stitching, as necessary, images of different sections of a sample into a single image and removing scanner artifacts (by using a calibration reference scan performed without a sample in the scanner). The bonded area is then analyzed using standard image processing techniques such as thresholding, hole filling, erosion/dilation, and blob analysis. The newer Epson Expression 11000XL Photo may also be used in a similar manner. In transmission mode, bubbles in the bonding area are visible in the scanned image and a value for bubble area can be determined. Then, the bubble area is compared to the total bonding area (i.e., the total overlap area between the thin sheet and the carrier) to calculate a % area of the bubbles in the bonding area relative to the total bonding area. The samples are then heat treated in a MPT-RTP600s Rapid Thermal Processing system under N2 atmosphere at test-limit temperatures of 300° C., 450° C., and 600° C., for up to 10 minutes. Specifically, the time-temperature cycle carried out included: inserting the article into the heating chamber at room temperature and atmospheric pressure; the chamber was then heated to the test-limit temperature at a rate of 9° C. per minute; the chamber was held at the test-limit temperature for 10 minutes; the chamber was then cooled at furnace rate to 200° C.; the article was removed from the chamber and allowed to cool to room temperature; the article was then scanned a second time with the optical scanner. The % bubble area from the second scan was then calculated as above and compared with the % bubble area from the first scan to determine a change in % bubble area (Δ % bubble area). As noted above, a change in bubble area of ≥5% is significant and an indication of outgassing. A change in % bubble area was selected as the measurement criterion because of the variability in original % bubble area. That is, most surface modification layers have a bubble area of about 2% in the first scan due to handling and cleanliness after the thin sheet and carrier have been prepared and before they are bonded. However, variations may occur between materials. The same Materials #1-7 set forth with respect to the first outgassing test method were again used in this second outgassing test method. Of these materials, Materials #1-4 exhibited about 2% bubble area in the first scan, whereas Materials #5 and #6 showed significantly larger bubble area, i.e., about 4%, in the first scan.

The results of the second outgassing test will be described with reference to FIGS. 11 and 12. The outgassing test results for Materials #1-3 and #7 are shown in FIG. 11, whereas the outgassing test results for Materials #4-6 are shown in FIG. 12.

The results for Material #1 are shown as square data points in FIG. 11. As can be seen from the figure, the change in % bubble area was near zero for test-limit temperatures of 300° C., 450° C., and 600° C. Accordingly, Material #1 shows no outgassing at these temperatures.

The results for Material #2 are shown as diamond data points in FIG. 11. As can be seen from the figure, the change in % bubble area is less than 1 for test-limit temperatures of 450° C. and 600° C. Accordingly, Material #2 shows no outgassing at these temperatures.

The results for Material #3 are shown as triangle data points in FIG. 11. As can be seen from the figure, similar to the results for Material #1, the change in % bubble area was near zero for test-limit temperatures of 300° C., 450° C., and 600° C. Accordingly, Material #1 shows no outgassing at these temperatures.

The results for Material #7 are shown as cross data points in FIG. 11. As can be seen from the figure, the change in % bubble area is near zero for the test-limit temperatures of 300° C. and 450° C. Accordingly, Material #7 shows no outgassing at these temperatures. For the test-limit temperature of 600° C., Material #7 shows change in % bubble area of less than 2. Accordingly, Material #7 shows, at most, minimal outgassing at this temperature.

The results for Material #4 are shown as circle data points in FIG. 12. As can be seen from the figure, the change in % bubble area is near zero for the test-limit temperature of 300° C., but is near 1% for some samples at the test-limit temperatures of 450° C. and 600° C., and for other samples of that same material is about 5% at the test limit temperatures of 450° C. and 600° C. The results for Material #4 are very inconsistent, and are dependent upon the manner in which the thin sheet and carrier surfaces are prepared for bonding with the HMDS material. The manner in which the samples perform being dependent upon the manner in which the samples are prepared is consistent with the examples, and associated discussion, of this material set forth in connection with Table 2 above. It was noted that, for this material, the samples having a change in % bubble area near 1%, for the 450° C. and 600° C. test-limit temperatures, did not allow separation of the thin sheet from the carrier according to the separation tests set forth above. That is, a strong adhesion between the thin sheet and carrier may have limited bubble generation. On the other hand, the samples having a change in % bubble area near 5% did allow separation of the thin sheet from the carrier. Thus, the samples that had no outgassing had the undesired result of increased adhesion after temperature treatment which sticking the carrier and thin sheet together (preventing removal of the thin sheet from the carrier), whereas the samples that allowed removal of the thin sheet and carrier had the undesired result of outgassing.

The results for Material #5 are shown in FIG. 12 as triangular data points. As can be seen from the figure, the change in % bubble area is about 15% for the test-limit temperature of 300° C., and is well over that for the higher test-limit temperatures of 450° C. and 600° C. Accordingly, Material #5 shows significant outgassing at these temperatures.

The results for Material #6 are shown as square data points in FIG. 12. As can be seen from this figure, the change in % bubble area is over 2.5% for the test-limit temperature of 300° C., and is over 5% for the test limit-temperatures of 450° C. and 600° C. Accordingly, Material #6 shows significant outgassing at the test-limit temperatures of 450° C. and 600° C.

Bonding a Polymer Surface to a Glass Surface

Displays have been demonstrated on polymer sheets such as polyethylene naphthalate (PEN), polyethylene terephthalate (PET) and polyimide (PI), where the device fabrication was sheet to sheet with the PEN laminated to a glass carrier. Up to 100 micron thick layers of polymer adhesives are typically used to laminate PEN and PET to glass carriers for sheet to sheet processing. Weight loss of these adhesives during device processing is typically greater than 1%, which creates challenges for contamination due to outgassing of solvents. In addition, complete removal of the adhesive is challenging, so glass carriers are not commonly reused.

The present application describes use of thin surface modification layers to form moderate adhesion between a glass carrier and a polymer sheet to create a controlled temporary bond sufficiently strong to survive TFT processing but weak enough to permit debonding. Although thermal, vacuum, solvent and acidic, and ultrasonic Flat Panel Display (FPD) processes require a robust bond for thin polymer sheet bound to carrier, various ones of the present surface modification layers discussed herein were able to achieve such a controlled bonding for processing a polymer thin sheet on a glass carrier. Further, the controlled bonding was able to allow the polymer thin sheet to be removed from the carrier, without catastrophic damage to either the polymer thin sheet or the glass carrier and, thereby, provide a re-usable glass carrier.

Three transistor technologies are in mass production for FPD backplane fabrication: amorphous silicon (aSi) bottom gate TFT, polycrystalline silicon (pSi) top gate TFT, and amorphous oxide (IGZO) bottom gate TFT. These technologies all require high temperature processing steps >300 C. This requirement for substrates capable of high temperature processes as well as the requirement for chemical, mechanical and vacuum compatibility has been a major limitation to the industrialization of flexible displays on existing flexible substrates such as polymers. The general process begins with cleaning of the polymer substrate, typically in hot alkaline solutions with ultrasonic or megasonic agitation, followed by DI water rinse. The device structure is fabricated in a number of subtractive cycles of material deposition and photolithographic patterning followed by material etching. Metal, dielectric, and semiconductor materials are deposited by vacuum processes, for example, sputtering metals, transparent conductive oxides and oxide semiconductors, Chemical Vapor Deposition (CVD) deposition of amorphous silicon, silicon nitride, and silicon dioxide at elevated temperature. Laser and flash lamp annealing permit p-Si crystallization without excessive substrate heating, but uniformity is challenging and performance poor compared to glass substrates. Layers are patterned by a photolithographic patterning of polymer resist, and etching, followed by resist strip. Both vacuum plasma (dry) etch and acidic wet etch processes are used. In FPD processing, photoresist is typically stripped by a hot solvent, typically with ultrasonic or megasonic agitation.

Removing thick layers of adhesives prevents re-usability of the carrier For a polymer adhesive to be useful to FPD processing it must have good chemical durability in solvents, strong acids, and strong bases. However, these same properties make removal challenging. And with layers up to 100 microns thick, plasma processes are not practical to remove the layers. A major challenge for organic thin film transistor fabrication is lamination of the thin polymer sheet to a carrier.

The present application describes a method for controlled temporary bonding of polymer sheets to glass carriers for FPD processes and describes a reusable glass carrier for sheet to sheet processing of thin polymer substrates. The formation of a surface modification layer on the glass carrier creates temporary bonding with moderate adhesion between the thin polymer sheet and carrier. The moderate adhesion is achieved by optimizing the contributions of van der Waals and covalent attractive energies to the total adhesion energy which is controlled by modulating the polar and non-polar surface energy components of the thin sheet and the carrier. This moderate bonding is strong enough to survive FPD processing (including wet ultrasonic, vacuum, and thermal processes) and yet allow the polymer sheet to remain de-bondable from the carrier by application of sufficient peeling force. De-bonding permits removal of devices fabricated on the thin polymer sheet, and re-use of the carrier since the surface modification layer is <1 micron thick and readily removed in oxygen plasma.

There may be obtained the following advantages of using thin surface modification layers to create moderate bonding between a thin polymer sheet and a glass carrier.

(1) Approximately 100× reduction, compared to commercial adhesives, in the amount of material used to bond the thin polymer sheet to the carrier reduces outgassing and the potential for contamination to absorb and contaminate downstream processes.

(2) Highly cross-linked plasma polymer surface modification layers are non-volatile and insoluble, reducing the probability of outgassing and process contamination.

(3) The surface modification layer is readily removed in oxygen plasma or downstream oxygen plasma at elevated temperature.

(4) Glass carriers may be reused because the surface modification layer is thin and readily removed.

PEN and PET are the among the typically-chosen polymer substrates available in roll form for electronic fabrication. Compared to most polymers they are relatively chemically inert, have low water absorption, low expansion, and are temperature resistant. However these properties are inferior to those of glass. For example, the maximum temperature for non-heat stabilized PEN is 155° C., whereas that for PET is only 120° C. These temperatures are low compared to the >600° C. use temperatures of display glass suitable for pSi processing. Thermal expansion is about 20 ppm for PEN as opposed to 3.5 ppm for display glass. And shrinkage at temperature is about 0.1% after 30 min at 150° C., which is far in excess of relaxation and compaction in glass at considerably higher temperature. These inferior physical properties of the polymer substrate require process adaptations to deposit high quality devices at high yields. For example, silicon dioxide, silicon nitride and amorphous silicon deposition temperatures must be lowered to stay within the limits for the polymer substrate.

The above-described physical properties of polymers also make bonding to a rigid carrier for sheet to sheet processing challenging. For example, the thermal expansion of the polymer sheets is typically more than 6× that of display glass. Despite the smaller upper temperature limits, thermal stress is large enough to create warp and bow, and cause delamination when using conventional bonding techniques. Using high expansion glass such as soda lime or higher expansion metal carriers helps manage the warp challenge, but these carriers typically have challenges with respect to contamination, compatibility or roughness (thermal transfer).

The surface energy of PEN and PET are also considerably lower than that of glass. As shown in Table 16, below, Corning® Eagle XG® glass exhibits a surface energy of about 77 mJ/m2 after cleaning with SC1 chemistry and standard cleaning techniques. See example 16e. Without surface treatment, PEN and PET are non-polar with a surface energy of 43-45 mJ/m2 (43-45 dyn/cm). See Table 15, below, which is Table 2 from "Remote Atmospheric-Pressure Plasma Activation of the Surfaces of Polyethylene Terephthalate and Polyethylene Naphthalate" by E. Gonzalez, I I, M. D. Barankin, P. C. Guschl, and R. F. Hicks, Langmuir 2008 24 (21), 12636-12643. Plasma cleaning treatment (for example by oxygen plasma) greatly increases the surface energy to 55-65 mJ/m2 (55-65 dyn/cm, "plasma") by increasing the polar component. Also, UV ozone treatment, or corona discharge, may be used to clean the polymer and briefly raise its surface energy. However, over time the surface energy decrease back to its previous value ("aged").

TABLE 15

Polymer Surface Energies before and after Plasma Treatment and Aging

| polymer | experiment | surface energy (dyn/cm) | dispersive (dyn/cm) | polar (dyn/cm) |
|---|---|---|---|---|
| PET | control | 43.5 | 39.3 | 4.2 |
|  | plasma | 55.4 | 30.9 | 24.5 |
|  | aged$^a$ | 43.7 | 29.4 | 14.3 |
| PEN | control | 44.7 | 40.5 | 4.1 |
|  | plasma | 64.9 | 25.7 | 39.2 |
|  | aged$^a$ | 46.7 | 28.5 | 18.1 |

$^a$Approximately 4000 h after plasma treatment.

With these surface energies (about 55 to about 65 mJ/m2) for the polymer bonding surface, and about 77 mJ/m2 for the glass carrier bonding surface, the polymer sheet would not stick to the glass carrier well enough to allow processing of structures onto the sheet, but if first set on the glass carrier and then heated to moderate temperatures, the polymer was unable to be peeled from the glass carrier. Thus to initially bond PEN or PET to glass at room temperature, it was found to be beneficial to modify the surface energy of the glass carrier to about match surface energy than the PEN or PET. Additionally, various ones of the above-described surface modification layers were found to control the bonding energy so that the polymer layer could be peeled from the glass carrier even after organic-TFT processing cycles (including the one hour 120° C. vacuum anneal and the one minute 150° C. post bake step).

By selecting an appropriate surface modification layer to adjust the surface energy of the glass carrier appropriately, adequate wetting and adhesion strength can be achieved to controllably bond a polymer, for example, PEN or PET, to a glass carrier in a manner suitable for organic-TFT processing (including a one hour 120° C. vacuum anneal and a one minute 150° C. post bake step) while allowing removability of the polymer from the carrier after processing. The polymer sheet can be successfully removed from the carrier, i.e., the polymer sheet is controllably bonded to the carrier, if even after the above processing there is seen no noticeable difference in transistor geometry between the OTFT on the polymer sheet and that on the mask used to produce it. The surface modification layer may be chosen from among the various materials and treatments exemplified throughout the specification. The polymer material advantageously may be plasma cleaned prior to bonding (to increase the polar component of its surface energy so as to facilitate initial bonding), but need not be, as the surface energies of the glass carrier can be varied greatly so as to achieve a suitable level for controlled bonding with the polymer in its current state (i.e., either as received, as cleaned, or as aged). Based on the examples above and those in table 16 below, a range of surface energies from about 36 mJ/m2 (example 5g) to about 80 mJ/m2 (example 5f) can be attained on a glass carrier bonding surface.

Several of the above-described methods of surface modification are suitable for adhesive bonding of polymer sheets to a glass carrier, including those formed from carbon sources, for example from plasma polymerization of hydrocarbon gasses. For example: plasma polymer films deposited from fluorocarbon gasses (examples 5a and 5g); plasma polymer films deposited from fluorocarbon gasses and subsequently treated simultaneously with nitrogen and hydrogen (example 5m); plasma polymer films deposited from various non-fluorine-containing gasses (examples 6a-6j); plasma polymer films deposited from various mixtures of hydrocarbon, optionally nitrogen, and hydrogen, gasses (examples 7a-g, 12j); plasma polymer films deposited from various non-fluorine-containing gasses and subsequently treated with nitrogen (examples 9a-9j), wherein these surface energies may be useful with polymers in various states of cleanliness and/or aging; and plasma polymer films deposited from various non-fluorine-containing gasses and subsequently treated sequentially with nitrogen then hydrogen (examples 10a-10p), or treated with dilute ammonia (examples 8b, 8d), or sequentially treated with N2-O2 then with N2 (examples 11a, 11e), or treated with N2-O2 (examples 11f, 12c), all of which would work particularly well with plasma cleaned PEN. With polymers other than PET or PEN, other surface treatments may be suitable, depending upon the surface energy of the polymer as it exists just prior to bonding, as may be affected by the degree of cleaning and the degree of aging. It was found that glass carrier surface energies that about matched the surface energy of the polymer sheet performed well both in initial bonding and in controlling bonding so that the polymer sheet could easily be debonded after organic-TFT type processing (including the one hour 120° C. vacuum anneal and the one minute 150° C. post bake step).

Additionally, as follows, other formulations of surface modification layers were explored for achieving a surface energy in the range of the polymer sheet surface energy to bond the polymer thin sheet to a glass carrier.

Surface Modification Layers Formed From Mixtures of Gasses

One example of using plasma polymerized films to tune the surface energy of, and cover surface hydroxyls on and/or control the type of polar bond on, a bonding surface is deposition of a surface modification layer thin film from a mixture of source gasses, including a hydrocarbon (for example, methane). Deposition of the surface modification layer may take place in atmospheric or in reduced pressure, and is performed with plasma excitation for example, DC or RF parallel plate, Inductively Coupled Plasma (ICP), Electron Cyclotron Resonance (ECR), downstream microwave or RF plasma. The plasma polymerized surface modification layer may be disposed on the bonding surface of a carrier, a thin sheet, or both. As noted above in connection with the examples of Table 3, plasma polymerization creates a layer of highly cross-linked material. Control of reaction conditions and source gases can be used to control the surface modification layer film thickness, density, and chemistry to tailor the functional groups to the desired application. By controlling the film properties, including the amount of surface hydroxyls that are covered, the surface energy of a carrier bonding surface can be tuned. The surface energy can be tuned so as to control the degree of bonding, i.e., so as to prevent permanent covalent bonding, between the thin sheet and the carrier during subsequent treatments performed to dispose films or structures on the thin sheet.

In the examples of Table 16, below, various conditions were used to deposit a plasma polymerized film onto a glass carrier. The glass carrier was a substrate made from Corning® Eagle XG®, alumino boro silicate alkali-free display glass (available from Corning Incorporated, Corning N.Y.). Before film deposition, the carriers were cleaned using an SC1 and/or an SC2 chemistry and standard cleaning techniques. The films were deposited in an STS Multiplex PECVD apparatus (available from SPTS, Newport, UK) in triode electrode configuration mode wherein the carrier sat on a platen to which 50 Watts of 380 kHz RF energy was applied, above the platen there was disposed a coil (shower head) to which 300 Watts of 13.5 MHz RF energy was applied, the temperature of the platen was 200° C., and the flow-rates of the gasses through the shower head were as shown in Table 16 (flowrates being in standard cubic centimeters per minute—sccm). Thus, for example, the notation in the "Surface Modification Layer Deposition Process" column of Table 16 for example 16b is read as follows: in the STS Multiplex PECVD apparatus, at a platen temperature of 200° C., 200 sccm of H2, 50 sccm of CH4, and 50 sccm of C2F6, were flowed together through the shower head, into a chamber having a pressure of 300 mTorr; 300 W of 13.5 MHz RF energy was applied to the shower head; 50 W of 380 kHz RF energy was applied to the platen on which the carrier sat; and the deposition time was 120 seconds. The notation in the surface treatment column for the remaining examples can be read in a similar manner. Surface energies were calculated in mJ/m$^2$ (milli Joules per square meter) by using the contact angles (CA) of three different test liquids (in this case, water (W), hexadecane (HD), and diiodomethane DIM) and the Wu model. For the surface energies, the polar (P) and dispersive (D) components, as well as total (T), are shown. Also shown, for these examples, is the thickness of the surface modification layer in Angstroms "Th (A)".

TABLE 16

Varying Surface Energy with Different Surface Modification Layers

| | | Contact Angle | | | Surface Energy | | | |
|---|---|---|---|---|---|---|---|---|
| Example | Surface Modification Layer Deposition Process | W | HD | DIM | D | P | T | Th (A) |
| 16a | 200 C. 200H2 50CH4 300 mtorr 300/50 W 600 s | 69.17 | 2.53 | 32.67 | 34.41 | 14.55 | 48.96 | 330.7 |
| 16b | 200 C. 50 C2F6 200H2 50CH4 300 mT 300/50 W 120 s | 90.67 | 5.4 | 48.77 | 31.27 | 5.71 | 36.98 | 399.2 |
| 16c | 200 C. 30N2 200H2 50CH4 300 mT 300/50 W 120 s | 46.37 | 3.2 | 32.87 | 34.37 | 26.45 | 60.82 | 56.8 |
| 16d | 200 C. 100CH4 25NH3 300 mT 300/50 W 120 s | 53.8 | 3.7 | 34.73 | 34.05 | 22.6 | 56.65 | 9.6 |
| 16e | EXG SC1 cleaned | 2.67 | 4.27 | 27.07 | 35.29 | 41.59 | 76.88 | |

Example 16e is a bare piece of Eagle XG® glass after having been cleaned with SC1 chemistry and standard cleaning techniques. Example 16e shows that after cleaning, the surface energy of the glass was about 77 mJ/m$^2$.

Examples 16a to 16d show that surface modification layers may be deposited onto the glass surface to modify the surface energy thereof, so that the surface of the glass may be tailored to a particular bonding application. The examples of table 16 are examples of a one step process, as were the examples of tables 6 and 7, for deposition of a surface modification layer having desired surface energy and polar groups.

Example 16a shows that the surface modification layer may be a plasma polymerized film deposited from a mixture of hydrogen and methane (hydrocarbon) gasses. In these examples, the surface modification layer was deposited onto a cleaned glass carrier. Accordingly, the deposition of the surface modification layer is shown to reduce the surface energy from about 77 to about 49 mJ/m$^2$, which is in the range of that on typical polymer bonding surfaces.

Example 16b shows that the surface modification layer may be a plasma polymerized film deposited form a mixture of hydrogen, methane (hydrocarbon), and a fluorine-containing gas (for example, C2F6, a fluorocarbon). In these examples, the surface modification layer was deposited onto a cleaned glass substrate. Accordingly, the deposition of the surface modification layer is shown to reduce the surface energy from about 77 to about 37 mJ/m$^2$, about in the range of that on typical polymer bonding surfaces. The surface energy achieved in example 16b is lower than that achieved in example 16a, showing that an addition of fluorine to the deposition gasses can lower the surface energy achieved by otherwise similar surface modification layer deposition conditions.

Example 16c shows that the surface modification layer may be a plasma polymerized film deposited from a mixture of hydrogen, methane (hydrocarbon), and a nitrogen-containing gas (for example, N2). In this example, the surface modification layer was deposited onto a cleaned glass carrier. Accordingly, the deposition of the surface modification layer is shown to reduce the surface energy from about 77 to about 61 mJ/m$^2$, which is in the range of that on a typical polymer bonding surface that has been O2 plasma treated, as during cleaning of the polymer sheet. This surface energy is also in the range for suitability of bonding a thin glass sheet to the carrier.

Example 16d shows that the surface modification layer may be a plasma polymerized film deposited form a mixture of methane (hydrocarbon), and a nitrogen-containing gas (for example, NH3). In this example, the surface modification layer was deposited onto a cleaned glass substrate. Accordingly, the deposition of the surface modification layer is shown to reduce the surface energy from about 77 to about 57 mJ/m$^2$, again, in the range of that on typical polymer bonding surfaces. Also, for some applications, this may be suitable for bonding the carrier to a thin glass sheet.

The surface energies achieved by examples 16c and 16d, as compared with that achieved by example 16a, show that the addition of nitrogen (by either N2 or by NH3) to the deposition gasses can increase the surface energy achieved by otherwise similar deposition gasses.

The surface energy obtained by the surface modification layer of example 16b was below 50 mJ/m$^2$ (considered as being suitable for controlled bonding of a glass thin sheet to a glass carrier), however this surface modification layers is suitable for bonding of a polymer bonding surface to a glass bonding surface. Additionally, it should be noted that the surface energy produced by the surface modification layers of examples 16c and 16d, (formed from plasma polymerization of hydrocarbon (methane), optionally hydrogen-containing (H2), and nitrogen-containing (N2 or ammonia) gasses) are greater than about 50 mJ/m$^2$ and, thus, in some instances may be suitable for bonding a thin glass sheet to a glass carrier.

The thin sheet bonded to the carriers having surface modification layers disposed thereon as per the examples 16a to 16d of Table 16 was a substrate made from TEONEX® Q65 PEN (available from DuPont) and having a thickness of 200 microns.

In the examples of Table 16, although the bonding surface on which the surface modification layers were disposed was glass, such need not be the case. Instead, the bonding surface may be another suitable material having a similar surface energy and properties as glass, for example, silicon, polysilicon, single crystal silicon, ceramic, glass-ceramic, sapphire, or quartz.

Plasma polymerized hydrocarbon polymer films may be deposited from methane and hydrogen (example 16a), with optional fluorocarbon (example 16b), optional nitrogen (example 16c), or optional ammonia (example 16d) additions in an STS Multiplex CVD in triode mode. Surface energy as low as 37 mJ/m2 (example 16b) and higher surface energy (about 61 mJ./m2, example 16c) can be achieved with fluorocarbon, or nitrogen additions. Surface energies between the levels of examples 16b and 16c (i.e., about 49 mJ/m2 as in example 16a, and about 57 mJ/m2 as in example 16d) can also be achieved, thus demonstrating the ability to tune the surface energy of the surface modification layer based on deposition conditions, including deposition gasses.

By way of counter-example, a polymer film was disposed onto a bare glass carrier as SC1 cleaned (example 16e). However, the polymer sheet did not stick well enough to the carrier to allow processing of structures onto the polymer sheet.

More than just wetting and bond strength are required to be suitable for organic-TFT processing. The vastly different thermal expansion between the polymer film and carrier are best managed by choosing a high expansion glass to minimize the expansion difference, and by reducing the rate of heating and cooling steps. The need for a smooth and clean substrate surface with minimal water absorption during processing may be accomplished by spinning and curing a thin layer of a suitable organic dielectric, which both planarizes the surface, as well as creates a barrier for moisture and other contaminants.

The surface modification layer process was used to bond PEN (TEONEX® Q65 200 micron thick sheet from DuPont) to a Corning® Eagle XG® glass carrier. Very good bonding performance was found with an amorphous carbon layer deposited with the following conditions: 50CH4 200H2 300 W 13.56 MHz RF to showerhead, 50 W 380 kHz RF to 200° C. platen and 2 minute deposition time. PEN was exposed to UV-Ozone cleaner for 5 minutes prior to bonding as this was found to improve adhesion. A Teflon squeegee was used to apply the PEN. An about 150 nm thick cycloaliphatic epoxy layer was spun and cured on the PEN to smooth out the surface defects. The organic gate insulator (OGI) was a photopatternable cycloaliphatic epoxy.

Figure 18:
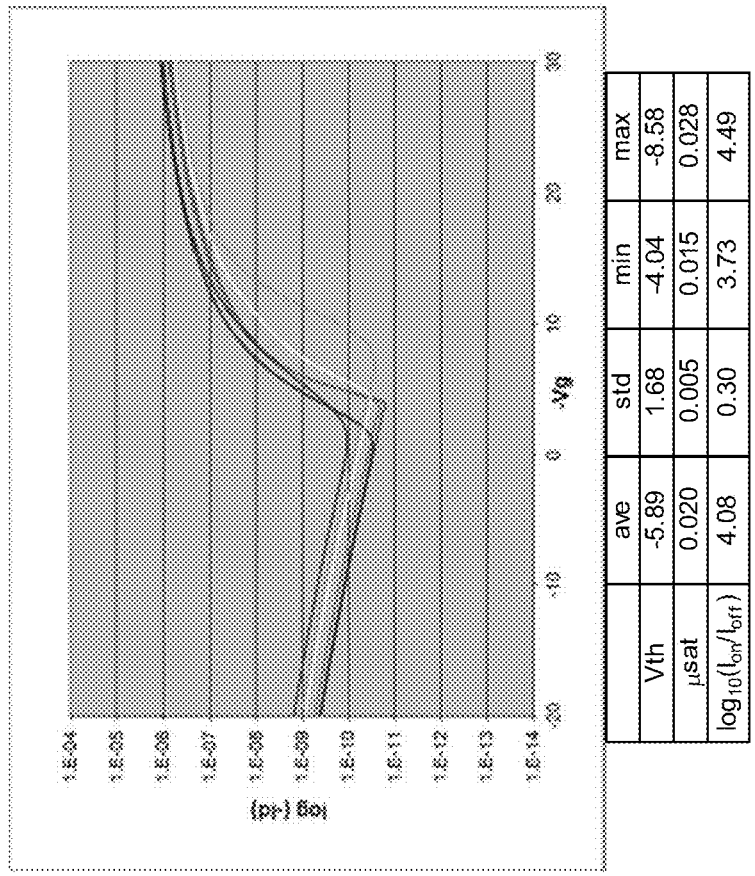
FIG. 18 is a summary of performance for an organic transistor fabricated on a 200 micron PEN film bonded to a glass carrier.

An array of bottom gate bottom contact organic thin film transistors was formed by the following process. A 100 nm Al gate metal was deposited by sputtering in MA, and lithographically pattern with Fuji 6512 resist, and the gate patterned by wet etch in Type A Al etchant. Photoresist was removed by 3 min in a room temperature PGMEA bath, followed by IPA/DI rinse (NMP based stripers were incompatible with the epoxy layer). A second epoxy gate insulator layer was spun over the patterned gate and cured. A 100 nm thick Ag S/D metal was sputtered and lithographically patterned with Fuji 6512 and etched with a 1:1 mix of Transene TFS: pH 10 buffer. Etching was challenging because the Ag etch rate was fast, but dissolution of the etch products was slow. Very good results were obtained by etching 5 s, removing etch products with spraying DI water, and repeating four to five times. Wetting of the tetrathienoacene-DPP co-polymer (PTDPPTFT4) organic semiconductor (OSC) layer was challenging. OSC adhesion was promoted by HMDS treatment in a YES oven at 120° C. OSC polymer was dissolved in 6 parts decalin:4 parts toluene at 5 mg/mL concentration. The OSC was applied by spinning in the Laurel spinner with manual dispense, 20 second rest 500 rpm 30 second 1000 rpm 60 second. The OSC film was soft baked 90° C. 2 min on a hot plate, and vacuum annealed at 120° C. for 1 hr in the Salvis oven under rough vacuum to remove residual decalin. Using a brief 5 second O2 plasma in the Branson to improve adhesion, a third OGI layer was spun over the OSC and directly photo patterned with a 2.5 second exposure, 1 min rest, and 1 min 150° C. post bake. After 1 min rest, the active pattern was tray developed in PGMEA for 1 min followed by IPA and DI rinse. Dry etching in the Unaxis 790 RIE using 30 sccm O2 10 sccm Ar 20 sccm CHF3 50 mT 200 W 15 s was used to pattern the active and expose the gate metal. Performance of the 75/75 um TFT's is summarized in the table shown in FIG. 18, which shows drain current versus gate voltage and performance for a typical transistor with 75 micron channel width and 75 micron channel length, bottom gate bottom contact organic thin film transistors fabricated on PEN controllably bonded to a glass carrier as described above. The PEN was easily debonded by using a razor blade to initiate a crack and then peeling off. The polymer sheet was successfully removed from the carrier, even after the above processing, as there was seen no noticeable difference in transistor geometry between the OTFT on the polymer sheet and that on the mask used to produce it.

The above-described process of forming an array of bottom gate bottom contact organic thin film transistors was also carried out successfully with a PEN sheet (TEONEX® Q65 200 micron thick sheet from DuPont) controllably bonded to a carrier made of Corning® Gorilla® Glass (an alkali-containing, chemically strengthenable, cover glass available from Corning Incorporated, Corning, N.Y.), with a suitable surface modification layer chosen from those described herein.

As described above, the polymer may itself be the substrate on which other devices are fabricated. Alternatively, the polymer may be a polymer surface on a composite material substrate, for example, a glass/polymer composite. In this case, the polymer surface of the glass/polymer composite would face the carrier and would be bonded thereto as described above, whereas the glass surface of the glass/polymer composite would be exposed as a surface on which electronic or other structures may be fabricated. After fabrication of the electronic or other structures on the glass surface of the glass/polymer composite, the polymer surface of the composite may be peeled from the surface modification layer on the carrier. This embodiment may be advantageous as the glass layer in the glass/polymer composite becomes particularly thin, for example, having a thickness of ≤50 microns, ≤40 microns, ≤30 microns, ≤20 microns, ≤10 microns, or ≤5 microns. In such a case, the polymer portion of the glass/polymer composite would not only act as a bonding surface to attach the composite to a carrier, it may also lend some handling advantages to the composite when the composite is not on the carrier.

To Process Thin Wafers in Semiconductor and/or Interposer Processing

Some examples of the present invention are generally directed to carriers bonded to and removed from thinner substrates to allow processing of the thinner substrates. More particularly, some examples of the present invention are directed to methods and apparatuses for bonding wafers to carriers for semiconductor and/or interposer processing, and then debonding the wafers from the carriers after such processing.

Semiconductor devices are fabricated by forming active devices on or within a semiconductor wafer. The semiconductor wafer may comprise, for example, glass, silicon, polysilicon, single crystal silicon, silicon oxide, aluminum oxide, combinations of these, and/or the like. Hundreds or thousands of integrated circuits (ICs) or dies are typically manufactured on a single wafer. Typically, a plurality of insulating, conductive, and semiconductive material layers are sequentially deposited and patterned over the wafer to form the ICs. One of the uppermost-formed material layers typically comprises a layer for bond pads which make electrical connection to the underlying active areas and components within the wafer.

After the ICs are formed, the wafer may be subjected to backside processing. The backside processing may include thinning the wafer to prepare the wafer for packaging. For example, in some technologies, backside processing may include forming electrical connections to through-substrate vias formed through the wafer for providing backside contacts. In this example, the backside of the wafer is thinned through a process such as grinding in order to expose the conductive vias on the backside of the wafer. This process of thinning the wafer can damage the edges of the wafer and can make the wafer even more fragile and susceptible to damage during subsequent transportation and processing of the wafer.

To help alleviate these types of damage, a carrier is normally attached to the wafer. This carrier is attached using an adhesive, and is intended to allow handling of the wafer by handling the carrier. Additionally, the added strength of the carrier supports the wafer so that stresses caused by transportation and/or processing will not damage the wafer.

A typical carrier may be a glass substrate attached to the wafer using an adhesive. It has been found, however, that the wafer may warp during processing and that the typical carrier does not provide sufficient support to prevent warping. As a result of the warpage of the wafer, processes may fail and/or cause alarm conditions. The first portion of the IC fabrication, where the active transistors, resistors and RC circuits, and local wiring to interconnect the transistors are patterned in the semiconductor, is called front-end-of-line (FEOL) processing. FEOL processing may also include: well formation; gate module formation; source and drain module formation; DRIE (dry reactive ion etch); PVD, Ti or Cu, or other; CVD TiN or other; PECVD SiO2, or other; Electrolytic Cu (or other) Plating; Cu (or other) annealing; Metrology (X-Ray or other); Cu (or other) CMP (Chemical Mechanical Polish); Cu (H2O2+H2SO4)+Ti (DHF) Wet Etch; Sputter Adhesion Layer (Ti or other); Sputter Seed Layer (Cu or other); Lithography (Photoresist, expose, strip, etch Cu). Due to some of the high temperature (e.g., ≥500° C., in some instances, 500° C. to 650° C., and in some cases up to 700° C.) processes associated with FEOL processing, many adhesive based solutions cannot be used, as they may fail to hold the bond, they may outgas contaminants, or both. Many adhesives even outgas at much lower temperatures, e.g., around 300° C. The portion of IC fabrication line where the coarse wiring that connects longer distances across individual chip and goes to off chip locations are interconnected with wiring on the wafer is called back-end-of-line (BEOL) wiring. BEOL processing may also include one or more of formation of contacts, insulating layers, interconnect wiring, RF shielding, passivation, ESD protection, bonding pads and other bonding sites for chip-to-package solutions. Although BEOL processing temperatures are generally lower than FEOL processing temperatures, dielectric deposition typically occurs at 350-450° C. and most adhesives outgas at these lower temperatures. Moreover, most temporary adhesives have high CTEs which are mismatched with the wafer and carrier materials, and are difficult to remove while leaving the delicate microstructures on the wafer intact. Additionally, the CTE mismatch between the adhesive and the wafer and/or carrier materials may cause undesirable warping of the wafer. Still further, adhesive may find its way into the vias of an interposer when bonding to a carrier and undesirably prevent metallization of at least part of the via.

Thus, there is a need for an improved carrier-substrate solution that can withstand processing conditions, particularly the high temperature demands of FEOL processing. Additionally, a carrier-substrate solution that can withstand the rigors of FEOL, and yet provide for easy debonding thereafter, will allow a thinner initial substrate to be used from the get-go, thereby alleviating the need for back-end thinning. That is, typical existing semiconductor tools are designed to process wafers on the order of 500 microns and above. However, with a carrier supporting a wafer, the combined thickness need only be within the tools' processing thickness range. Thus, for example, a carrier having a thickness of 400 microns may be used to support a wafer of 100 microns, and the combination processed in the existing semiconductor tool. With the present solution, due to the controlled bonding that allows easy separation even after high temperature processing, 100 micron wafers may be used as substrates, thereby avoiding the waste and potential yield reductions of thinning after forming devices on the wafer. The ability to withstand FEOL processing will allow a carrier-substrate solution to start with a wafer having a thickness of ≤200 microns, for example, 200, 190, 180, 170, 160, 150, 140, 130, 120, 110, 100, 90, 80, 70, 60, 50, 40, 30, or 20 microns. The wafer of such a thickness (≤200 microns for example) can be attached to a carrier, processed, and then removed from the carrier. This can be a major advantage when, for example, polysilicon or single crystal silicon wafers are used as the substrates because there can be avoided the removal and waste of a very expensive material; the material can simply be processed at its as-formed thickness.

Additionally, 3D IC technology has been widely accepted by the Semiconductor Industry as a major technology trend to improve performance of semiconductors without requiring ever more expensive advanced lithography solutions or requiring larger chip size to accommodate more circuitry. This technology for 3D ICs relies on thinned silicon ICs, and also on interposers to redistribute electrical signals between IC's directly on a single interposer in a planar configuration (2.5D IC) as well as to stack thinned IC's (3D IC).

These interposers, which can be made of polysilicon, single crystal silicon or glass, allow dramatic improvements in the speed of communications by reducing path lengths from millimeters to microns. The lead application for this new technology has been Field Programmable Gate Arrays (FPGA), a high end specialized functionality manufactured by Xilinx (San Jose, Calif., USA), for example.

Interposers are characteristically on the order of 50 um to 100 um thick, sized from 200 mm OD to 300 mm OD today, trending towards larger sized panels long term. The vias, through which electrical signals are processed following metallization, are from 5 um OD to 150 um OD with a density typically 1 to 20 vias per square millimeter, depending on design and application. Interposers are by definition thin, as thick interposers cause an unacceptable form factor (height) and performance (heat) obstacles. Thin is generally regarded as around 100 microns, but generally not to exceed 200 microns. On the other end, the International Technology Roadmap for Semiconductors (ITRS) allows for thicknesses down to 50 um. Again, substrates of these thicknesses generally cannot be processed in existing tools. Thus, the present disclosure contemplates the advantageous use of a carrier, and one that may stay attached with the wafer even during high temperature processing, and yet still allow an easy release of the wafer after such processing.

Although the interposer technology is new, the dominant interposer substrate is single crystal silicon, with glass emerging as an alternative. The attractiveness of glass is performance and cost, but no solution has yet existed today to realize these advantages for glass. The concepts in the present disclosure will allow processing of a variety of thin substrates as wafers, including silicon and glass, as well as under a variety of conditions, including FEOL and BEOL, to provide a variety of devices including ICs, RC circuits, and interposers.

The bonding solutions of the present disclosure allow the processing of thin form at final thickness glass, as well as thinned Silicon, through all existing required process steps with high yield and with low processing time. After the thin wafer is processed through metallization, distribution layer placement, it can be debonded leaving the thinned and processed interposer, and/or IC, intact. Moreover, the use of carrier with an already-thinned (on the order of ≤200 microns) silicon wafer allows the wafer to be screened before any devices are processed thereon. Accordingly, costs can be reduced and/or yields improved.

In light of the above, there is a need for a thin sheet— carrier article that can withstand the rigors of the FEOL processing, including high temperature processing (without outgassing that would be incompatible with the semiconductor or display making processes in which it will be used), yet allow the entire area of the thin sheet to be removed (either all at once, or in sections) from the carrier. The present specification describes ways to control the adhesion between the carrier and thin sheet to create a temporary bond sufficiently strong to survive FEOL processing (including high temperature processing) but weak enough to permit debonding of the sheet from the carrier, even after high-temperature processing. More specifically, the present disclosure provides surface modification layers (including various materials and associated surface heat treatments), that may be provided on the thin sheet, the carrier, or both, to control both room-temperature van der Waals, and/or hydrogen, bonding and high temperature covalent bonding between the thin sheet and carrier. Even more specifically, the room-temperature bonding may be controlled so as to be sufficient to hold the thin sheet and carrier together during vacuum processing, wet processing, and/or ultrasonic cleaning processing. And at the same time, the high temperature covalent bonding may be controlled so as to prevent a permanent bond between the thin sheet and carrier during high temperature processing, as well as maintain a sufficient bond to prevent delamination during high temperature processing. In alternative embodiments, the surface modification layers may be used to create various controlled bonding areas (wherein the carrier and sheet remain sufficiently bonded through various processes, including vacuum processing, wet processing, and/or ultrasonic cleaning processing). Still further, some surface modification layers provide control of the bonding between the carrier and sheet while, at the same time, reduce outgassing emissions during the harsh conditions in an FPD (for example LTPS) processing environment, including high temperature and/or vacuum processing, for example.

Another use of controlled bonding via surface modification layers (including materials and the associated bonding surface heat treatment) is to provide for use of a thin sheet on a carrier to process the thin sheet in processes requiring a temperature ≥400° C. (for example ≥450° C., ≥500° C., ≥550° C., ≥600° C.), as in FEOL processing, for example. That is, the thin sheet may be a wafer that is processed at thickness without having to thin it later on. Surface modification layers (including the materials and bonding surface heat treatments), as exemplified by the examples 2e, 3a, 3b, 4c, 4d, 4e, and 5b-f, 5h-l, above, may be used to provide reuse of the carrier under such temperature conditions. Specifically, these surface modification layers may be used to modify the surface energy of the area of overlap between the bonding areas of the thin sheet and carrier, whereby the entire thin sheet may be separated from the carrier after processing. The thin sheet may be separated all at once, or may be separated in sections as, for example, when first removing devices produced on portions of the thin sheet and thereafter removing any remaining portions to clean the carrier for reuse, for example. In the event that the entire thin sheet is removed from the carrier, as by removal of the thin sheet as a whole, or as by removing diced sections of the thin sheet the sum of which add to the entire thin sheet, the carrier can be reused as is by simply by placing another thin sheet thereon. Alternatively, the carrier may be cleaned and once again prepared to carry a thin sheet by forming a surface modification layer anew. Because the surface modification layers prevent permanent bonding of the thin sheet with the carrier, they may be used for processes wherein temperatures are ≥600° C. Of course, although these surface modification layers may control bonding surface energy during processing at temperatures ≥600° C., they may also be used to produce a thin sheet and carrier combination that will withstand processing at lower temperatures, for example temperatures ≥400° C. (for example ≥450° C., ≥500° C., ≥550° C.), and may be used in such lower temperature applications to control bonding, without outgassing (in the case of materials of examples 3a, 3b, 4c, 4d, 4e, 5b-f, h-l), for example in BEOL processing. Moreover, where the thermal processing of the article will not exceed 400° C., surface modification layers as exemplified by the examples 2c, 2d, 4b, the examples of Tables 7-11 (including the alternatives of the examples of Table 10), 12, 16, or the examples of a surface treatment with 02 alone, together with any surface preparation, described as being suitable for controllably bonding a thin glass sheet to a glass carrier, above, may be used at the process temperatures noted above in connection with those tables, in this same manner. The thin sheet may be a polysilicon or single crystal silicon wafer, silicon wafer, glass, ceramic, glass-ceramic, quartz, sapphire, having a thickness of ≤200 microns, and may be processed at, for example temperatures ≥500° C. to form RC circuits, ICs, or other electronic devices thereon in FEOL processing. After FEOL processing, the wafer may easily be removed from the carrier without damaging the electronic devices. Before removal, however, the wafer may undergo further, lower temperature processing, as in BEOL processing, for example.

A second use of controlled bonding via surface modification layers (including materials and the associated bonding surface heat treatments) is to fabricate an interposer. More specifically, with the use of the surface modification layers an area of controlled bonding can be formed wherein a sufficient separation force can separate the thin sheet (or a portion thereof) from the carrier without damage to either the thin sheet or the carrier caused by the bond, yet there is maintained throughout processing a sufficient bonding force to hold the thin sheet relative to the carrier. In this case, the thin sheet is an interposer, which may be a wafer made from any suitable material including silicon, polysilicon, single crystal silicon, glass, ceramic, glass-ceramic, quartz, sapphire, for example, and which may have a thickness of ≤200 microns, for example.

An example of an interposer, and the fabrication thereof, will now be described with reference to FIGS. 19-21.

Figure 19:
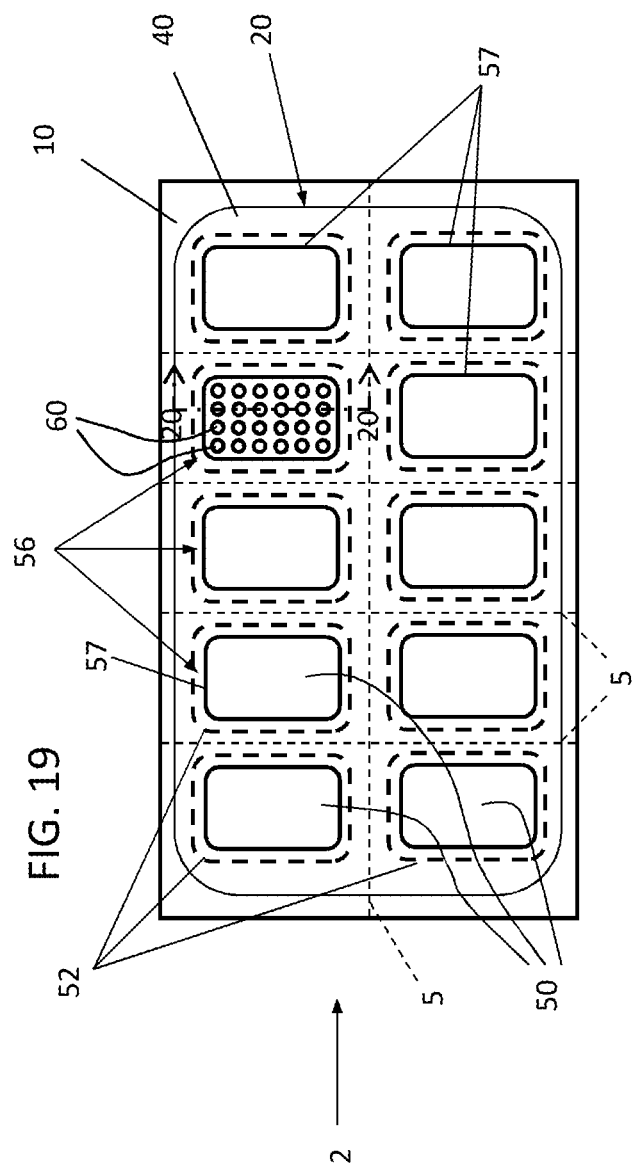
FIG. 19 is a top view of a thin sheet and carrier, having interposers.

With reference to FIG. 19, a thin sheet 20 may be bonded to a carrier 10 by a controlled bonding area 40.

In this embodiment, the carrier 10, may be a glass substrate, or another suitable material having a similar surface energy as glass, for example, silicon, polysilicon, single crystal silicon, ceramic, glass-ceramic, sapphire, or quartz. An advantage of using a glass substrate is that flat sheets having minimal thickness variation can be obtained at a relatively low cost, avoiding the need for expensive carrier substrates. Additionally, with glass, a high quality can be achieved in a cost effective manner. That is, a very uniform thickness glass substrate can be made very cheaply, and used as a carrier. However, with the surface modification layers of the present disclosure, the carrier need not be a high precision carrier having a low total thickness variation as in the case where the wafer will be thinned to final thickness. That is, when a wafer on a carrier will be thinned, the carrier must have a very tight control on total thickness variation because any variation in the carrier will be present in the thinned wafer upon thinning. With the surface modification layers of the present disclosure, which allow forming devices on the wafer when the wafer is already at final thickness, the total thickness variation of the carrier is much less important.

In this embodiment, the thin sheet 20 is used to form interposers 56. The sheet may be silicon, including polysilicon or a single crystal silicon wafer, quartz, sapphire, ceramic, or glass, for example. The sheet 20 may have a thickness of ≤200 microns. The interposers 56 each having a perimeter 52 and an array 50 of vias, wherein the array 50 has a perimeter 57. Although ten interposers 56 are shown, any suitable number—including one—may be disposed on one thin sheet 20. For convenience of illustration, each interposer 56 is shown as having only one array 50 of vias, but such need not be the case; instead any interposer 56 may have more than one array 50. Further, although each interposer is shown as having the same number of arrays 50, such need not be the case; any number (including zero) of the interposers may have the same number of arrays 50. Additionally, although the arrays 50 will typically have the same number and pattern of vias, such need not be the case. For convenience of illustration, vias 60 are shown on only one of the arrays 50 of one of the interposers 56, but such need not be the case, i.e., any one or more of the remaining interposers 56 may have one or more arrays 50 of vias 60.

Figure 20:
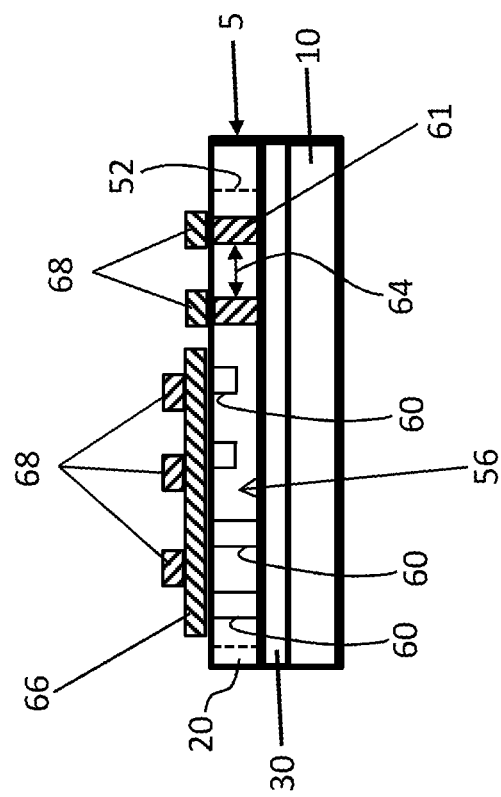
FIG. 20 is a cross-sectional view of the thin sheet and carrier as taken along line 20-20 of FIG. 19.

Reference will now be made to FIG. 20, which is a cross-sectional view as taken along line 20-20 in FIG. 19. The vias 60 may include through vias or blind vias, i.e., vias that end within the thickness of the sheet 20. Vias 60 have a diameter 62, and are spaced at a pitch 64. Although the diameters 62 are shown as being the same, such need not be the case, i.e., there may be different diameter vias in one array 50 or in different arrays 50 on one interposer 56. The diameter 62 may be from 5 microns to 150 microns, for example. Similarly, although the vias 62 are spaced at the same pitch 64, such need not be the case, i.e., different pitches may be present in one array 50, or in different arrays 50 on one interposer 56 or in different interposers 56 on one thin sheet 20. The pitch may be such that there are from 1 to 20 vias per square millimeter, for example, and will depend upon the design and application of the interposer. Additionally, material 61 may be present in any one or more of the vias 60. The material 61 may be an electrically conductive material, an electrically insulating material, or a combination thereof. For example, a conductive material may be formed on the perimeter of the via, i.e., at its outside diameter 62, and either a different conductive material or an insulating material may be used to fill in the remainder of the via.

Figure 21:
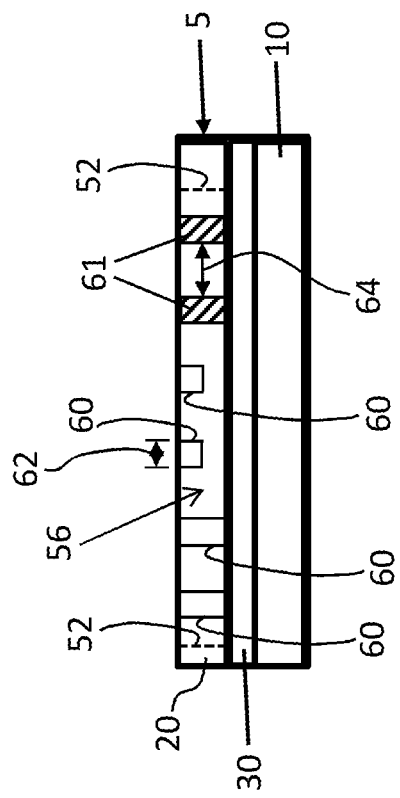
FIG. 21 is a cross-sectional view, similar to that in FIG. 20, but having additional devices disposed on the thin sheet.

Reference will now be made to FIG. 21, which is a view similar to that in FIG. 20, but with devices/structures disposed on the interposer 56 and connected to via(s) 60. As shown in FIG. 21, a device 66 may be disposed over, and connected with, a plurality of vias 60. Device 66 may include integrated circuits; MEMS; microsensors; power semiconductors; light-emitting diodes; photonic circuits; CPU; SRAM; DRAM, eDRAM; ROM, EEPROM; flash memory; interposers; embedded passive devices; and microdevices fabricated on or from silicon, silicon-germanium, gallium arsenide, and gallium nitride. Although only one device 66 is shown, there may be any suitable number of devices 66 on one interposer 56, including an array of devices 56. Alternatively, a structure 68 may be disposed over and connected with only one via 60. Structures 68 may include: solder bumps; metal posts; metal pillars; interconnection routings; interconnect lines; insulating oxide layers; and structures formed from a material selected from the group consisting of silicon, polysilicon, silicon dioxide, silicon (oxy)nitride, metal (for example, Cu, Al, W), low k dielectrics, polymer dielectrics, metal nitrides, and metal silicides. Although only one structure 68 is shown, there may be any suitable number of structures 68 on one interposer 56, including array(s) of structures 56. Further, one or more structures 68 may be disposed on a device 66.

In the controlled bonding area 40, the carrier 10 and thin sheet 20 are bonded to one another so that over the entire area of overlap, the carrier 10 and thin sheet 20 are connected, but may be separated from one another, even after high temperature processing, e.g. processing at temperatures ≥400° C., for example ≥450° C., ≥500° C., ≥550° C., ≥600° C., and on up to about 650° C., or in some cases to 700° C.

The surface modification layers 30, including the materials and bonding surface heat treatments, as exemplified by the examples 2a, 2e, 3a, 3b, 4c, 4d, 4e, and the examples of Tables 5, 7-11 (including the alternatives of the examples of Table 10), 12, 16, or the examples of a surface treatment with O2 alone, together with any surface preparation, described as being suitable for controllably bonding a thin glass sheet to a glass carrier, above, may be used to provide the controlled bonding areas 40 between the carrier 10 and the thin sheet 20, at the process temperatures noted above in connection with those tables. Specifically, these surface modification layers may be formed within the perimeters 52 of the arrays 50 either on the carrier 10 or on the thin sheet 20. Accordingly, when the article 2 is processed at high temperature during device processing, there can be provided a controlled bond between the carrier 10 and the thin sheet 20 within the areas bounded by perimeters 52 whereby a separation force may separate (without catastrophic damage to the thin sheet or carrier) the thin sheet and carrier in this region, yet the thin sheet and carrier will not delaminate during processing, including ultrasonic processing. Additionally, because of the very small thickness of the surface modification layer, i.e., less than 100 nanometers, less than 40 nanometers, less than 10 nanometers, and in some instances about 2 nanometers, there is no effect on the wafer due to CTE mismatch between the wafer and the surface modification layer (as there is in the case of thicker adhesive layers, i.e., on the order of 40-60 microns or more). Additionally, when there is a need to limit outgassing between the thin sheet and carrier, the surface modification layer materials of examples 3b, 4c, 4e, 5b-f, h-l, 11a-e, and 12a-j, may be used.

Then, during extraction of the interposers 56 (each having an array 50 of vias 60) having perimeters 52, the portions of thin sheet 20 within the perimeters 52 may simply be separated from the carrier 10 after processing and after separation of the thin sheet along perimeters 52. Alternatively, the thin sheet 20 (and alternatively both the thin sheet 20 and the carrier 10) may be diced along lines 5, whereby a section of the thin sheet 20 larger than the interposer 56 perimeter 52 may be removed from the carrier 10, or sections of the carrier 10 as in the event that the carrier is diced together with the thin sheet 20. Because the surface modification layers control bonding energy to prevent permanent bonding of the thin sheet with the carrier, they may be used for processes wherein temperatures are ≥600° C. Of course, although these surface modification layers may control bonding surface energy during processing at temperatures ≥600° C., they may also be used to produce a thin sheet and carrier combination that will withstand processing at lower temperatures for example ≥400° C. (for example ≥450° C., ≥500° C., ≥550° C.), and may be used in such lower temperature applications. Moreover, where the thermal processing of the article will not exceed 400° C., surface modification layers as exemplified by the examples 2c, 2d, 4b, the examples of tables 7-11 (including the examples discussed as alternatives of the examples of Table 10), examples 12a, 12b, 12c, 12g, 12J, examples 16c, 16d, and the examples of a surface treatment with O2 alone, may also be used—in some instances, depending upon the other process requirements—in this same manner to control bonding surface energy. Moreover, as noted above, the surface modification layer materials of examples 3b, 4c, and 4e, 11a-e, and 12a-j, may be used in instances were outgassing between the thin sheet and carrier is a concern.

Conclusion

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, although the surface modification layer 30 of many embodiments is shown and discussed as being formed on the carrier 10, it may instead, or in addition, be formed on the thin sheet 20. That is, as appropriate, the materials as set forth in the examples of tables 3-12 and 16 may be applied to the carrier 10, to the thin sheet 20, or to both the carrier 10 and thin sheet 20 on faces that will be bonded together.

Further, although some surface modification layers 30 were described as controlling bonding strength so as to allow the thin sheet 20 to be removed from the carrier 10 even after processing the article 2 at temperatures of 400° C., or of 600° C., of course it is possible to process the article 2 at lower temperatures than those of the specific test the article passed and still achieve the same ability to remove the thin sheet 20 from the carrier 10 without damaging either the thin sheet 20 or the carrier 10.

Still further, although the controlled bonding concepts have been described herein as being used with a carrier and a thin sheet, in certain circumstances they are applicable to controlling bonding between thicker sheets of glass, ceramic, or glass ceramic, wherein it may be desired to detach the sheets (or portions of them) from each other.

Further yet, although the controlled bonding concepts herein have been described as being useful with glass carriers and glass thin sheets, the carrier may be made of other materials, for example, ceramic, glass ceramic, or metal. Similarly, the sheet controllably bonded to the carrier may be made of other materials, for example, ceramic or glass ceramic.

Still further yet, although the surface modification layer above in examples 3 and 5-12 were described as being formed by plasma polymerization, other techniques may be possible, for example, by thermal evaporation sputtering, UV activation of species in gas that reacts with the bonding surface, or wet chemistry.

Still further, although the carbonaceous surface modification layer formed by plasma polymerization of examples 6-12 were formed using methane as a polymer forming gas, other carbon-containing source materials may be possible. For example, the carbon-containing source could include at least one of: 1) a hydrocarbon (alkane, alkene, alkyne or aromatic. Alkanes include but are not limited to: methane, ethane, propane and butane; alkenes include but are not limited to: ethylene, propylene and butylene; alkynes include but are not limited to: acetylene, methylacetylene, ethylacetylene and dimethylacetylene; aromatics include but are not limited to: benzene, toluene, xylene, ethylbenzene); 2) an alcohol (including: methanol, ethanol, propanol); 3) an aldehyde or ketone (including: formaldehyde, acetaldehyde and acetone); 4) an amine (including: methylamine, dimethyl amine, trimethylamine and ethylamine); 5) an organic acid (including: formic acid and acetic acid); 6) a nitrile (including: acetonitrile); 7) CO; and 8) CO2. Alternatively, the carbon-containing source could include one or more of the following: 1) a saturated or unsaturated hydrocarbon, or 2) a nitrogen-containing or 3) oxygen-containing saturated or unsaturated hydrocarbon, or 4) CO or CO2. Some generally typical carbon-containing source materials include carbon-containing gasses, for example methane, ethane, propane, butane, ethylene, propylene, propyne, acetylene, MAPP, CO, and CO2.

Still further yet, although the polar groups used to treat the surface modification layer, and thereby increase its surface energy as in examples 5 and 8-12, or used in the formation of the surface modification layer itself as in examples 7, 16c, 16d, were nitrogen and oxygen, other polar groups may be possible, for example, sulfur and/or phosphorous.

Additionally, although N2 and NH3 were used as nitrogen-containing gasses, other nitrogen-containing materials may possibly be used, for example, hydrazine, N2O, NO, N2O4, methylamine, dimethylamine, trimethylamine and ethylamine, acetonitrile.

Also, although the oxygen-containing gasses used were N2-O2 and O2, it may be possible to use other oxygen-containing gasses, for example, O3, H2O, methanol, ethanol, propanol, N2O, NO, and N2O4.

As can be seen from the examples discussed herein, the surface modification layers, including those subsequently treated, can achieve a thickness from about 1 nm (example 16b) or 2 nm (examples 3, 4) to about 10 nm (example 12c, 8.8 nm). Additionally, thicker surface modification layers are also possible, as explained with respect to FIG. 15. However, as thickness becomes greater than about 70 nm, the surface modification layer starts to become translucent, which may be undesirable for applications that benefit from optical clarity.

The various above-described concepts according to the present application may be combined with one another in any and all different manners of combination. By way of example, the various concepts may be combined according to the following aspects.

According to a first aspect, there is provided a method of controllably bonding a thin sheet to a carrier, comprising:
  obtaining a thin sheet having a thin sheet bonding surface;
  obtaining a carrier having a carrier bonding surface;
  depositing a carbonaceous surface modification layer onto at least one of the thin sheet bonding surface and the carrier bonding surface;
  incorporating polar groups with the surface modification layer; and
  bonding the thin sheet bonding surface to the carrier bonding surface via the surface modification layer.

According to a second aspect, there is provided the method of aspect 1, wherein the at least one of the thin sheet bonding surface and the carrier bonding surface has a surface energy including a polar component, and wherein the incorporation of the polar groups increases the polar component of the surface energy by at least 20 mJ/m².

According to a third aspect, there is provided the method of aspect 1 or aspect 2, wherein the polar groups comprise at least one of nitrogen and oxygen.

According to a fourth aspect, there is provided the method of any one of aspects 1-3, wherein the surface modification layer is deposited by plasma polymerization of a carbon-containing gas.

According to a fifth aspect, there is provided the method of aspect 4, wherein the carbon-containing gas comprises at least one of a hydrocarbon, an alkane, an alkene, an alkyne, or aromatic.

According to a sixth aspect, there is provided the method of aspect 4, wherein the carbon-containing gas comprises at least one of methane, ethane, propane, butane, ethylene, propylene, propyne, acetylene, CO, and CO2.

According to a seventh aspect, there is provided the method of aspect 4, further comprising flowing hydrogen together with the carbon-containing gas during the plasma polymerization.

According to an eighth aspect, there is provided the method of any one of aspects 4-7, further comprising using a diluent gas during the plasma polymerization to control the mole fraction of deposition gas.

According to a ninth aspect, there is provided the method of aspect 8, wherein the diluent gas comprises an inert gas.

According to a tenth aspect, there is provided the method of any one of aspects 4-10, further comprising flowing a reactive gas during the plasma polymerization.

According to an eleventh aspect, there is provided the method of aspect 10, wherein the reactive gas comprises at least one of nitrogen-containing, hydrogen-containing, and oxygen-containing gas According to a twelfth aspect, there is provided the method of any one of aspects 1-11, wherein depositing the surface modification layer is performed prior to the incorporation of polar groups and provides a first surface energy on the at least one of the thin sheet bonding surface and the carrier bonding surface; and wherein the incorporation of polar groups is performed after the deposition of the surface modification layer and changes the first surface energy to a second surface energy, wherein the second surface energy is greater than the first.

According to a thirteenth aspect, there is provided the method of any one of aspects 1-12, wherein the polar group incorporation is performed by one of:
  treatment of the surface modification layer with a nitrogen-containing gas;
  sequential treatment of the surface modification layer with a first treatment gas then a second treatment gas, wherein the first treatment gas is one of a nitrogen-containing gas and a hydrogen-containing gas, and where the second treatment gas is the other one of the nitrogen-containing gas and the hydrogen-containing gas;
  treatment of the surface modification layer with an oxygen-containing gas;
  plasma treatment of the surface modification layer with a nitrogen-and-oxygen-containing gas;
  sequential plasma treatment of the surface modification layer with a first treatment gas then a second treatment gas, wherein the first treatment gas is a nitrogen-and-oxygen-containing gas and wherein the second treatment gas is a nitrogen-containing gas.

According to a fourteenth aspect, there is provided the method of aspect 13 wherein when a hydrogen-containing gas is used, the hydrogen-containing gas comprises H2, and wherein when a nitrogen-containing gas is used, the nitrogen-containing gas comprises at least one of ammonia, N2, hydrazine, N2O, NO, N2O4, methylamine, dimethylamine, trimethylamine, ethylamine, and acetonitrile.

According to a fifteenth aspect, there is provided the method of aspect 13 wherein when a hydrogen-containing gas is used, the hydrogen-containing gas comprises H2, and wherein when an oxygen-containing gas is used, the oxygen-containing gas comprises at least one of O2, O3, H2O, methanol, ethanol, propanol, N2O, NO, and N2O4.

According to a sixteenth aspect, there is provided the method of any one of aspects 1-15, wherein the thin sheet bonding surface comprises glass.

According to a seventeenth aspect, there is provided the method of any one of aspects 1-16, wherein the carrier bonding surface comprises glass.

According to an eighteenth aspect, there is provided the method of aspect 17, wherein the at least one of the thin sheet bonding surface and the carrier bonding surface has an average surface roughness Ra of ≤1 nm prior to deposition of the surface modification layer.

According to a nineteenth aspect, there is provided the method of aspect 17 or aspect 18, wherein the at least one of the thin sheet bonding surface and the carrier bonding surface has an average surface roughness Ra of ≤1 nm after deposition and subsequent removal of the surface modification layer by O2 plasma cleaning.

According to a twentieth aspect, there is provided the method of aspect 17 or aspect 18, wherein the carrier bonding surface has a first average surface roughness Ra1 prior to deposition of the surface modification layer, wherein the carrier has a second surface roughness Ra2 after the surface modification layer has been disposed thereon and subsequently removed by O2 plasma cleaning, and the difference between Ra1 and Ra2 is ≤1 nm, when average surface roughness measurement is taken over a 5×5 micron area.

According to a twenty first aspect, there is provided the method of any one of aspects 1-20, wherein the thin sheet has a thickness ≤300 microns.

According to a twenty second aspect, there is provided the method of any one of aspects 1-21, wherein the surface modification layer has a thickness of from 1 to 70 nm.

According to a twenty third aspect, there is provided the method of any one of aspects 1-21, wherein the surface modification layer has a thickness from 2 to 10 nm.

According to a twenty fourth aspect, there is provided the method of any one of aspects 1-23, wherein the at least one of the thin sheet bonding surface and the carrier bonding surface comprises glass, and further wherein the surface modification layer achieves on the at least one bonding surface a surface energy of 37 to 74 mJ/m$^2$ prior to bonding with the other one of the thin sheet bonding surface and the carrier bonding surface.

According to a twenty fifth aspect, there is provided a thin sheet removably bonded to a carrier article, comprising:
a thin sheet having a thin sheet bonding surface;
a carrier having a carrier bonding surface;
a surface modification layer, wherein the surface modification layer comprises a plasma-polymerized hydrocarbon bonding the thin sheet bonding surface to the carrier bonding surface.

According to a twenty sixth aspect, there is provided a thin sheet removably bonded to a carrier article, comprising:
a thin sheet having a thin sheet bonding surface;
a carrier having a carrier bonding surface;
a surface modification layer, wherein the surface modification layer comprises a bulk carbonaceous layer having a first polar group concentration and a surface layer having a second polar group concentration, wherein the second polar group concentration is higher than the first polar group concentration, the surface modification layer bonding the thin sheet bonding surface to the carrier bonding surface.

According to a twenty seventh aspect, there is provided the article of aspect 25 or aspect 26, wherein the thin sheet bonding surface comprises glass.

According to a twenty eighth aspect, there is provided the article of any one of aspects 25-27, wherein the carrier bonding surface comprises glass.

According to a twenty ninth aspect, there is provided the article of aspect 28, wherein the at least one of the thin sheet bonding surface and the carrier bonding surface has an average surface roughness Ra of ≤1 nm prior to deposition of the surface modification layer.

According to a thirtieth aspect, there is provided the article of aspect 28 or aspect 29, wherein the at least one of the thin sheet bonding surface and the carrier bonding surface has an average surface roughness Ra of ≤1 nm with the surface modification layer disposed thereon.

According to a thirty first aspect, there is provided the article of any one of aspects 25-30, wherein the thin sheet has a thickness ≤300 microns.

According to a thirty second aspect, there is provided the article of any one of aspects 25-31, wherein the surface modification layer has a thickness of from 1 to 70 nm.

According to a thirty third aspect, there is provided the article of any one of aspects 25-31, wherein the surface modification layer has a thickness from 2 to 10 nm.

According to a thirty fourth aspect, there is provided the article of any one of aspects 25-33, wherein the surface modification layer bonds the carrier bonding surface with the thin sheet bonding surface so that after subjecting the bonded sheet and carrier article to a temperature cycle by heating in an chamber cycled from room temperature to 400° C. at a rate of 9.2° C. per minute, held at a temperature of 400° C. for 10 minutes, and then cooled at furnace rate to 300° C., and then removing the article from the chamber and allowing the article to cool to room temperature, the carrier and thin sheet do not separate from one another if one is held and the other subjected to the force of gravity, and the thin sheet may be separated from the carrier without breaking the thinner one of the carrier and the sheet into two or more pieces.

According to a thirty fifth aspect, there is provided the article of any one of aspects 25-34, wherein the surface modification layer is configured so that when the carrier bonding surface is bonded with the thin sheet bonding surface with the surface modification layer therebetween to form an article, after subjecting the article to an outgassing temperature cycle by heating in an chamber cycled from room temperature to 450° C. at a rate of 9.2° C. per minute, held at a temperature of 450° C. for 10 minutes, and then cooled at furnace rate to 200° C., and then removing the article from the chamber and allowing the article to cool to room temperature, the surface modification layer does not outgas during the outgassing temperature cycle.

According to a thirty sixth aspect, there is provided the article of aspect 35, wherein outgassing is defined as a change in % bubble area that is ≥5, according to outgassing test #2.

According to a thirty seventh aspect, there is provided the article of aspect 35, wherein outgassing is defined as a change in surface energy of the cover ≥15 mJ/m$^2$ at a test limit temperature of 450° C. according to outgassing test #1.

According to a thirty eighth aspect, there is provided the glass article of any one of aspects 34-37, wherein the heating is performed in nitrogen.

According to a thirty ninth aspect, there is provided the article of any one of aspects 25-38, wherein the portion of the surface modification layer in direct contact with the bonding surface comprises up to 3% fluorine.

According to an aspect A, there is provided a glass article comprising:

a carrier having a carrier bonding surface;

a surface modification layer disposed on the carrier bonding surface, wherein the surface modification layer is configured so that when the carrier bonding surface is bonded with a glass sheet bonding surface with the surface modification layer therebetween, after subjecting the article to a temperature cycle by heating in an chamber cycled from room temperature to 600° C. at a rate of 9.2° C. per minute, held at a temperature of 600° C. for 10 minutes, and then cooled at 1° C. per minute to 300° C., and then removing the article from the chamber and allowing the article to cool to room temperature, the carrier and sheet do not separate from one another if one is held and the other subjected to the force of gravity, there is no outgassing from the surface modification layer during the temperature cycle, and the sheet may be separated from the carrier without breaking the thinner one of the carrier and the sheet into two or more pieces.

According to an aspect B, there is provided a glass article comprising:

a carrier having a carrier bonding surface;

a sheet having a sheet bonding surface;

a surface modification layer disposed on one of the carrier bonding surface and the sheet bonding surface, the carrier bonding surface being bonded with the sheet bonding surface with the surface modification layer therebetween, wherein the surface energy bonding the sheet to the carrier is of such a character that after subjecting the article to a temperature cycle by heating in an chamber cycled from room temperature to 600° C. at a rate of 9.2° C. per minute, held at a temperature of 600° C. for 10 minutes, and then cooled at 1° C. per minute to 300° C., and then removing the article from the chamber and allowing the article to cool to room temperature, the carrier and sheet do not separate from one another if one is held and the other subjected to the force of gravity, there is no outgassing from the surface modification layer during the temperature cycle, and the sheet may be separated from the carrier without breaking the thinner one of the carrier and the sheet into two or more pieces.

According to an aspect C, there is provided the glass article of any one of aspects A or B, wherein the surface modification layer has a thickness of from 0.1 to 100 nm.

According to an aspect D, there is provided the glass article of any one of aspects A or B, wherein the surface modification layer has a thickness of from 0.1 to 10 nm.

According to an aspect E, there is provided the glass article of any one of aspects A or B, wherein the surface modification layer has a thickness of from 0.1 to 2 nm.

According to an aspect F, there is provided the glass article of any one of aspects A to E or 1-39, wherein the carrier is a glass comprising an alkali-free, alumino-silicate or boro-silicate or alumino-boro-silicate, glass having arsenic and antimony each at a level ≤0.05 wt. %.

According to an aspect G, there is provided the glass article of any one of aspects A to F or 1-39, wherein each of the carrier and the sheet is of a size 100 mm×100 mm or larger.

According to a fortieth aspect, there is provided an article, comprising:

a carrier with a carrier bonding surface;

a sheet with at least one via therein, the sheet further comprising a sheet bonding surface;

a surface modification layer;

the carrier bonding surface being bonded with the sheet bonding surface with the surface modification layer therebetween, wherein the surface modification layer is of such a character that after subjecting the article to a temperature cycle by heating in an chamber cycled from room temperature to 500° C. at a rate of 9.2° C. per minute, held at a temperature of 500° C. for 10 minutes, and then cooled at furnace rate to 300° C., and then removing the article from the chamber and allowing the article to cool to room temperature, the carrier and sheet do not separate from one another if one is held and the other subjected to the force of gravity, and the sheet may be separated from the carrier without breaking the thinner one of the carrier and the sheet into two or more pieces when separation is performed at room temperature.

According to a forty first aspect, there is provided an article, comprising:

a carrier with a carrier bonding surface;

a sheet with at least one via therein, the sheet further comprising a sheet bonding surface;

a surface modification layer;

the carrier bonding surface being bonded with the sheet bonding surface with the surface modification layer therebetween, wherein the surface modification layer is of such a character that after subjecting the article to a temperature cycle by heating in an chamber cycled from room temperature to 400° C. at a rate of 9.2° C. per minute, held at a temperature of 400° C. for 10 minutes, and then cooled at furnace rate to 300° C., and then removing the article from the chamber and allowing the article to cool to room temperature, the carrier and sheet do not separate from one another if one is held and the other subjected to the force of gravity, there is no outgassing from the surface modification layer according to test #2, and the sheet may be separated from the carrier without breaking the thinner one of the carrier and the sheet into two or more pieces when separation is performed at room temperature.

According to a forty second aspect, there is provided the article of aspect 40 or aspect 41, the sheet comprises silicon, quartz, sapphire, ceramic, or glass.

According to a forty third aspect, there is provided the article of aspect 40, the sheet thickness is ≤200 microns.

According to a forty fourth aspect, there is provided an article, comprising:

a carrier with a carrier bonding surface;

a wafer sheet comprising a thickness ≤200 microns, the sheet further comprising a sheet bonding surface, the sheet comprising silicon, quartz, or sapphire;

a surface modification layer;

the carrier bonding surface being bonded with the sheet bonding surface with the surface modification layer therebetween, wherein the surface modification layer is of such a character that after subjecting the article to a temperature cycle by heating in an chamber cycled from room temperature to 500° C. at a rate of 9.2° C. per minute, held at a temperature of 500° C. for 10 minutes, and then cooled at furnace rate to 300° C., and then removing the article from the chamber and allowing the article to cool to room temperature, the carrier and sheet do not separate from one another if one is held and the other subjected to the force of gravity, and the sheet may be separated from the carrier without breaking the thinner one of the carrier and the sheet into two or more pieces when separation is performed at room temperature.

According to a forty fifth aspect, there is provided an article, comprising:
  a carrier with a carrier bonding surface;
  a wafer sheet comprising a thickness ≤200 microns, the sheet further comprising a sheet bonding surface, the sheet comprising silicon, quartz, or sapphire;
  a surface modification layer;
  the carrier bonding surface being bonded with the sheet bonding surface with the surface modification layer therebetween, wherein the surface modification layer is of such a character that after subjecting the article to a temperature cycle by heating in an chamber cycled from room temperature to 400° C. at a rate of 9.2° C. per minute, held at a temperature of 400° C. for 10 minutes, and then cooled at furnace rate to 300° C., and then removing the article from the chamber and allowing the article to cool to room temperature, the carrier and sheet do not separate from one another if one is held and the other subjected to the force of gravity, there is no outgassing from the surface modification layer according to test #2, and the sheet may be separated from the carrier without breaking the thinner one of the carrier and the sheet into two or more pieces when separation is performed at room temperature.

According to a forty sixth aspect, there is provided the article of aspect 44 or aspect 45, the sheet further comprising at least one via therein.

According to a forty seventh aspect, there is provided the article of any one of aspects 40-43, 46, the at least one via has a diameter of ≤150 microns.

According to a forty eighth aspect, there is provided the article of any one of aspects 40-43, 46, 47, the at least one via comprises electrically conductive material therein.

According to a forty ninth aspect, there is provided the article of any one of aspects 40-48, the sheet comprising a device surface opposite the sheet bonding surface, the device surface comprising an array of devices selected from the group consisting of: integrated circuits; MEMS; CPU; microsensors; power semiconductors; light-emitting diodes; photonic circuits; interposers; embedded passive devices; and microdevices fabricated on or from silicon, silicon-germanium, gallium arsenide, and gallium nitride.

According to a fiftieth aspect, there is provided the article of any one of aspects 40-48, the sheet comprising a device surface opposite the sheet bonding surface, the device surface comprising at least one structure selected from the group consisting of: solder bumps; metal posts; metal pillars; interconnection routings; interconnect lines; insulating oxide layers; and structures formed from a material selected from the group consisting of silicon, polysilicon, silicon dioxide, silicon (oxy)nitride, metal, low k dielectrics, polymer dielectrics, metal nitrides, and metal silicides.

According to a fifty first aspect, there is provided the article of any one of aspects 40-50, wherein the heating is performed in Nitrogen.

According to a fifty second aspect, there is provided the article of any one of aspects 40, 42-44, 46-51, wherein there is no outgassing from the surface modification layer during the heating, wherein outgassing from the surface modification layer is defined as at least one of:
  (a) wherein the change in surface energy of the cover is ≥15 mJ/m2 at a test-limit temperature of 600° C. according to outgassing test #1; and
  (b) wherein the change in % bubble area is ≥5 at a test limit temperature of 600° C. according to outgassing test #2.

According to a fifty third aspect, there is provided the article of any one of aspects 40-52, the surface modification layer comprises one of:
  a) a plasma polymerized fluoropolymer; and
  b) an aromatic silane.

According to a fifty fourth aspect, there is provided the article of any one of aspects 40-53, thickness of the surface modification layer is from 0.1 to 100 nm.

According to a fifty fifth aspect, there is provided the article of any one of aspects 40-54, the carrier comprises glass.

According to a fifty sixth aspect, there is provided the article of any one of aspects 40-55, wherein the bonding surface of at least one of the carrier and the sheet comprises an area of ≥100 square cm.

According to a fifty seventh aspect, there is provided a method of making an interposer, comprising:
  obtaining a carrier with a carrier bonding surface;
  obtaining a sheet with at least one via therein, the sheet further comprising a sheet bonding surface, wherein at least one of the carrier bonding surface and the sheet bonding surface comprises a surface modification layer thereon;
  bonding the carrier to the sheet with the bonding surfaces and the surface modification layer to form an article;
  subjecting the article to front-end-of-line (FEOL) processing, wherein after FEOL processing the carrier and sheet do not separate from one another if one is held and the other subjected to the force of gravity;
  removing the sheet from the carrier without breaking the thinner one of the carrier and the sheet into two or more pieces.

According to a fifty eighth aspect, there is provided the method of aspect 57, the sheet comprises silicon, quartz, sapphire, ceramic, or glass.

According to a fifty ninth aspect, there is provided the method of aspect 57, the sheet thickness is ≤200 microns.

According to a sixtieth aspect, there is provided a method of processing a silicon wafer sheet, comprising:
  obtaining a carrier with a carrier bonding surface;
  obtaining a wafer sheet with a thickness ≤200 microns, the sheet comprising silicon, quartz, or sapphire, the sheet further comprising a sheet bonding surface, wherein at least one of the carrier bonding surface and the sheet bonding surface comprises a surface modification layer thereon;
  bonding the carrier to the sheet with the bonding surfaces and the surface modification layer to form an article;
  subjecting the article to front-end-of-line (FEOL) processing, wherein after FEOL processing the carrier and sheet do not separate from one another if one is held and the other subjected to the force of gravity;
  removing the sheet from the carrier without breaking the thinner one of the carrier and the sheet into two or more pieces.

According to a sixty first aspect, there is provided the method of aspect 60, the sheet further comprising at least one via therein.

According to a sixty second aspect, there is provided the method of any one of aspects 57-61, wherein the FEOL processing comprises processing-chamber temperatures of from 500° C. to 700° C.

According to a sixty third aspect, there is provided the method of any one of aspects 57-61, wherein the FEOL processing comprises at least one of: DRIE (dry reactive ion etch); PVD; CVD TiN; PECVD SiO2; Electrolytic Cu Plating; Cu Annealing; Metrology; Cu CMP; Cu (H2O2+ H2SO4)+Ti (DHF) Wet Etch; Sputter Adhesion Layer; Sputter Seed Layer; Lithography (Photoresist, expose, strip, etch Cu).

According to a sixty fourth aspect, there is provided the method of any one of aspects 57-59, 61-63, the at least one via has a diameter of ≤150 microns.

According to a sixty fifth aspect, there is provided the method of any one of aspects 57-59, 61-64, the at least one via comprises electrically conductive material therein.

According to a sixty sixth aspect, there is provided the method of any one of aspects 57-65, the sheet comprising a device surface opposite the sheet bonding surface, the device surface comprising an array of devices selected from the group consisting of: integrated circuits; MEMS; CPU; microsensors; power semiconductors; light-emitting diodes; photonic circuits; interposers; embedded passive devices; and microdevices fabricated on or from silicon, silicon-germanium, gallium arsenide, and gallium nitride.

According to a sixty seventh aspect, there is provided the method of any one of aspects 57-65, the sheet comprising a device surface opposite the sheet bonding surface, the device surface comprising at least one structure selected from the group consisting of: solder bumps; metal posts; metal pillars; interconnection routings; interconnect lines; insulating oxide layers; and structures formed from a material selected from the group consisting of silicon, polysilicon, silicon dioxide, silicon (oxy)nitride, metal, low k dielectrics, polymer dielectrics, metal nitrides, and metal silicides.

According to a sixty eighth aspect, there is provided the method of any one of aspects 57-67, wherein the heating is performed in Nitrogen.

According to a sixty ninth aspect, there is provided the method of any one of aspects 57-68, wherein there is no outgassing from the surface modification layer during the heating, wherein outgassing from the surface modification layer is defined as at least one of:

(a) wherein the change in surface energy of the cover is ≥15 mJ/m2 at a test-limit temperature of 600° C. according to outgassing test #1; and (b) wherein the change in % bubble area is ≥5 at a test limit temperature of 600° C. according to outgassing test #2.

According to a seventieth aspect, there is provided the method of any one of aspects 57-69, the surface modification layer comprises one of:

a) a plasma polymerized fluoropolymer; and b) an aromatic silane.

According to a seventy first aspect, there is provided the method of any one of aspects 57-70, thickness of the surface modification layer is from 0.1 to 100 nm.

According to a seventy second aspect, there is provided the method of any one of aspects 57-71, the carrier comprises glass.

According to a seventy third aspect, there is provided the method of any one of aspects 57-72, wherein the bonding surface of at least one of the carrier and the sheet comprises an area of ≥100 square cm.

What is claimed is:

1. A method of controllably bonding a thin sheet to a carrier, comprising:
   obtaining a thin sheet having a thin sheet bonding surface;
   obtaining a carrier having a carrier bonding surface;
   depositing a carbonaceous surface modification layer onto at least one of the thin sheet bonding surface and the carrier bonding surface;
   incorporating polar groups with the surface modification layer; and
   bonding the thin sheet bonding surface to the carrier bonding surface via the surface modification layer.

2. The method of claim 1, wherein the surface modification layer is deposited by plasma polymerization of a carbon-containing gas.

3. The method of claim 2, further comprising using a diluent gas during the plasma polymerization to control the mole fraction of deposition gas.

4. The method of claim 3, further comprising flowing a reactive gas during the plasma polymerization.

5. The method of claim 2, further comprising flowing hydrogen together with the carbon-containing gas during the plasma polymerization.

6. The method of claim 1, wherein the at least one of the thin sheet bonding surface and the carrier bonding surface has a surface energy including a polar component, and wherein the incorporation of the polar groups increases the polar component of the surface energy by at least 20 mJ/m$^2$.

7. The method of claim 1, wherein depositing the surface modification layer is performed prior to the incorporation of polar groups and provides a first surface energy on the at least one of the thin sheet bonding surface and the carrier bonding surface; and wherein the incorporation of polar groups is performed after the deposition of the surface modification layer and changes the first surface energy to a second surface energy, wherein the second surface energy is greater than the first.

8. The method of claim 1, wherein the polar group incorporation is performed by one of:
   treatment of the surface modification layer with a nitrogen-containing gas;
   sequential treatment of the surface modification layer with a first treatment gas then a second treatment gas, wherein the first treatment gas is one of a nitrogen-containing gas and a hydrogen-containing gas, and where the second treatment gas is the other one of the nitrogen-containing gas and the hydrogen-containing gas;
   treatment of the surface modification layer with an oxygen-containing gas;
   plasma treatment of the surface modification layer with a nitrogen-and-oxygen-containing gas;
   sequential plasma treatment of the surface modification layer with a first treatment gas then a second treatment gas, wherein the first treatment gas is a nitrogen-and-oxygen-containing gas and wherein the second treatment gas is a nitrogen-containing gas.

9. The method of claim 1, wherein the at least one of the thin sheet bonding surface and the carrier bonding surface has an average surface roughness Ra of ≤1 nm prior to deposition of the surface modification layer, and wherein the at least one of the thin sheet bonding surface and the carrier bonding surface has an average surface roughness Ra of ≤1 nm after deposition and subsequent removal of the surface modification layer by $O_2$ plasma cleaning.

10. The method of claim 1, wherein the at least one of the thin sheet bonding surface and the carrier bonding surface comprises glass, and further wherein the surface modification layer achieves on the at least one bonding surface a surface energy of 37 to 74 mJ/m$^2$ prior to bonding with the other one of the thin sheet bonding surface and the carrier bonding surface.

11. The method of claim 1, wherein the thin sheet comprises at least one via therein.

* * * * *